(12) United States Patent
Shimoda et al.

(10) Patent No.: US 12,471,054 B2
(45) Date of Patent: Nov. 11, 2025

(54) COMMUNICATION SYSTEM AND BASE STATION

(71) Applicant: Mitsubishi Electric Corporation, Chiyoda-ku (JP)

(72) Inventors: Tadahiro Shimoda, Tokyo (JP); Mitsuru Mochizuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 354 days.

(21) Appl. No.: 18/005,176

(22) PCT Filed: Aug. 3, 2021

(86) PCT No.: PCT/JP2021/028769
§ 371 (c)(1),
(2) Date: Jan. 11, 2023

(87) PCT Pub. No.: WO2022/030488
PCT Pub. Date: Feb. 10, 2022

(65) Prior Publication Data
US 2023/0269700 A1    Aug. 24, 2023

(30) Foreign Application Priority Data

Aug. 5, 2020  (JP) ................................ 2020-132948

(51) Int. Cl.
*H04W 64/00* (2009.01)
*H04W 24/10* (2009.01)

(52) U.S. Cl.
CPC ......... *H04W 64/006* (2013.01); *H04W 24/10* (2013.01)

(58) Field of Classification Search
CPC ... H04W 64/00; H04W 64/006; H04W 24/10; H04W 52/0216; H04W 52/0245;
(Continued)

(56) References Cited

U.S. PATENT DOCUMENTS

2012/0184290 A1\* 7/2012 Kazmi ................. H04W 64/00
455/456.1
2013/0065612 A1\* 3/2013 Siomina ................ H04B 7/024
455/456.2

(Continued)

FOREIGN PATENT DOCUMENTS

EP          4189907 A1    6/2023
EP          4316060 A1    2/2024
(Continued)

OTHER PUBLICATIONS

European Patent Office, Extended European Search Report, Application No. 21853753.8, dated Aug. 16, 2024, in 8 pages.
(Continued)

*Primary Examiner* — Siu M Lee
(74) *Attorney, Agent, or Firm* — PROCOPIO, CORY, HARGREAVES & SAVITCH LLP

(57) ABSTRACT

A communication system includes a communication terminal, and a serving base station of the communication terminal. The serving base station notifies the communication terminal of an instruction to configure a measurement gap for the communication terminal to measure a positioning signal transmitted from at least one neighboring base station in order to measure a position of the communication terminal, without a request from the communication terminal (Step ST1417).

10 Claims, 31 Drawing Sheets

(58) Field of Classification Search
CPC .................... H04W 36/0088; H04W 76/28; H04L 1/1864; H04L 1/1887; H04L 1/1896; H04L 1/0026; H04L 1/1671; H04L 5/001; G01S 5/0045
See application file for complete search history.

(56) References Cited

U.S. PATENT DOCUMENTS

2020/0053638 A1* 2/2020 Edge .................. H04W 64/003
2021/0067990 A1* 3/2021 Opshaug .............. H04W 24/10

FOREIGN PATENT DOCUMENTS

| JP | 2014-503163 A | 2/2014 |
|---|---|---|
| WO | WO 2012/099514 A1 | 7/2012 |
| WO | 2022/026190 A1 | 2/2022 |
| WO | 2022/212126 A1 | 10/2022 |

OTHER PUBLICATIONS

International Search Report issued Oct. 26, 2021 in PCT/JP2021/028769 filed Aug. 3, 2021, 2 pages.
3GPP TS 38.305 V16.1.0, 3rd Generation Partnership Project; Technical Specification Group Radio Access Network; NG Radio Access Network (NG-RAN); Stage 2 functional specification of User Equipment (UE) positioning in NG-RAN (Release 16), Jul. 2020, 8 pages.
3GPP TS 36.300 V16.2.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, (Release 16), Jul. 2020, 390 pages.
3GPP S1-083461, LS on HNB/HeNB Open Access Mode, 3GPP SA WG1, 3GPP TSG-SA1 #42, 2 pages.
3GPP TR 36.814 V9.2.0, 3rd Generation Partnership Project; Technical Specification Group Radio Access Network; Evolved Universal Terrestrial Radio Access (E-UTRA); Further advancements for E-UTRA physical layer aspects (Release 9), Mar. 2017, 105 pages.
3GPP TR 36.912 V16.0.0, 3rd Generation Partnership Project; Technical Specification Group Radio Access Network; Feasibility study for Further Advancements for E-UTRA (LTE-Advanced) (Release 16), Jul. 2020, 255 pages.
ICT-317669-METIS/D1.1, "Scenarios, requirements and KPIs for 5G mobile and wireless system", Mobile and wireless communications Enablers for the Twenty-twenty Information Society (METIS), 2013, 84 pages.
3GPP TR 23.799 V14.0.0, 3rd Generation Partnership Project; Technical Specification Group Services and System Aspects; Study on Architecture for Next Generation System (Release 14), Dec. 2016, 522 pages.
3GPP TR 38.801 V14.0.0, 3rd Generation Partnership Project; Technical Specification Group Radio Access Network; Study on new radio access technology: Radio access architecture and interfaces (Release 14), Mar. 2017, 91 pages.
3GPP TR 38.802 V14.2.0, 3rd Generation Partnership Project; Technical Specification Group Radio Access Network; Study on New Radio Access Technology Physical Layer Aspects (Release 14), Sep. 2017, 144 pages.
3GPP TR 38.804 V14.0.0, 3rd Generation Partnership Project; Technical Specification Group Radio Access Network; Study on New Radio Access Technology; Radio Interface Protocol Aspects (Release 14), Mar. 2017, 57 pages.
3GPP TR 38.912 V16.0.0, 3rd Generation Partnership Project; Technical Specification Group Radio Access Network; Study on New Radio (NR) access technology (Release 16), Jul. 2020, 74 pages.
3GPP RP-172115, "Work Item on New Radio (NR) Access Technology", 3GPP TSG RAN Meeting #77, 2017, 47 pages.
3GPP TS 37.340 V16.2.0, 3rd Generation Partnership Project; Technical Specification Group Radio Access Network; Evolved Universal Terrestrial Radio Access (E-UTRA) and NR; Multi-connectivity; Stage 2 (Release 16), Jul. 2020, 79 pages.
3GPP TS 38.211 V16.2.0, 3rd Generation Partnership Project; Technical Specification Group Radio Access Network; NR; Physical channels and modulation (Release 16), Jun. 2020, 126 pages.
3GPP TS 38.213 V16.2.0, 3rd Generation Partnership Project; Technical Specification Group Radio Access Network; NR; Physical layer procedures for control (Release 16), Jun. 2020, 176 pages.
3GPP TS 38.214 V16.2.0, 3rd Generation Partnership Project; Technical Specification Group Radio Access Network; NR; Physical layer procedures for data (Release 16), Jun. 2020, 45 pages.
3GPP TS 38.300 V16.2.0, 3rd Generation Partnership Project; Technical Specification Group Radio Access Network; NR; NR and NG-RAN Overall Description; Stage 2 (Release 16), Jul. 2020, 148 pages.
3GPP TS 38.321 V16.1.0, 3rd Generation Partnership Project; Technical Specification Group Radio Access Network; NR; Medium Access Control (MAC) protocol specification (Release 16), Jul. 2020, 150 pages.
3GPP TS 38.212 V16.2.0, 3rd Generation Partnership Project; Technical Specification Group Radio Access Network; NR; Multiplexing and channel coding (Release 16), Jun. 2020, 146 pages.
3GPP RP-161266, "Outline of architecture options in the light of 5G and "Acceleration" Discussion", 5G Architecture Options—Full Set, Jun. 14, 2016, 11 pages.
3GPP TS 23.501 V16.5.0, rd Generation Partnership Project; Technical Specification Group Services and System Aspects; System architecture for the 5G System (5GS) Stage 2 (Release 16), Jul. 2020, 431 pages.
3GPP TS 23.287 V16.3.0, rd Generation Partnership Project; Technical Specification Group Services and System Aspects; Architecture enhancements for 5G System (5GS) to support Vehicle-to-Everything (V2X) services (Release 16), Jul. 2020, 56 pages.
3GPP TS 38.305 V16.0.0, 3rd Generation Partnership Project; Technical Specification Group Radio Access Network; NG Radio Access Network (NG-RAN); Stage 2 functional specification of User Equipment (UE) positioning in NG-RAN (Release 16), Mar. 2020, 107 pages.
3GPP RP-193237, New SID on NR Positioning Enhancements, NR Positioning Enhancements, 3GPP TSG RAN Meeting #86, Dec. 2019. 5 pages.
3GPP TS 37.355 V16.0.0, 3rd Generation Partnership Project; Technical Specification Group Radio Access Network; LTE Positioning Protocol (LPP) (Release 16), Mar. 2020. 281 pages.
3GPP R1-2004492, Initial thoughts on Potential Positioning Enhancements, 3GPP TSG RAN WG1 #101-e, May 2020, 14 pages.
IETF RFC791, Internet Protocol, DARPA Internet Program Protocol Specification, Sep. 1981, 51 pages.
3GPP TS 38.331 V16.1.0, 3rd Generation Partnership Project; Technical Specification Group Radio Access Network; NR; Radio Resource Control (RRC) protocol specification (Release 16), Jul. 2020, 348 pages.
3GPP R2-1901279, Considerations on RAN based positioning architecture, 3GPP TSG-RAN WG2 Meeting #105, Feb. 2019, 6 pages.
3GPP TS 36.305 V16.0.0, 3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 16), Mar. 2020, 91 pages.

* cited by examiner

F I G. 2
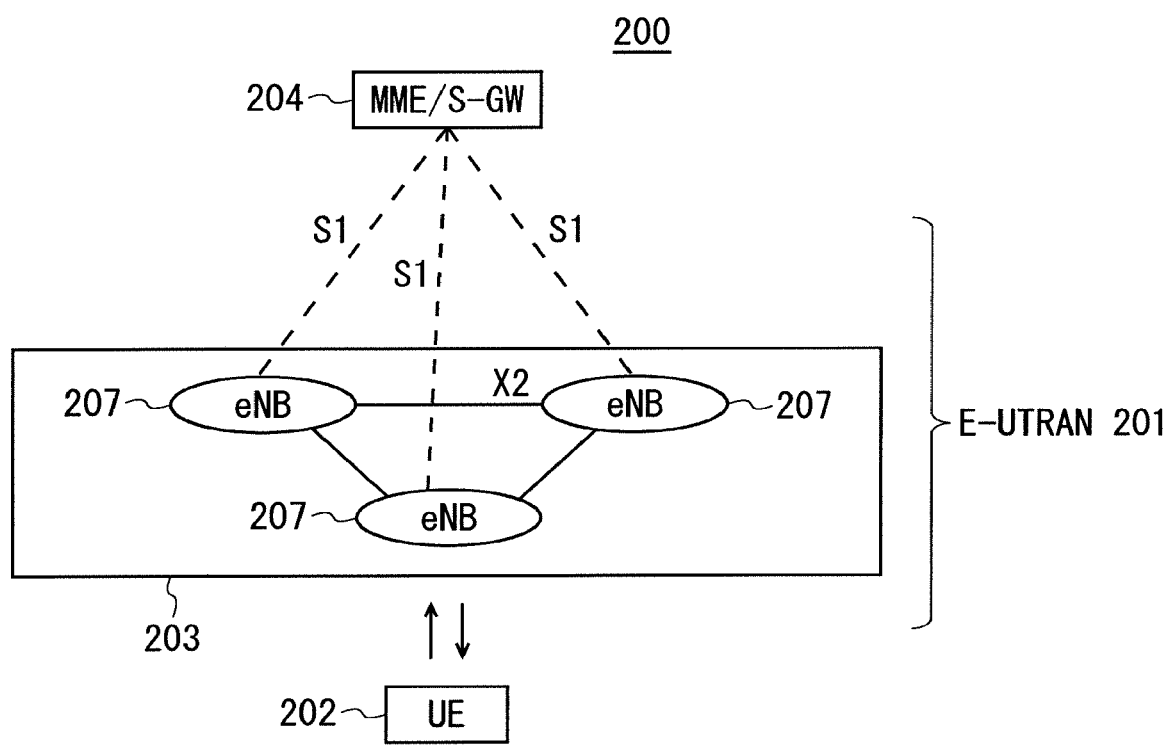

F I G. 5
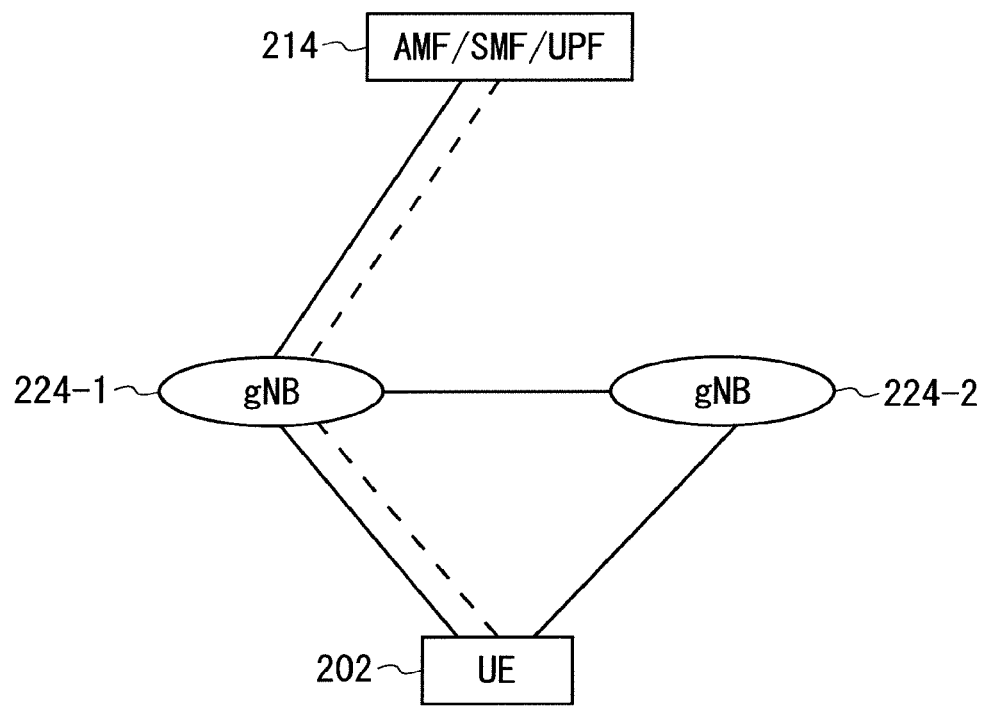

F I G. 1 4
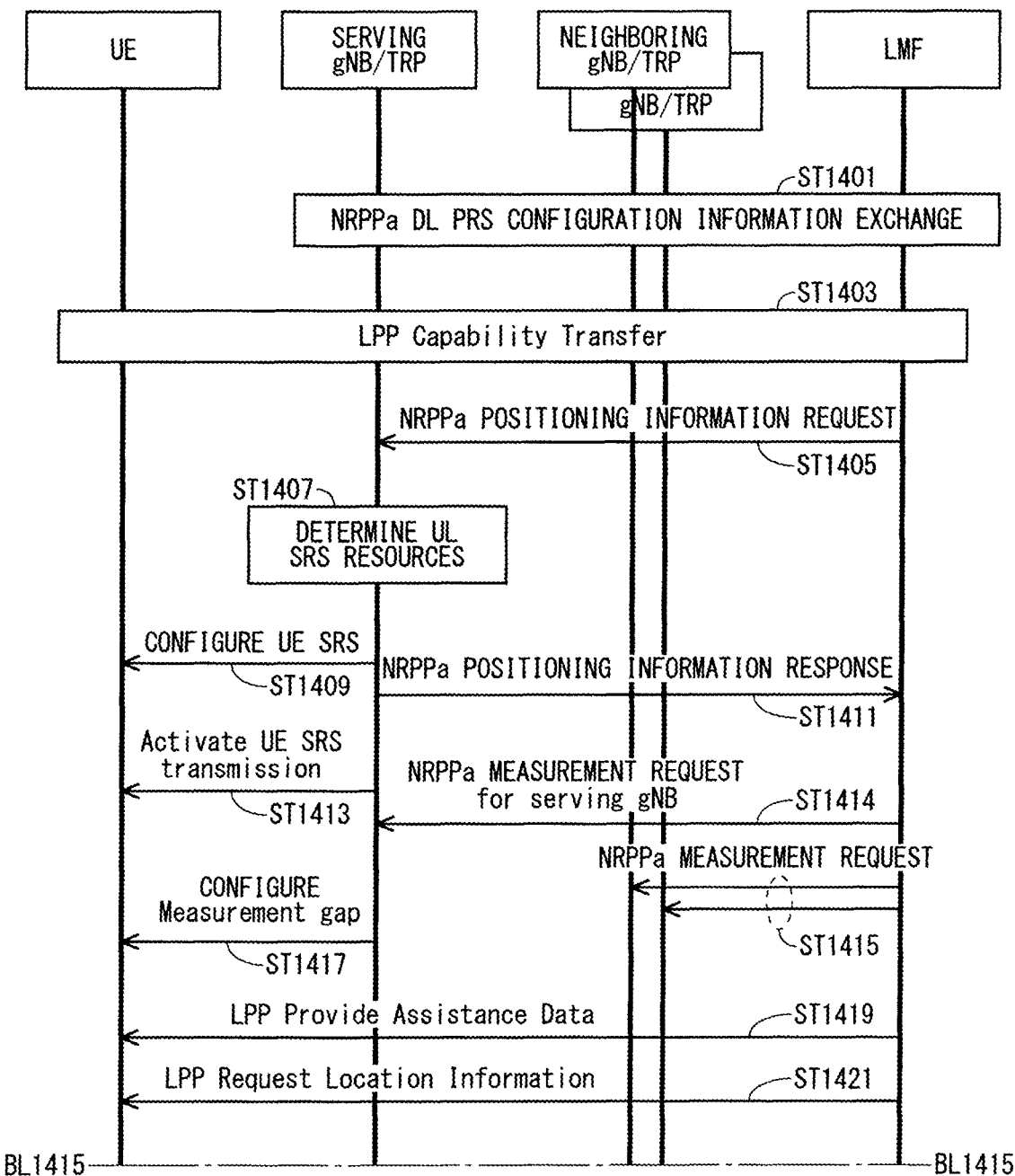

F I G. 2 6
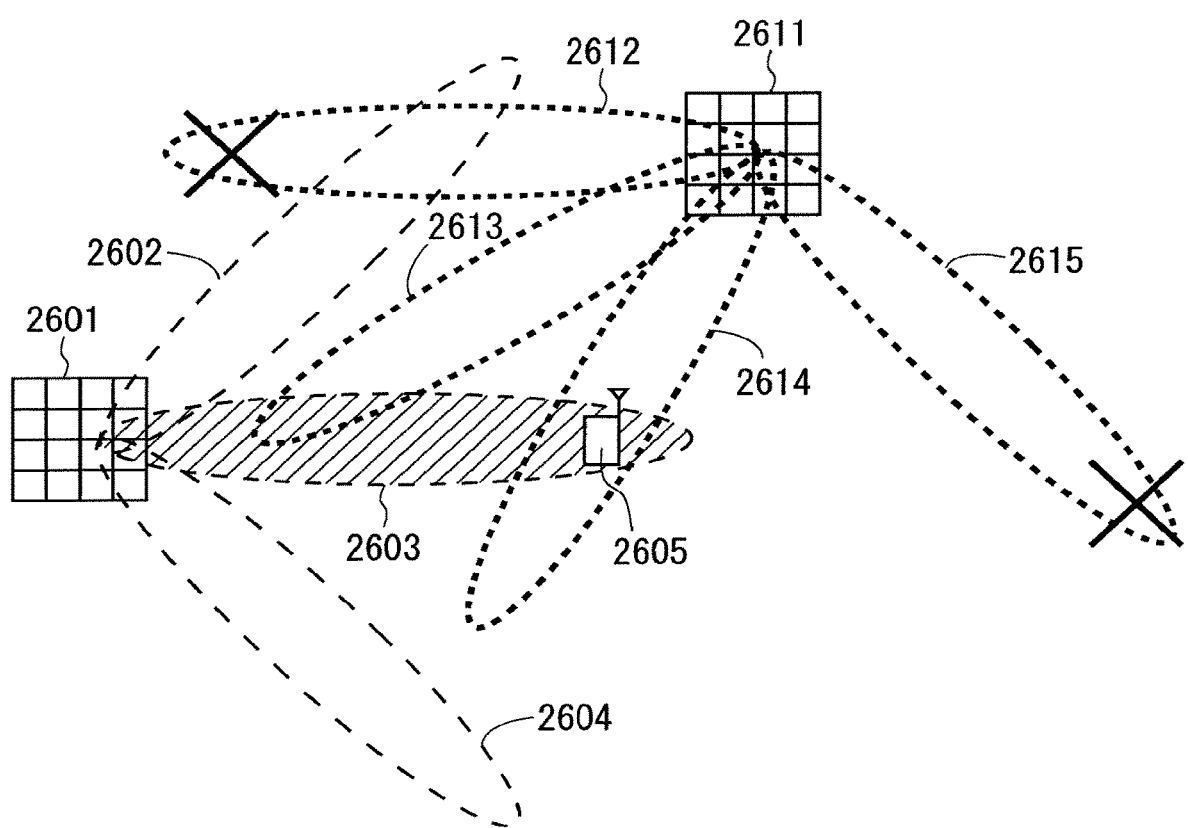

F I G. 2 7
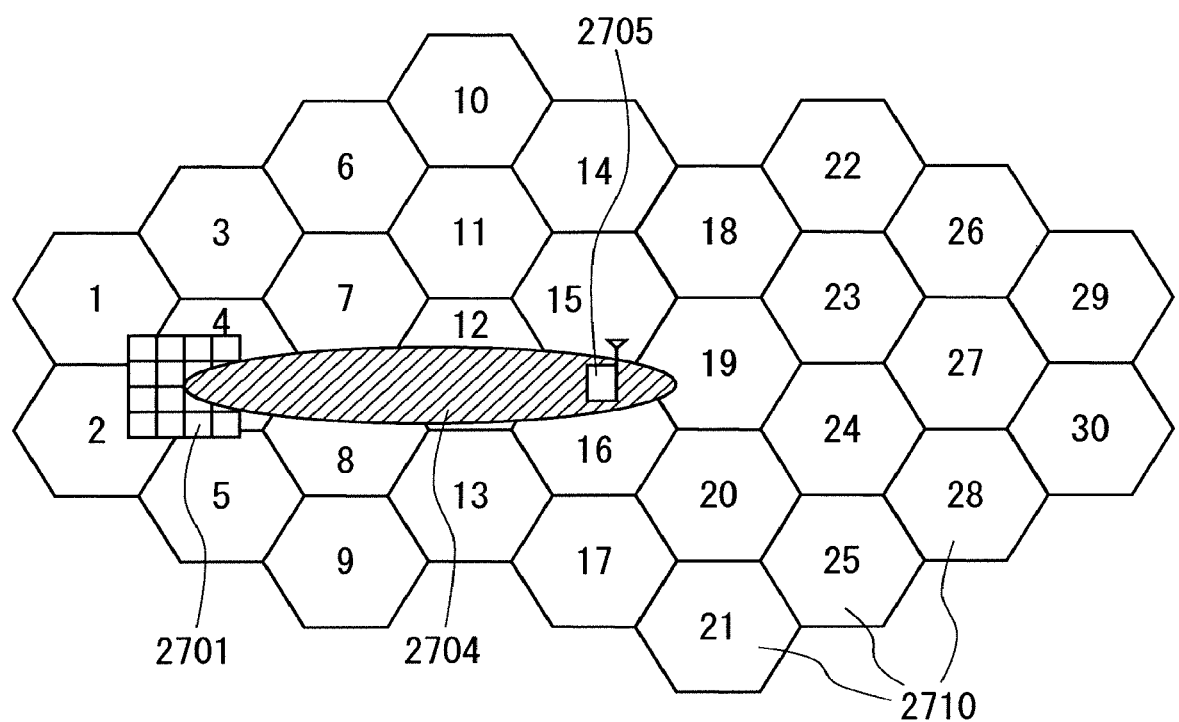

COMMUNICATION SYSTEM AND BASE STATION

TECHNICAL FIELD

The present disclosure relates to a radio communication technology.

BACKGROUND ART

The 3rd generation partnership project (3GPP), the standard organization regarding the mobile communication system, is studying communication systems referred to as long term evolution (LTE) regarding radio sections and system architecture evolution (SAE) regarding the overall system configuration including a core network and a radio access network which is hereinafter collectively referred to as a network as well (for example, see Non-Patent Documents 1 to 5). This communication system is also referred to as 3.9 generation (3.9 G) system.

As the access scheme of the LTE, orthogonal frequency division multiplexing (OFDM) is used in a downlink direction and single carrier frequency division multiple access (SC-FDMA) is used in an uplink direction. Further, differently from the wideband code division multiple access (W-CDMA), circuit switching is not provided but a packet communication system is only provided in the LTE.

The decisions taken in 3GPP regarding the frame configuration in the LTE system described in Non-Patent Document 1 (Chapter 5) are described with reference to FIG. 1. FIG. 1 is a diagram illustrating the configuration of a radio frame used in the LTE communication system. With reference to FIG. 1, one radio frame is 10 ms. The radio frame is divided into ten equally sized subframes. The subframe is divided into two equally sized slots. The first and sixth subframes contain a downlink synchronization signal per radio frame. The synchronization signals are classified into a primary synchronization signal (P-SS) and a secondary synchronization signal (S-SS).

Non-Patent Document 1 (Chapter 5) describes the decisions by 3GPP regarding the channel configuration in the LTE system. It is assumed that the same channel configuration is used in a closed subscriber group (CSG) cell as that of a non-CSG cell.

A physical broadcast channel (PBCH) is a channel for downlink transmission from a base station device (hereinafter may be simply referred to as a "base station") to a communication terminal device (hereinafter may be simply referred to as a "communication terminal") such as a user equipment device (hereinafter may be simply referred to as a "user equipment"). A BCH transport block is mapped to four subframes within a 40 ms interval. There is no explicit signaling indicating 40 ms timing.

A physical control format indicator channel (PCFICH) is a channel for downlink transmission from a base station to a communication terminal. The PCFICH notifies the number of orthogonal frequency division multiplexing (OFDM) symbols used for PDCCHs from the base station to the communication terminal. The PCFICH is transmitted per subframe.

A physical downlink control channel (PDCCH) is a channel for downlink transmission from a base station to a communication terminal. The PDCCH notifies of the resource allocation information for downlink shared channel (DL-SCH) being one of the transport channels described below, resource allocation information for a paging channel (PCH) being one of the transport channels described below, and hybrid automatic repeat request (HARQ) information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) is a channel for downlink transmission from a base station to a communication terminal. A downlink shared channel (DL-SCH) that is a transport channel and a PCH that is a transport channel are mapped to the PDSCH.

A physical multicast channel (PMCH) is a channel for downlink transmission from a base station to a communication terminal. A multicast channel (MCH) that is a transport channel is mapped to the PMCH.

A physical uplink control channel (PUCCH) is a channel for uplink transmission from a communication terminal to a base station. The PUCCH carries Ack/Nack that is a response signal to downlink transmission. The PUCCH carries channel state information (CSI). The CSI includes a rank indicator (RI), a precoding matrix indicator (PMI), and a channel quality indicator (CQI) report. The RI is rank information of a channel matrix in the MIMO. The PMI is information of a precoding weight matrix to be used in the MIMO. The CQI is quality information indicating the quality of received data or channel quality. In addition, the PUCCH carries a scheduling request (SR).

A physical uplink shared channel (PUSCH) is a channel for uplink transmission from a communication terminal to a base station. An uplink shared channel (UL-SCH) that is one of the transport channels is mapped to the PUSCH.

A physical hybrid ARQ indicator channel (PHICH) is a channel for downlink transmission from a base station to a communication terminal. The PHICH carries Ack/Nack that is a response signal to uplink transmission. A physical random access channel (PRACH) is a channel for uplink transmission from the communication terminal to the base station. The PRACH carries a random access preamble.

A downlink reference signal (RS) is a known symbol in the LTE communication system. The following five types of downlink reference signals are defined as: a cell-specific reference signal (CRS), an MBSFN reference signal, a data demodulation reference signal (DM-RS) being a UE-specific reference signal, a positioning reference signal (PRS), and a channel state information reference signal (CSI-RS). The physical layer measurement objects of a communication terminal include reference signal received powers (RSRPs).

An uplink reference signal is also a known symbol in the LTE communication system. The following two types of uplink reference signals are defined, that is, a demodulation reference signal (DM-RS) and a sounding reference signal (SRS).

The transport channels described in Non-Patent Document 1 (Chapter 5) are described. A broadcast channel (BCH) among the downlink transport channels is broadcast to the entire coverage of a base station (cell). The BCH is mapped to the physical broadcast channel (PBCH).

Retransmission control according to a hybrid ARQ (HARQ) is applied to a downlink shared channel (DL-SCH). The DL-SCH can be broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a communication terminal for enabling the communication terminal to save power. The DL-SCH is mapped to the physical downlink shared channel (PDSCH).

The paging channel (PCH) supports DRX of the communication terminal for enabling the communication terminal to save power. The PCH is required to be broadcast to the entire coverage of the base station (cell). The PCH is mapped to physical resources such as the physical downlink shared channel (PDSCH) that can be used dynamically for traffic.

The multicast channel (MCH) is used for broadcasting the entire coverage of the base station (cell). The MCH supports SFN combining of multimedia broadcast multicast service (MBMS) services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels. The UL-SCH supports dynamic or semi-static resource allocation. The UL-SCH is mapped to the physical uplink shared channel (PUSCH).

A random access channel (RACH) is limited to control information. The RACH involves a collision risk. The RACH is mapped to the physical random access channel (PRACH).

The HARQ is described. The HARQ is the technique for improving the communication quality of a channel by combination of automatic repeat request (ARQ) and error correction (forward error correction). The HARQ is advantageous in that error correction functions effectively by retransmission even for a channel whose communication quality changes. In particular, it is also possible to achieve further quality improvement in retransmission through combination of the reception results of the first transmission and the reception results of the retransmission.

An example of the retransmission method is described. If the receiver fails to successfully decode the received data, in other words, if a cyclic redundancy check (CRC) error occurs (CRC=NG), the receiver transmits "Nack" to the transmitter. The transmitter that has received "Nack" retransmits the data. If the receiver successfully decodes the received data, in other words, if a CRC error does not occur (CRC=OK), the receiver transmits "Ack" to the transmitter. The transmitter that has received "Ack" transmits the next data.

The logical channels described in Non-Patent Document 1 (Chapter 6) are described. A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging information and system information change notifications. The PCCH is used when the network does not know the cell location of a communication terminal. The PCCH that is a logical channel is mapped to the paging channel (PCH) that is a transport channel.

A common control channel (CCCH) is a channel for transmission control information between communication terminals and a base station. The CCCH is used in a case where the communication terminals have no RRC connection with the network. In the downlink direction, the CCCH is mapped to the downlink shared channel (DL-SCH) that is a transport channel. In the uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a communication terminal. The MCCH is used only by a communication terminal during reception of the MBMS. The MCCH is mapped to the multicast channel (MCH) that is a transport channel.

A dedicated control channel (DCCH) is a channel that transmits dedicated control information between a communication terminal and a network on a point-to-point basis. The DCCH is used when the communication terminal has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated communication terminal. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a communication terminal. The MTCH is a channel used only by a communication terminal during reception of the MBMS. The MTCH is mapped to the multicast channel (MCH).

CGI represents a cell global identifier. ECGI represents an E-UTRAN cell global identifier. A closed subscriber group (CSG) cell is introduced into the LTE, and the long term evolution advanced (LTE-A) and universal mobile telecommunication system (UMTS) described below.

The locations of communication terminals are tracked based on an area composed of one or more cells. The locations are tracked for enabling tracking the locations of communication terminals and calling communication terminals, in other words, incoming calling to communication terminals even in an idle state. An area for tracking locations of communication terminals is referred to as a tracking area.

Further, specifications of long term evolution advanced (LTE-A) are pursued as Release 10 in 3GPP (see Non-Patent Documents 3 and 4). The LTE-A is based on the LTE radio communication system and is configured by adding several new techniques to the system.

Carrier aggregation (CA) is studied for the LTE-A system in which two or more component carriers (CCs) are aggregated to support wider transmission bandwidths up to 100 MHz. Non-Patent Document 1 describes the CA.

In a case where CA is configured, a UE has a single RRC connection with a network (NW). In RRC connection, one serving cell provides NAS mobility information and security input. This cell is referred to as a primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form a serving cell group with a PCell, in accordance with the UE capability. In downlink, a carrier corresponding to SCell is a downlink secondary component carrier (DL SCC). In uplink, a carrier corresponding to SCell is an uplink secondary component carrier (UL SCC).

A serving cell group of one PCell and one or more SCells is configured for one UE.

The new techniques in the LTE-A include the technique of supporting wider bands (wider bandwidth extension) and the coordinated multiple point transmission and reception (CoMP) technique. The CoMP studied for LTE-A in 3GPP is described in Non-Patent Document 1.

Furthermore, the use of small eNBs (hereinafter also referred to as "small-scale base station devices") configuring small cells is studied in 3GPP to satisfy tremendous traffic in the future. In an example technique under study, a large number of small eNBs is installed to configure a large number of small cells, which increases spectral efficiency and communication capacity. The specific techniques include dual connectivity (abbreviated as DC) with which a UE communicates with two eNBs through connection thereto. Non-Patent Document 1 describes the DC.

For eNBs that perform dual connectivity (DC), one may be referred to as a master eNB (abbreviated as MeNB), and the other may be referred to as a secondary eNB (abbreviated as SeNB).

The traffic flow of a mobile network is on the rise, and the communication rate is also increasing. It is expected that the communication rate is further increased when the operations of the LTE and the LTE-A are fully initiated.

For increasingly enhanced mobile communications, the fifth generation (hereinafter also referred to as "5G") radio access system is studied whose service is aimed to be launched in 2020 and afterward. For example, in the Europe, an organization named METIS summarizes the requirements for 5G (see Non-Patent Document 5).

The requirements in the 5G radio access system show that a system capacity shall be 1000 times as high as, a data transmission rate shall be 100 times as high as, a data latency shall be one tenth (1/10) as low as, and simultaneously connected communication terminals 100 times as many as those of the LTE system, to further reduce the power consumption and device cost.

To satisfy such requirements, the study of 5G standards is pursued as Release 15 in 3GPP (see Non-Patent Documents 6 to 18). The techniques on 5G radio sections are referred to as "New Radio Access Technology" ("New Radio" is abbreviated as NR).

The NR system has been studied based on the LTE system and the LTE-A system. The NR system includes additions and changes from the LTE system and the LTE-A system in the following points.

As the access schemes of the NR, the orthogonal frequency division multiplexing (OFDM) is used in the downlink direction, and the OFDM and the DFT-spread-OFDM (DFT-s-OFDM) are used in the uplink direction.

In NR, frequencies higher than those in the LTE are available for increasing the transmission rate and reducing the latency.

In NR, a cell coverage is maintained by forming a transmission/reception range shaped like a narrow beam (beamforming) and also changing the orientation of the beam (beam sweeping).

In NR, various subcarrier spacings, that is, various numerologies are supported. Regardless of the numerologies, 1 subframe is 1 millisecond long, and 1 slot consists of 14 symbols in NR. Furthermore, the number of slots in 1 subframe is one in a numerology at a subcarrier spacing of 15 kHz. The number of slots increases in proportion to the subcarrier spacing in the other numerologies (see Non-Patent Document 13 (TS 38.211 V16.2.0)).

The base station transmits a downlink synchronization signal in NR as synchronization signal burst (may be hereinafter referred to as SS burst) with a predetermined period for a predetermined duration. The SS burst includes synchronization signal blocks (may be hereinafter referred to as SS blocks) for each beam of the base station. The base station transmits the SS blocks for each beam during the duration of the SS burst with the beam changed. The SS blocks include the P-SS, the S-SS, and the PBCH.

In NR, addition of a phase tracking reference signal (PTRS) as a downlink reference signal has reduced the influence of phase noise. The PTRS has also been added as an uplink reference signal similarly to the downlink.

In NR, a slot format indication (SFI) has been added to information included in the PDCCH for flexibly switching between the DL and the UL in a slot.

Also in NR, the base station preconfigures, for the UE, a part of a carrier frequency band (may be hereinafter referred to as a Bandwidth Part (BWP)). Then, the UE performs transmission and reception with the base station in the BWP. Consequently, the power consumption in the UE is reduced.

The DC patterns studied in 3GPP include the DC to be performed between an LTE base station and an NR base station that are connected to the EPC, the DC to be performed by the NR base stations that are connected to the 5G core system, and the DC to be performed between the LTE base station and the NR base station that are connected to the 5G core system (see Non-Patent Documents 12, 16, and 19).

Further, in 3GPP, some new technologies are studied. For example, a positioning technology is studied (see Non-Patent Documents 22 to 25 and 28). As the positioning technology, for example, a positioning method (Multi-Round Trip Time (Multi-RTT)) using round-trip delay time between the UE and a plurality of base stations is studied (see Non-Patent Document 25).

PRIOR ART DOCUMENTS

Non-Patent Documents

Non-Patent Document 1: 3GPP TS 36.300 V16.2.0
Non-Patent Document 2: 3GPP S1-083461
Non-Patent Document 3: 3GPP TR 36.814 V9.2.0
Non-Patent Document 4: 3GPP TR 36.912 V16.0.0
Non-Patent Document 5: "Scenarios, requirements and KPIs for 5G mobile and wireless system", ICT-317669-ME-TIS/D1.1
Non-Patent Document 6: 3GPP TR 23.799 V14.0.0
Non-Patent Document 7: 3GPP TR 38.801 V14.0.0
Non-Patent Document 8: 3GPP TR 38.802 V14.2.0
Non-Patent Document 9: 3GPP TR 38.804 V14.0.0
Non-Patent Document 10: 3GPP TR 38.912 V16.0.0
Non-Patent Document 11: 3GPP RP-172115
Non-Patent Document 12: 3GPP TS 37.340 V16.2.0
Non-Patent Document 13: 3GPP TS 38.211 V16.2.0
Non-Patent Document 14: 3GPP TS 38.213 V16.2.0
Non-Patent Document 15: 3GPP TS 38.214 V16.2.0
Non-Patent Document 16: 3GPP TS 38.300 V16.2.0
Non-Patent Document 17: 3GPP TS 38.321 V16.1.0
Non-Patent Document 18: 3GPP TS 38.212 V16.2.0
Non-Patent Document 19: 3GPP RP-161266
Non-Patent Document 20: 3GPP TS 23.501 V16.5.0
Non-Patent Document 21: 3GPP TS 23.287 V16.3.0
Non-Patent Document 22: 3GPP TS 38.305 V16.0.0
Non-Patent Document 23: 3GPP RP-193237
Non-Patent Document 24: 3GPP TS 37.355 V16.0.0
Non-Patent Document 25: 3GPP R1-2004492
Non-Patent Document 26: IETF RFC791
Non-Patent Document 27: 3GPP TS 38.331 V16.1.0
Non-Patent Document 28: 3GPP R2-1901279
Non-Patent Document 29: 3GPP TS 36.305 V16.0.0

SUMMARY

Problem to be Solved by the Invention

In Multi-RTT, the UE needs to transmit and receive a positioning signal to and from the plurality of base stations.

In order to transmit and receive the positioning signal to and from neighboring base stations other than a serving base station, the UE requests the serving base station to change a configuration of a measurement gap (a period of time for performing measurement of other base stations, with transmission and reception to and from the serving base station being suspended). The base station configures the measurement gap of the UE, based on the request for the measurement gap. However, because the request for the measurement gap from the UE is performed after positioning has started, this increases time required for positioning of the UE, resulting in increasing latency of positioning.

In view of the problem described above, the present disclosure has one object to provide a satisfactory communication service by implementing reduction of latency in positioning.

Means to Solve the Problem

A communication system according to the present disclosure is a communication system including a communication terminal, and a serving base station of the communication terminal. The serving base station notifies the communication terminal of an instruction to configure a measurement gap for the communication terminal to measure a positioning signal transmitted from at least one neighboring base station in order to measure a position of the communication terminal, without a request from the communication terminal.

A base station according to the present disclosure is a base station configured to operate as a serving base station of a communication terminal. The base station notifies the communication terminal of an instruction to configure a measurement gap for the communication terminal to measure a positioning signal transmitted from at least one neighboring base station in order to measure a position of the communication terminal, without a request from the communication terminal.

Effects of the Invention

According to the present disclosure, satisfactory communication can be provided.

These and other objects, features, aspects and advantages of the present disclosure will become more apparent from the following detailed description when taken in conjunction with the accompanying drawings.

BRIEF DESCRIPTION OF DRAWINGS

FIG. 2 is a block diagram showing the overall configuration of an LTE communication system 200 under discussion of 3GPP.

FIG. 5 illustrates a structure of the DC to be performed by gNBs that are connected to the NG core.

FIG. 14 is a sequence diagram illustrating a first example of operation of positioning when a serving base station configures a measurement gap for a UE without waiting for a measurement gap change request from the UE according to a first embodiment.

FIG. 26 is a diagram illustrating operation in which a neighboring base station performs beam sweeping within a range of beams that the serving base station uses for communication with the UE according to a first modification of the first embodiment.

FIG. 27 is a diagram illustrating an example in which the serving base station performs notification of areas that overlap a range of a serving beam among a plurality of areas determined in advance as information related to the serving beam according to the first modification of the first embodiment.

DESCRIPTION OF EMBODIMENTS

The First Embodiment

Figure 1:
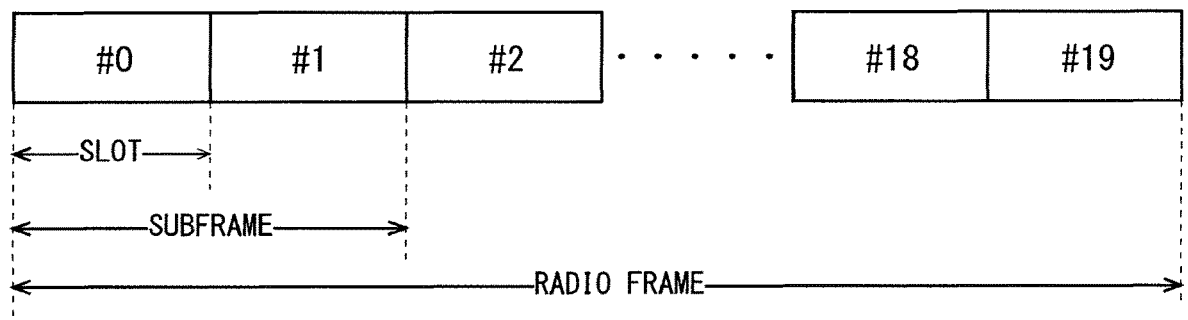
FIG. 1 is a diagram illustrating the configuration of a radio frame for use in an LTE communication system.

FIG. 2 is a block diagram showing an overall configuration of an LTE communication system 200 which is under discussion of 3GPP. FIG. 2 is described here. A radio access network is referred to as an evolved universal terrestrial radio access network (E-UTRAN) 201. A user equipment device (hereinafter, referred to as a "user equipment (UE)") 202 that is a communication terminal device is capable of radio communication with a base station device (hereinafter, referred to as a "base station (E-UTRAN Node B: eNB)") 203 and transmits and receives signals through radio communication.

Here, the "communication terminal device" covers not only a user equipment device such as a mobile phone terminal device, but also an unmovable device such as a sensor. In the following description, the "communication terminal device" may be simply referred to as a "communication terminal".

The E-UTRAN is composed of one or a plurality of base stations 203, provided that a control protocol for the user equipment 202 such as a radio resource control (RRC), and user planes (hereinafter also referred to as "U-planes") such as a packet data convergence protocol (PDCP), radio link control (RLC), medium access control (MAC), or physical layer (PHY) are terminated in the base station 203.

The control protocol radio resource control (RRC) between the user equipment 202 and the base station 203 performs, for example, broadcast, paging, and RRC connection management. The states of the base station 203 and the user equipment 202 in RRC are classified into RRC_IDLE and RRC_CONNECTED.

In RRC_IDLE, public land mobile network (PLMN) selection, system information (SI) broadcast, paging, cell reselection, mobility, and the like are performed. In RRC_CONNECTED, the user equipment has RRC connection and is capable of transmitting and receiving data to and from a network. In RRC_CONNECTED, for example, handover (HO) and measurement of a neighbor cell are performed.

The base stations 203 includes one or more eNBs 207. A system, composed of an evolved packet core (EPC) being a core network and an E-UTRAN 201 being a radio access network, is referred to as an evolved packet system (EPS). The EPC being a core network and the E-UTRAN 201 being a radio access network may be collectively referred to as a "network".

The eNB 207 is connected to an MME/S-GW unit (hereinafter, also referred to as an "MME unit") 204 including a mobility management entity (MME), a serving gateway (S-GW) or an MME and an S-GW by means of an S1 interface, and control information is communicated between the eNB 207 and the MME unit 204. A plurality of MME units 204 may be connected to one eNB 207. The eNBs 207 are connected to each other by means of an X2 interface, and control information is communicated between the eNBs 207.

The MME unit 204 is a high-level device, specifically, a high-level node, and controls connection between the user equipment (UE) 202 and the eNBs 207 comprising a base station. The MME unit 204 configures the EPC that is a core network. The base station 203 configures the E-UTRAN 201.

The base station 203 may configure one or more cells. Each of the cells has a predefined range as a coverage that is a range in which communication with the user equipment 202 is possible, and performs radio communication with the user equipment 202 within the coverage. When the one base station 203 configures a plurality of cells, each of the cells is configured to communicate with the user equipment 202.

Figure 3:
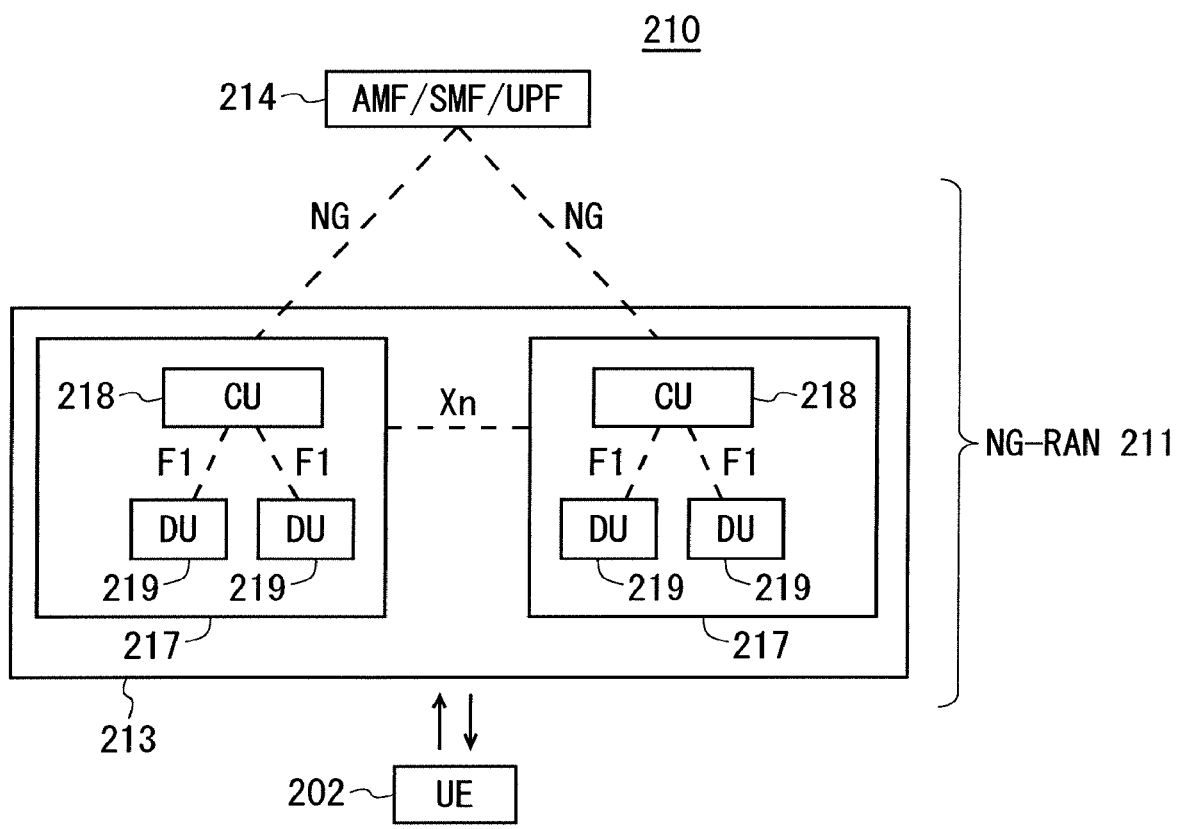
FIG. 3 is a block diagram illustrating an overall configuration of a NR communication system 210 that has been discussed in 3GPP.

FIG. 3 is a block diagram illustrating an overall configuration of a 5G communication system 210 that has been discussed in 3GPP. FIG. 3 is described. A radio access network is referred to as a next generation radio access network (NG-RAN) 211. The UE 202 can perform radio communication with an NR base station device (hereinafter referred to as a "NG-RAN NodeB (gNB)") 213, and transmits and receives signals to and from the NR base station device 213 via radio communication. Furthermore, the core network is referred to as a 5G Core (5GC).

When control protocols for the UE 202, for example, Radio Resource Control (RRC) and user planes (may be hereinafter referred to as U-Planes), e.g., Service Data Adaptation Protocol (SDAP), Packet Data Convergence Protocol (PDCP), Radio Link Control (RLC), Medium Access Control (MAC), and Physical Layer (PHY) are terminated in the NR base station 213, one or more NR base stations 213 configure the NG-RAN.

The functions of the control protocol of the Radio Resource Control (RRC) between the UE 202 and the NR base station 213 are identical to those in LTE. The states of the NR base station 213 and the UE 202 in RRC include RRC_IDLE, RRC_CONNECTED, and RRC_INACTIVE.

RRC_IDLE and RRC_CONNECTED are identical to those in LTE. In RRC_INACTIVE, for example, broadcast of system information (SI), paging, cell reselection, and mobility are performed while the connection between the 5G Core and the NR base station 213 is maintained.

Through an NG interface, gNBs 217 are connected to the Access and Mobility Management Function (AMF), the Session Management Function (SMF), the User Plane Function (UPF), or an AMF/SMF/UPF unit (may be hereinafter referred to as a 5GC unit) 214 including the AMF, the SMF, and the UPF. The control information and/or user data are communicated between each of the gNBs 217 and the 5GC unit 214. The NG interface is a generic name for an N2 interface between the gNBs 217 and the AMF, an N3 interface between the gNBs 217 and the UPF, an N11 interface between the AMF and the SMF, and an N4 interface between the UPF and the SMF. A plurality of the 5GC units 214 may be connected to one of the gNBs 217. The gNBs 217 are connected through an Xn interface, and the control information and/or user data are communicated between the gNBs 217.

The NR base station 213 may configure one or more cells in the same manner as the base station 203. When the one NR base station 213 configures a plurality of cells, each of the cells is configured to communicate with the UE 202.

Each of the gNBs 217 may be divided into a Central Unit (may be hereinafter referred to as a CU) 218 and Distributed Units (may be hereinafter referred to as DUs) 219. The one CU 218 is configured in the gNB 217. The number of the DUs 219 configured in the gNB 217 is one or more. The CU 218 is connected to the DUs 219 via an F1 interface, and the control information and/or user data are communicated between the CU 218 and each of the DUs 219.

In the 5G communication system, a unified data management (UDM) function and a policy control function (PCF) described in Non-Patent Document 20 (3GPP TS 23.501 V16.5.0) may be included. The UDM and/or the PCF may be included in the 5GC unit of FIG. 3.

In the 5G communication system, a location management function (LMF) described in Non-Patent Document 22 (3GPP TS 38.305 V16.0.0) may be provided.

In the 5G communication system, a non-3GPP interworking function (N3IWF) described in Non-Patent Document 20 (3GPP TS 23.501 V16.5.0) may be included. The N3IWF may terminate an access network (AN) between the N3IWF and the UE in non-3GPP access between the N3IWF and the UE.

Figure 4:
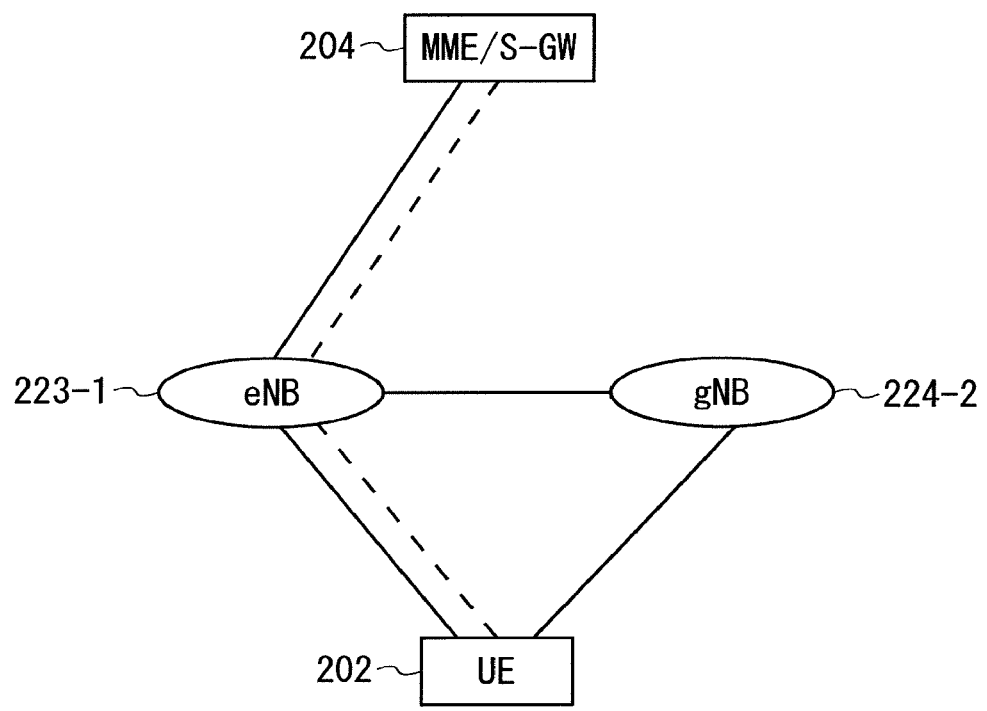
FIG. 4 illustrates a structure of the DC to be performed by an eNB and a gNB that are connected to the EPC.

FIG. 4 illustrates a structure of the DC to be performed by an eNB and a gNB that are connected to the EPC. In FIG. 4, solid lines represent connection to the U-planes, and dashed lines represent connection to the C-planes. In FIG. 4, an eNB 223-1 becomes a master base station, and a gNB 224-2 becomes a secondary base station (this DC structure may be referred to as EN-DC). Although FIG. 4 illustrates an example U-Plane connection between the MME unit 204 and the gNB 224-2 through the eNB 223-1, the U-Plane connection may be established directly between the MME unit 204 and the gNB 224-2.

FIG. 5 illustrates a structure of the DC to be performed by gNBs that are connected to the NG core. In FIG. 5, solid lines represent connection to the U-planes, and dashed lines represent connection to the C-planes. In FIG. 5, a gNB 224-1 becomes a master base station, and the gNB 224-2 becomes a secondary base station (this DC structure may be referred to as NR-DC). Although FIG. 5 illustrates an example U-Plane connection between the 5GC unit 214 and the gNB 224-2 through the gNB 224-1, the U-Plane connection may be established directly between the 5GC unit 214 and the gNB 224-2.

Figure 6:
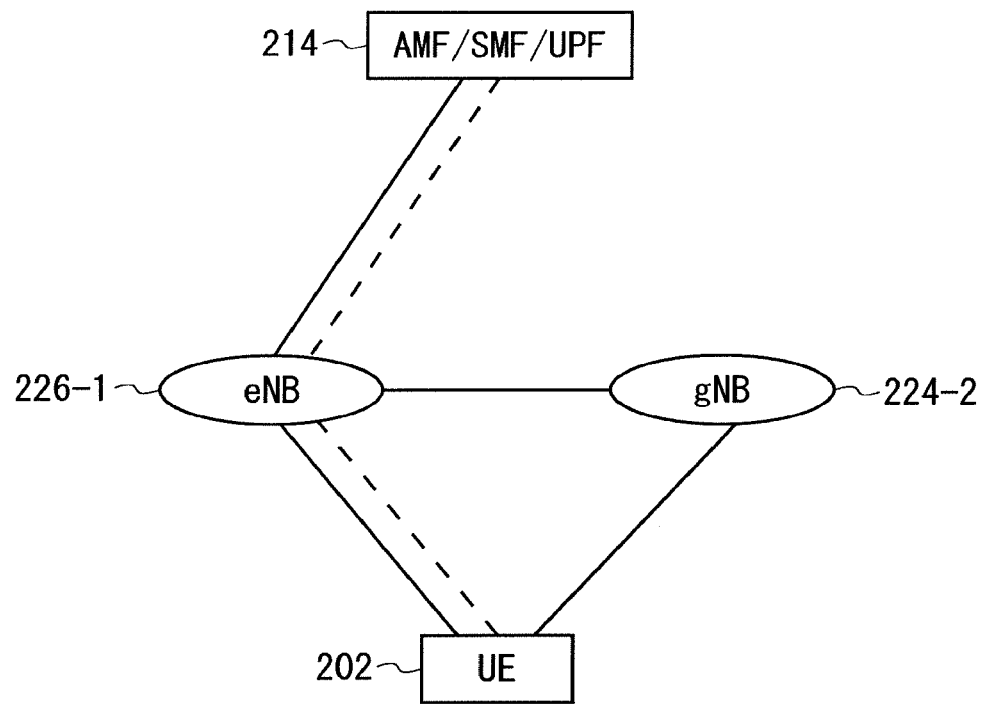
FIG. 6 illustrates a structure of the DC to be performed by the eNB and the gNB that are connected to the NG core.

FIG. 6 illustrates a structure of the DC to be performed by an eNB and a gNB that are connected to the NG core. In FIG. 6, solid lines represent connection to the U-planes, and dashed lines represent connection to the C-planes. In FIG. 6, an eNB 226-1 becomes a master base station, and the gNB 224-2 becomes a secondary base station (this DC structure may be referred to as NG-EN-DC). Although FIG. 6 illustrates an example U-Plane connection between the 5GC unit 214 and the gNB 224-2 through the eNB 226-1, the U-Plane connection may be established directly between the 5GC unit 214 and the gNB 224-2.

Figure 7:
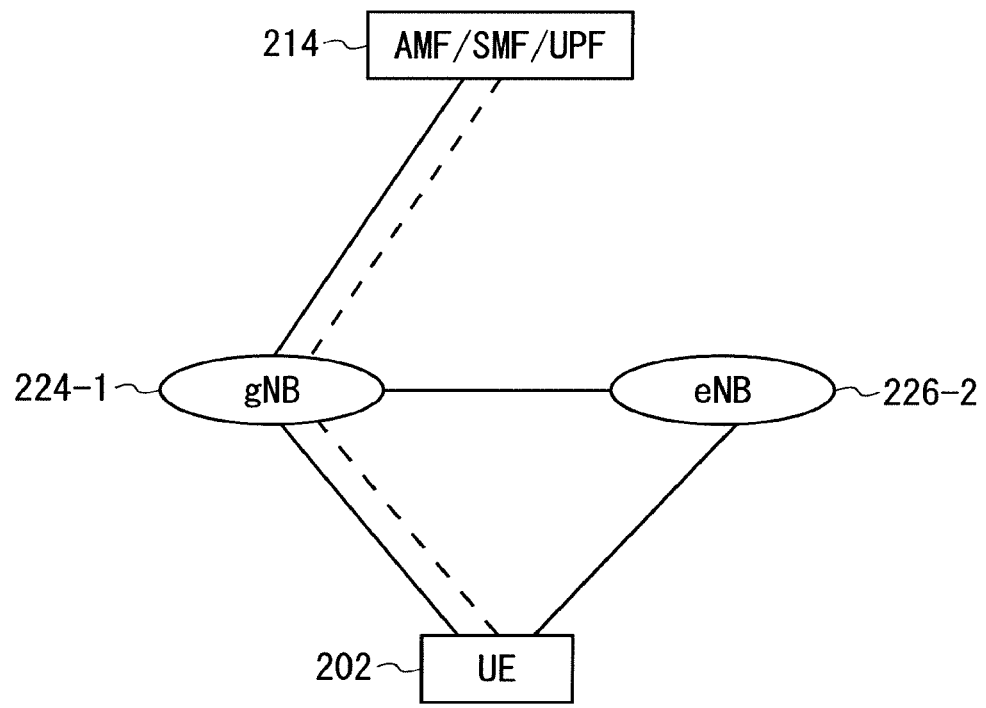
FIG. 7 illustrates a structure of the DC to be performed by the eNB and the gNB that are connected to the NG core.

FIG. 7 illustrates another structure of the DC to be performed by an eNB and a gNB that are connected to the NG core. In FIG. 7, solid lines represent connection to the U-planes, and dashed lines represent connection to the C-planes. In FIG. 7, the gNB 224-1 becomes a master base station, and an eNB 226-2 becomes a secondary base station (this DC structure may be referred to as NE-DC). Although FIG. 7 illustrates an example U-Plane connection between the 5GC unit 214 and the eNB 226-2 through the gNB 224-1, the U-Plane connection may be established directly between the 5GC unit 214 and the eNB 226-2.

Figure 8:
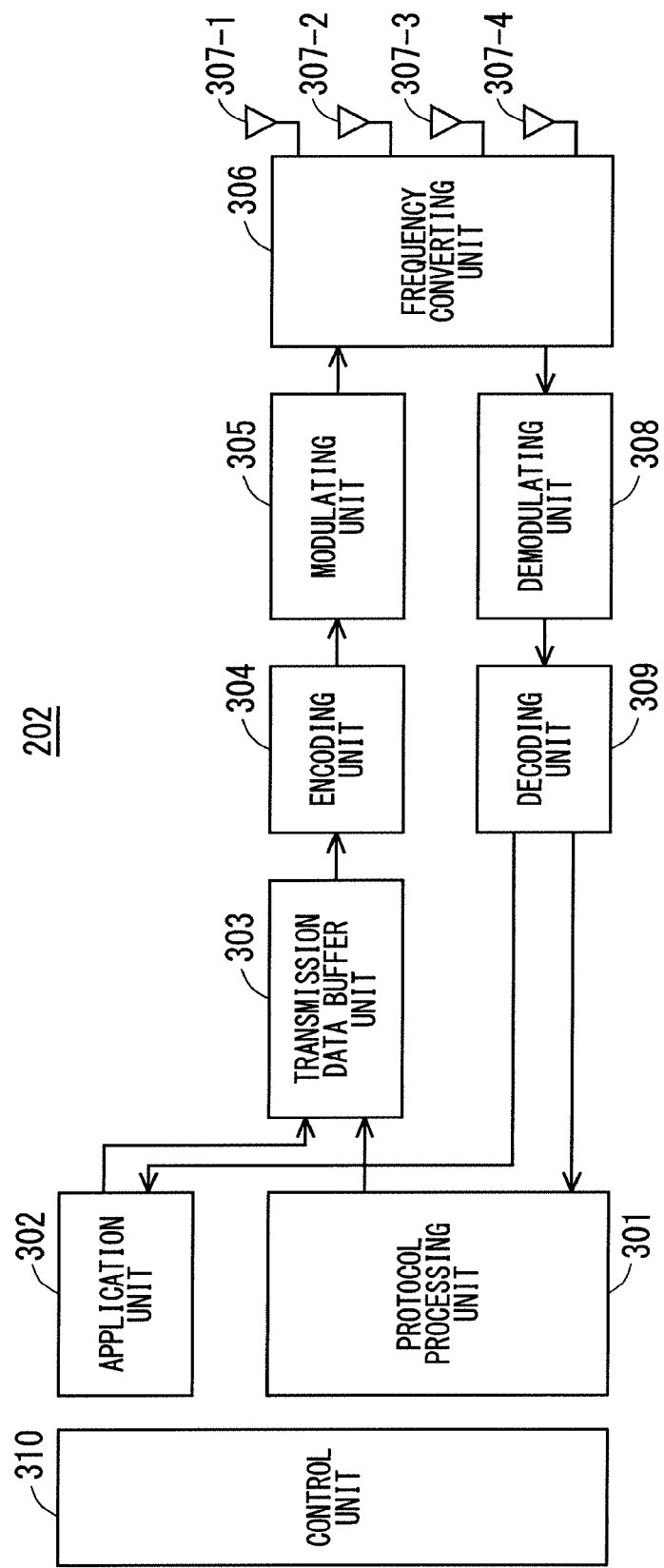
FIG. 8 is a block diagram showing the configuration of a user equipment 202 shown in FIG. 2.

FIG. 8 is a block diagram showing the configuration of the user equipment 202 of FIG. 2. The transmission process of the user equipment 202 shown in FIG. 8 is described. First, a transmission data buffer unit 303 stores the control data from a protocol processing unit 301 and the user data from an application unit 302. The data stored in the transmission data buffer unit 303 is passed to an encoding unit 304, and is subjected to an encoding process such as error correction. There may exist the data output from the transmission data buffer unit 303 directly to a modulating unit 305 without the encoding process. The data encoded by the encoding unit 304 is modulated by the modulating unit 305. The modulating unit 305 may perform precoding in the MIMO. The modulated data is converted into a baseband signal, and the baseband signal is output to a frequency converting unit 306 and is then converted into a radio transmission frequency. After that, transmission signals are transmitted from antennas 307-1 to 307-4 to the base station 203. Although FIG. 8 exemplifies a case where the number of antennas is four, the number of antennas is not limited to four.

The user equipment 202 executes the reception process as follows. The radio signal from the base station 203 is received through each of the antennas 307-1 to 307-4. The received signal is converted from a radio reception frequency into a baseband signal by the frequency converting unit 306 and is then demodulated by a demodulating unit 308. The demodulating unit 308 may calculate a weight and perform a multiplication operation. The demodulated data is passed to a decoding unit 309, and is subjected to a decoding process such as error correction. Among the pieces of decoded data, the control data is passed to the protocol processing unit 301, and the user data is passed to the application unit 302. A series of processes by the user equipment 202 is controlled by a control unit 310. This means that, though not shown in FIG. 8, the control unit 310 is connected to the individual units 301 to 309. In FIG. 8, the number of antennas for transmission of the user equipment 202 may be identical to or different from that for its reception.

Figure 9:
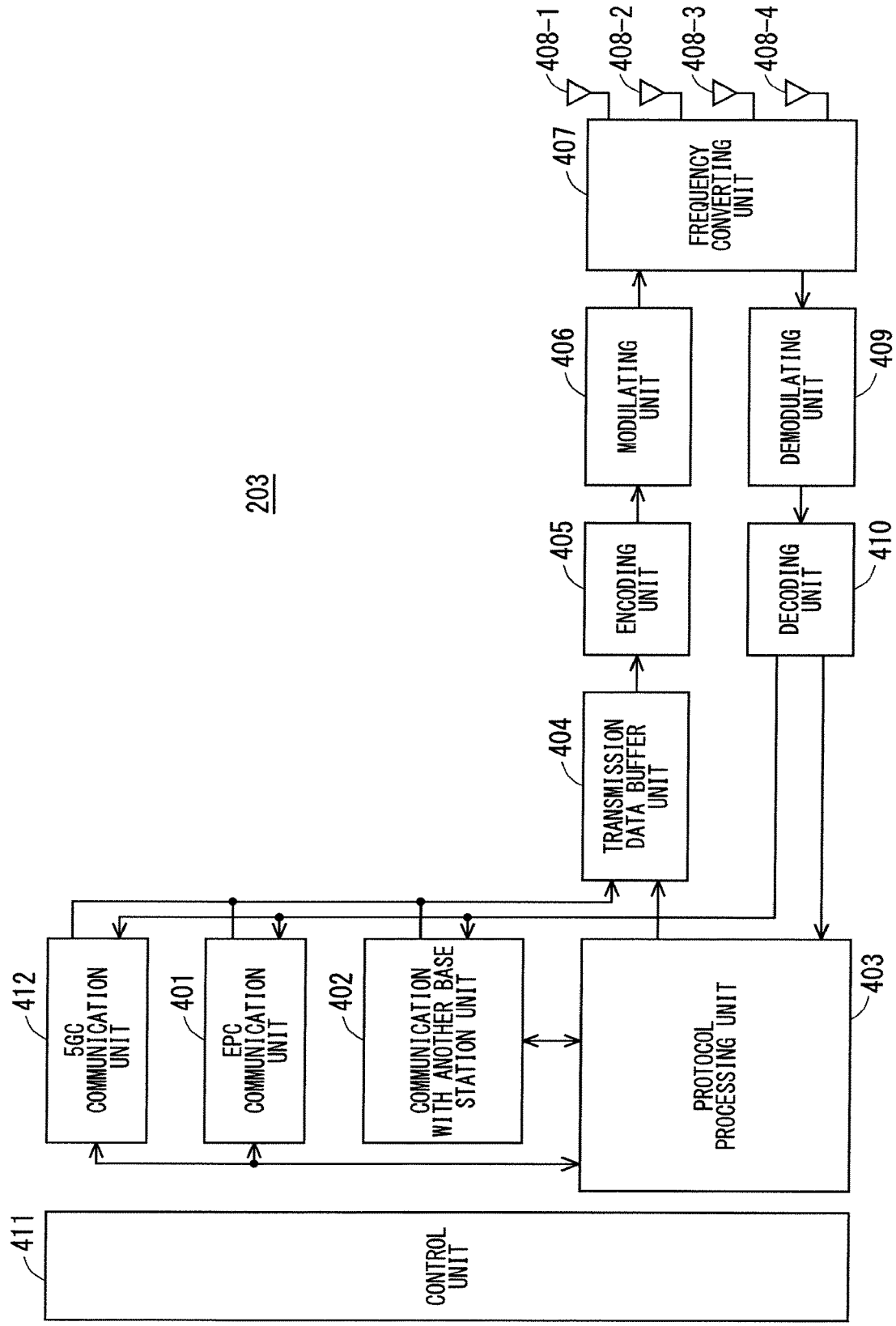
FIG. 9 is a block diagram showing the configuration of a base station 203 shown in FIG. 2.

FIG. 9 is a block diagram showing the configuration of the base station 203 of FIG. 2. The transmission process of the base station 203 shown in FIG. 9 is described. An EPC communication unit 401 performs data transmission and reception between the base station 203 and the EPC (such as the MME unit 204). A 5GC communication unit 412 transmits and receives data between the base station 203 and the 5GC (e.g., the 5GC unit 214). A communication with another base station unit 402 performs data transmission and reception to and from another base station. The EPC communication unit 401, the 5GC communication unit 412, and the communication with another base station unit 402 each transmit and receive information to and from a protocol processing unit 403. The control data from the protocol processing unit 403, and the user data and the control data from the EPC communication unit 401, the 5GC communication unit 412, and the communication with another base station unit 402 are stored in a transmission data buffer unit 404.

The data stored in the transmission data buffer unit 404 is passed to an encoding unit 405, and then an encoding process such as error correction is performed for the data. There may exist the data output from the transmission data buffer unit 404 directly to a modulating unit 406 without the encoding process. The encoded data is modulated by the modulating unit 406. The modulating unit 406 may perform precoding in the MIMO. The modulated data is converted into a baseband signal, and the baseband signal is output to a frequency converting unit 407 and is then converted into a radio transmission frequency. After that, transmission signals are transmitted from antennas 408-1 to 408-4 to one or a plurality of user equipments 202. Although FIG. 9 exemplifies a case where the number of antennas is four, the number of antennas is not limited to four.

The reception process of the base station 203 is executed as follows. A radio signal from one or a plurality of user equipments 202 is received through the antenna 408. The received signal is converted from a radio reception frequency into a baseband signal by the frequency converting unit 407, and is then demodulated by a demodulating unit 409. The demodulated data is passed to a decoding unit 410 and then subject to a decoding process such as error correction. Among the pieces of decoded data, the control data is passed to the protocol processing unit 403, the 5GC communication unit 412, the EPC communication unit 401, or the communication with another base station unit 402, and the user data is passed to the 5GC communication unit 412, the EPC communication unit 401 and the communication with another base station unit 402. A series of processes by the base station 203 is controlled by a control unit 411. This means that, though not shown in FIG. 9, the control unit 411 is connected to the individual units 401 to 410. In FIG. 9, the number of antennas for transmission of the base station 203 may be identical to or different from that for its reception.

Although FIG. 9 is the block diagram illustrating the configuration of the base station 203, the base station 213 may have the same configuration. Furthermore, in FIGS. 8 and 9, the number of antennas of the user equipment 202 may be identical to or different from that of the base station 203.

Figure 10:
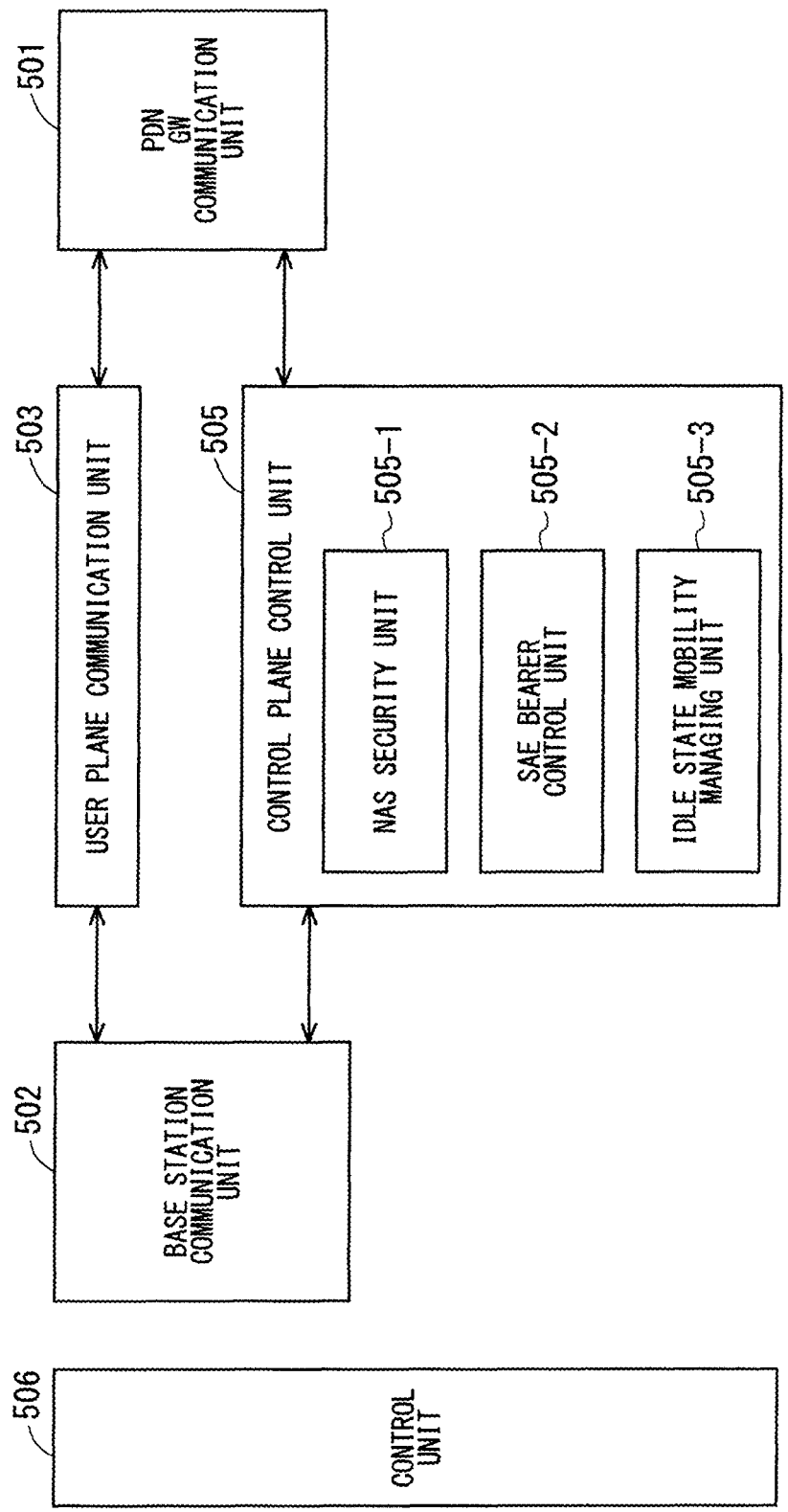
FIG. 10 is a block diagram showing the configuration of an MME.

FIG. 10 is a block diagram showing the configuration of the MME. FIG. 10 shows the configuration of an MME 204*a* included in the MME unit 204 shown in FIG. 2 described above. A PDN GW communication unit 501 performs data transmission and reception between the MME 204*a* and the PDN GW. A base station communication unit 502 performs data transmission and reception between the MME 204*a* and the base station 203 by means of the S1 interface. In a case where the data received from the PDN GW is user data, the user data is passed from the PDN GW communication unit 501 to the base station communication unit 502 via a user plane communication unit 503 and is then transmitted to one or a plurality of base stations 203. In a case where the data received from the base station 203 is user data, the user data is passed from the base station communication unit 502 to the PDN GW communication unit 501 via the user plane communication unit 503 and is then transmitted to the PDN GW.

In a case where the data received from the PDN GW is control data, the control data is passed from the PDN GW communication unit 501 to a control plane control unit 505. In a case where the data received from the base station 203 is control data, the control data is passed from the base station communication unit 502 to the control plane control unit 505.

The control plane control unit 505 includes a NAS security unit 505-1, an SAE bearer control unit 505-2, and an idle state mobility management unit 505-3, and performs an overall process for the control plane (hereinafter also referred to as a "C-plane"). The NAS security unit 505-1 provides, for example, security of a non-access stratum (NAS) message. The SAE bearer control unit 505-2 manages, for example, a system architecture evolution (SAE) bearer. The idle state mobility management unit 505-3 performs, for example, mobility management of an idle state (LTE-IDLE state which is merely referred to as idle as well), generation and control of a paging signal in the idle state, addition, deletion, update, and search of a tracking area of one or a plurality of user equipments 202 being served thereby, and tracking area list management.

The MME 204*a* distributes a paging signal to one or a plurality of base stations 203. In addition, the MME 204*a* performs mobility control of an idle state. When the user equipment is in the idle state and an active state, the MME 204*a* manages a list of tracking areas. The MME 204*a* begins a paging protocol by transmitting a paging message to the cell belonging to a tracking area in which the UE is registered. The idle state mobility management unit 505-3 may manage the CSG of the eNBs 207 to be connected to the MME 204*a*, CSG IDs, and a whitelist.

Figure 11:
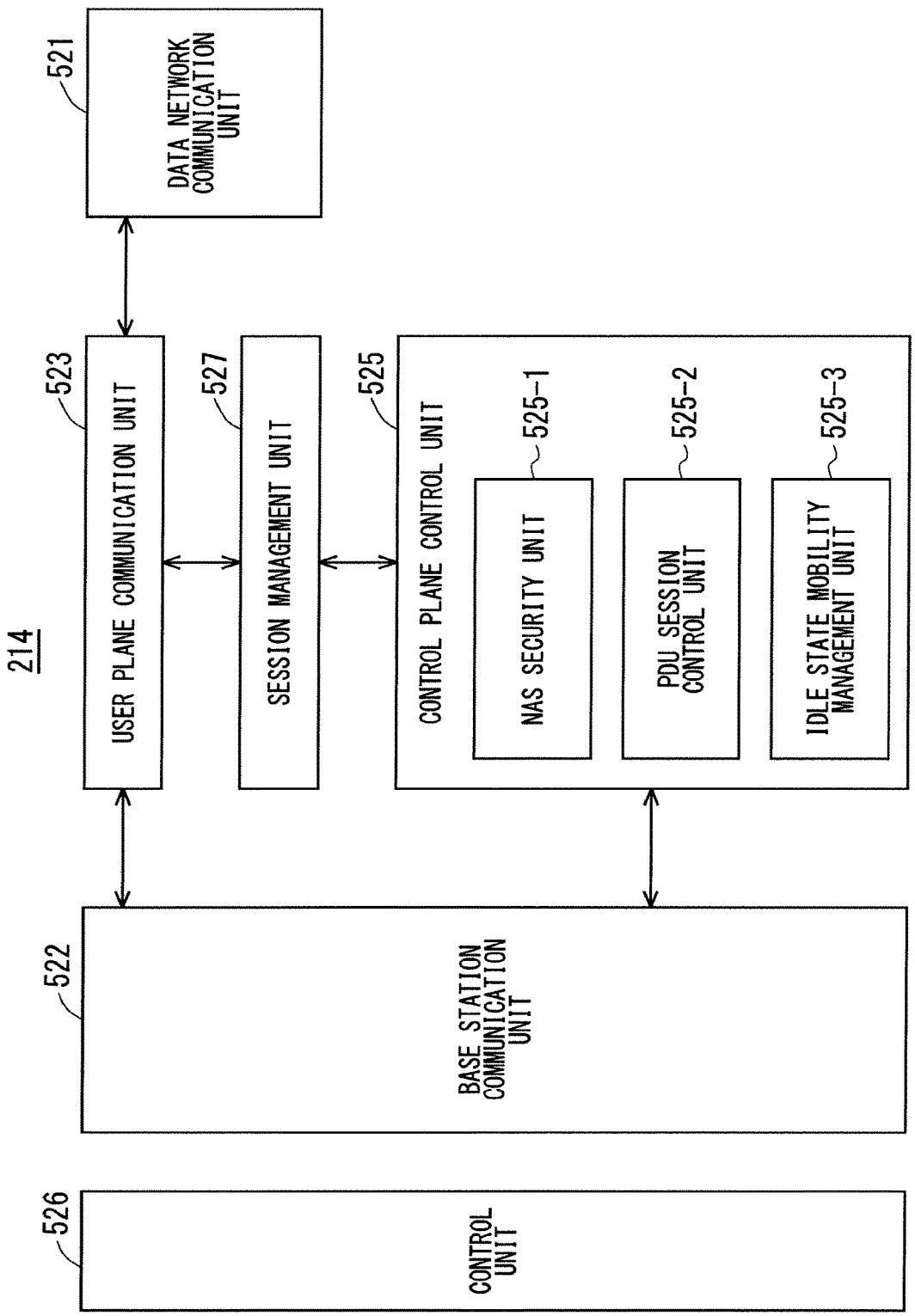
FIG. 11 is a block diagram illustrating a configuration of the 5GC.

FIG. 11 is a block diagram illustrating a configuration of the 5GC. FIG. 11 illustrates a configuration of the 5GC unit 214 in FIG. 3. FIG. 11 illustrates a case where the 5GC unit 214 in FIG. 5 includes configurations of the AMF, the SMF, and the UPF. A data network communication unit 521 transmits and receives data between the 5GC unit 214 and a data network. A base station communication unit 522 transmits and receives data via the S1 interface between the 5GC unit 214 and the base station 203 and/or via the NG interface between the 5GC unit 214 and the base station 213. When the data received through the data network is user data, the data network communication unit 521 passes the user data to the base station communication unit 522 through a user plane communication unit 523 to transmit the user data to one or more base stations, specifically, the base station 203 and/or the base station 213. When the data received from the base station 203 and/or the base station 213 is user data, the base station communication unit 522 passes the user data to the data network communication unit 521 through the user plane communication unit 523 to transmit the user data to the data network.

When the data received from the data network is control data, the data network communication unit 521 passes the control data through the user plane communication unit 523 to a session management unit 527. The session management unit 527 passes the control data to a control plane control unit 525. When the data received from the base station 203 and/or the base station 213 is control data, the base station communication unit 522 passes the control data to the control plane control unit 525. The control plane control unit 525 passes the control data to the session management unit 527.

The control plane control unit 525 includes, for example, a NAS security unit 525-1, a PDU session control unit 525-2, and an idle state mobility management unit 525-3, and performs overall processes on the control planes (may be hereinafter referred to as C-Planes). The NAS security unit 525-1, for example, provides security for a Non-Access Stratum (NAS) message. The PDU session control unit 525-2, for example, manages a PDU session between the user equipment 202 and the 5GC unit 214. The idle state mobility management unit 525-3, for example, manages mobility of an idle state (an RRC_IDLE state or simply referred to as idle), generates and controls paging signals in the idle state, and adds, deletes, updates, and searches for tracking areas of one or more user equipments 202 being served thereby, and manages a tracking area list.

The 5GC unit 214 distributes the paging signals to one or more base stations, specifically, the base station 203 and/or the base station 213. Furthermore, the 5GC unit 214 controls mobility of the idle state. The 5GC unit 214 manages the tracking area list when a user equipment is in an idle state, an inactive state, and an active state. The 5GC unit 214 starts a paging protocol by transmitting a paging message to a cell belonging to a tracking area in which the UE is registered.

Figure 12:
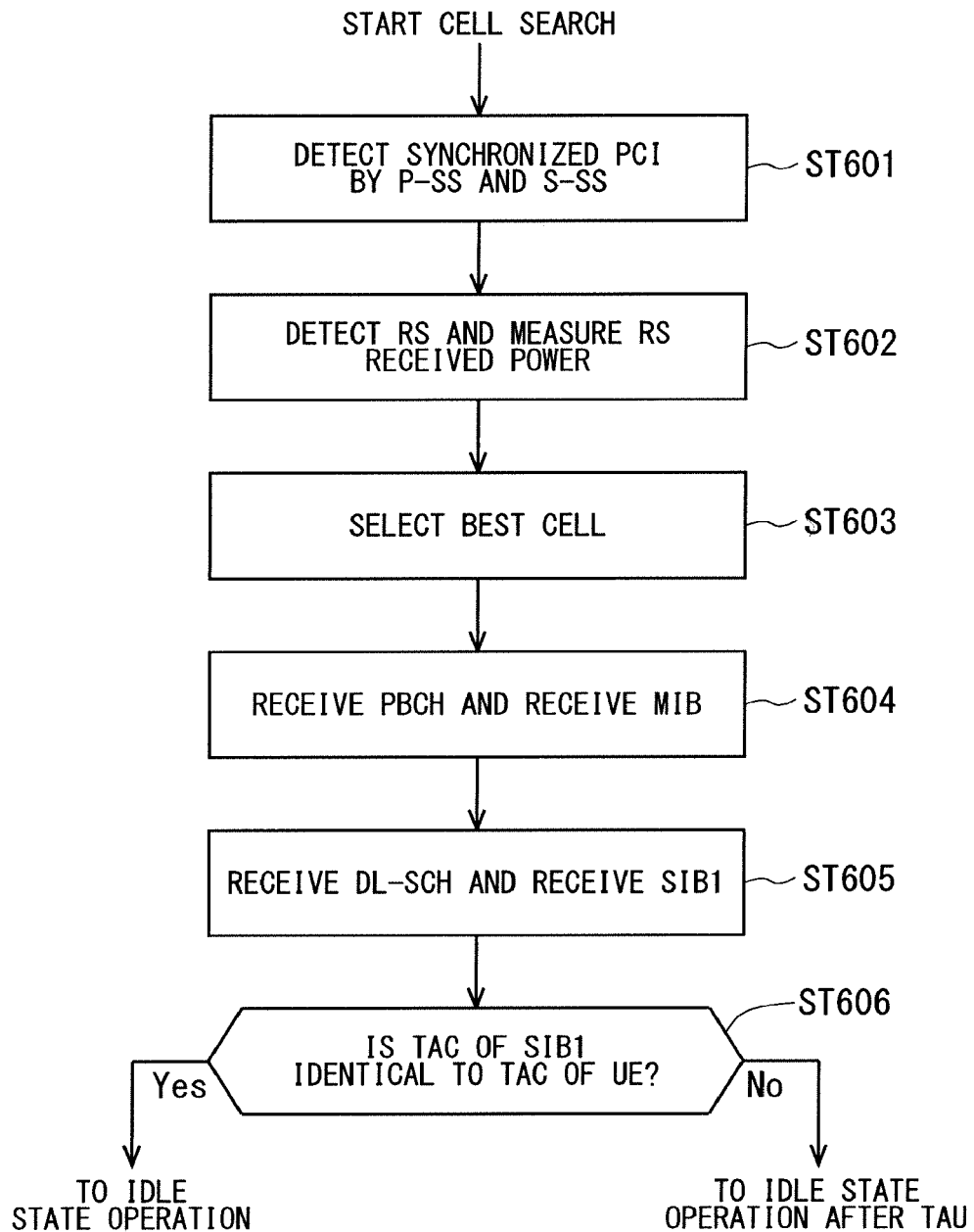
FIG. 12 is a flowchart illustrating an outline from cell search to idle state operation performed by a communication terminal (UE) in an LTE communication system.

An example of a cell search method in a mobile communication system is described next. FIG. 12 is a flowchart showing an outline from a cell search to an idle state operation performed by a communication terminal (UE) in the LTE communication system. When starting a cell search, in Step ST601, the communication terminal synchronizes slot timing and frame timing by a primary synchronization signal (P-SS) and a secondary synchronization signal (S-SS) transmitted from a neighbor base station.

The P-SS and S-SS are collectively referred to as a synchronization signal (SS). Synchronization codes, which correspond one-to-one to PCIs assigned per cell, are assigned to the synchronization signals (SSs). The number of PCIs is currently studied in 504 ways. The 504 ways of PCIs are used for synchronization, and the PCIs of the synchronized cells are detected (specified).

In Step ST602, next, the user equipment detects a cell-specific reference signal (CRS) being a reference signal (RS) transmitted from the base station per cell and measures the reference signal received power (RSRP). The codes corresponding one-to-one to the PCIs are used for the reference signal RS. Separation from another cell is enabled by correlation using the code. The code for RS of the cell is calculated from the PCI specified in Step ST601, so that the RS can be detected and the RS received power can be measured.

In Step ST603, next, the user equipment selects the cell having the best RS received quality, for example, the cell having the highest RS received power, that is, the best cell, from one or more cells that have been detected up to Step ST602.

In Step ST604, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as a transmission bandwidth configuration (dl-bandwidth)), the number of transmission antennas, and a system frame number (SFN).

In Step ST605, next, the user equipment receives the DL-SCH of the cell based on the cell configuration information of the MIB, to thereby obtain a system information block (SIB) 1 of the broadcast information BCCH. The SIB1 contains the information about the access to the cell, information about cell selection, and scheduling information on another SIB (SIBk; k is an integer equal to or greater than two). In addition, the SIB1 contains a tracking area code (TAC).

In Step ST606, next, the communication terminal compares the TAC of the SIB1 received in Step ST605 with the TAC portion of a tracking area identity (TAI) in the tracking area list that has already been possessed by the communication terminal. The tracking area list is also referred to as a TAI list. TAI is the identification information for identifying tracking areas and is composed of a mobile country code (MCC), a mobile network code (MNC), and a tracking area code (TAC). MCC is a country code. MNC is a network code. TAC is the code number of a tracking area.

If the result of the comparison of Step ST606 shows that the TAC received in Step ST605 is identical to the TAC included in the tracking area list, the user equipment enters an idle state operation in the cell. If the comparison shows that the TAC received in Step ST605 is not included in the tracking area list, the communication terminal requires a core network (EPC) including MME to change a tracking area through the cell for performing tracking area update (TAU).

Although FIG. 12 exemplifies the operations from the cell search to the idle state in LTE, the best beam may be selected in NR in addition to the best cell in Step ST603. In NR, information on a beam, for example, an identifier of the beam may be obtained in Step ST604. Furthermore, scheduling information on the Remaining Minimum SI (RMSI) in NR may be obtained in Step ST604. The RMSI in NR may be obtained in Step ST605.

The device configuring a core network (hereinafter, also referred to as a "core-network-side device") updates the tracking area list based on an identification number (such as UE-ID) of a communication terminal transmitted from the communication terminal together with a TAU request signal. The core-network-side device transmits the updated tracking area list to the communication terminal. The communication terminal rewrites (updates) the TAC list of the communication terminal based on the received tracking area list. After that, the communication terminal enters the idle state operation in the cell.

Widespread use of smartphones and tablet terminal devices explosively increases traffic in cellular radio communications, causing a fear of insufficient radio resources all over the world. To increase spectral efficiency, thus, it is studied to downsize cells for further spatial separation.

In the conventional configuration of cells, the cell configured by an eNB has a relatively-wide-range coverage. Conventionally, cells are configured such that relatively-wide-range coverages of a plurality of cells configured by a plurality of macro eNBs cover a certain area.

When cells are downsized, the cell configured by an eNB has a narrow-range coverage compared with the coverage of a cell configured by a conventional eNB. Thus, in order to cover a certain area as in the conventional case, a larger number of downsized eNBs than the conventional eNBs are required.

In the description below, a "macro cell" refers to a cell having a relatively wide coverage, such as a cell configured by a conventional eNB, and a "macro eNB" refers to an eNB configuring a macro cell. A "small cell" refers to a cell having a relatively narrow coverage, such as a downsized cell, and a "small eNB" refers to an eNB configuring a small cell.

The macro eNB may be, for example, a "wide area base station" described in Non-Patent Document 7.

The small eNB may be, for example, a low power node, local area node, or hotspot. Alternatively, the small eNB may be a pico eNB configuring a pico cell, a femto eNB configuring a femto cell, HeNB, remote radio head (RRH), remote radio unit (RRU), remote radio equipment (RRE), or relay node (RN). Still alternatively, the small eNB may be a "local area base station" or "home base station" described in Non-Patent Document 7.

Figure 13:
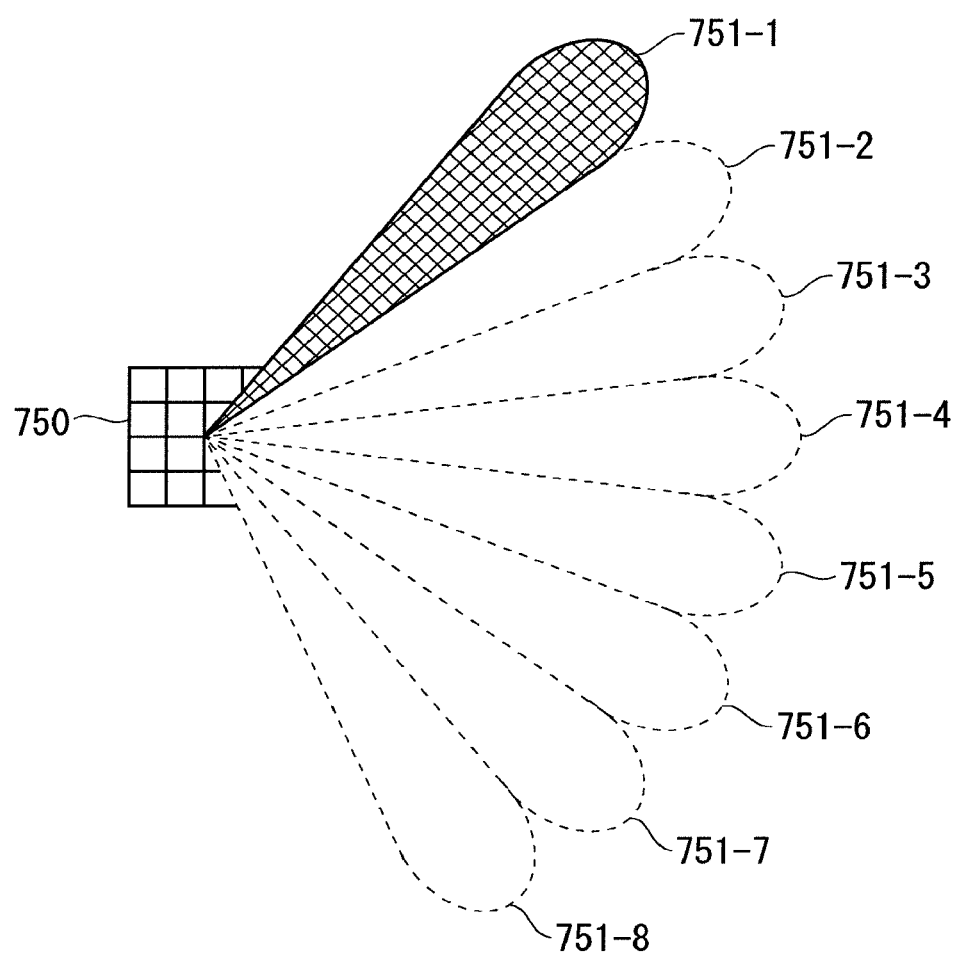
FIG. 13 illustrates an example structure of a cell in an NR system.

FIG. 13 illustrates an example structure of a cell in NR. In the cell in NR, a narrow beam is formed and transmitted in a changed direction. In the example of FIG. 13, a base station 750 performs transmission and reception with a user equipment via a beam 751-1 at a certain time. The base station 750 performs transmission and reception with the user equipment via a beam 751-2 at another time. Similarly, the base station 750 performs transmission and reception with the user equipment via one or more of beams 751-3 to 751-8. As such, the base station 750 configures a cell with a wide range.

Although FIG. 13 exemplifies that the number of beams to be used by the base station 750 is eight, the number of beams may be different from eight. Although FIG. 13 also exemplifies that the number of beams to be simultaneously used by the base station 750 is one, the number of such beams may be two or more.

In 3GPP, for device to device (D2D) communication and vehicle to vehicle (V2V) communication, a sidelink (side link (SL)) is supported (see Non-Patent Document 1 and Non-Patent Document 16). The SL is defined by a PC5 interface.

Physical channels (see Non-Patent Document 1) used for the SL will be described. A physical sidelink broadcast channel (PSBCH) carries information related to a system and synchronization, and is transmitted from the UE.

A physical sidelink discovery channel (PSDCH) carries a sidelink discovery message from the UE.

A physical sidelink control channel (PSCCH) carries control information from the UE for sidelink communication and V2X sidelink communication.

A physical sidelink shared channel (PSSCH) carries data from the UE for sidelink communication and V2X sidelink communication.

A physical sidelink feedback channel (PSFCH) carries HARQ feedback on the sidelink from the UE that has received transmission of the PSSCH to the UE that has transmitted the PSSCH.

Transport channels (see Non-Patent Document 1) used for the SL will be described. A sidelink broadcast channel (SL-BCH) has a predetermined transport format, and is mapped to the PSBCH being a physical channel.

A sidelink discovery channel (SL-DCH) has cyclic broadcast transmission of a predetermined format having a fixed size. Further, the SL-DCH supports both of UE autonomous resource selection and resource allocation that is scheduled by the eNB. In UE autonomous resource selection, there is a collision risk, and when the UE is allocated individual resources by the eNB, there is no collision. Further, the SL-DCH supports HARQ combining, but does not support HARQ feedback. The SL-DCH is mapped to the PSDCH being a physical channel.

A sidelink shared channel (SL-SCH) supports broadcast transmission. The SL-SCH supports both of UE autonomous resource selection and resource allocation that is scheduled by the eNB. In UE autonomous resource selection, there is a collision risk, and when the UE is allocated individual resources by the eNB, there is no collision. Further, the SL-SCH supports HARQ combining, but does not support HARQ feedback. Further, the SL-SCH supports dynamic link adaptation by changing transmission power, modulation, and coding. The SL-SCH is mapped to the PSSCH being a physical channel.

Logical channels (see Non-Patent Document 1) used for the SL will be described. A sidelink broadcast control channel (SBCCH) is a sidelink channel for broadcasting sidelink system information from one UE to another UE. The SBCCH is mapped to the SL-BCH being a transport channel.

A sidelink traffic channel (STCH) is a one-to-many sidelink traffic channel for transmitting user information from one UE to another UE. The STCH is used only by a UE having sidelink communication capability and a UE having V2X sidelink communication capability. One-to-one communication between UEs having two sidelink communication capabilities is also implemented on the STCH. The STCH is mapped to the SL-SCH being a transport channel.

A sidelink control channel (SCCH) is a sidelink control channel for transmitting control information from one UE to another UE. The SCCH is mapped to the SL-SCH being a transport channel.

In 3GPP, supporting the V2X communication is studied in NR as well. The study of the V2X communication in NR is carried out on the basis of the LTE system and the LTE-A system. Changes and additions are made from the LTE system and the LTE-A system in the following aspects.

In LTE, only broadcast is supported in the SL communication. In NR, as the SL communication, support of unicast and groupcast in addition to broadcast is studied (see Non-Patent Document 21 (TS 23.287)).

In the unicast communication and the groupcast communication, support of feedback of the HARQ (Ack/Nack), a CSI report, and the like is studied.

In order to support unicast and groupcast in addition to broadcast in the SL communication, support of PC5-S signaling is studied (see Non-Patent Document 21 (TS 23.287)). For example, in order to establish the SL, in other words, a link for performing PC5 communication, the PC5-S signaling is performed. The link is performed in a V2X layer, and is also referred to as a layer 2 link.

Further, in the SL communication, support of RRC signaling is studied (see Non-Patent Document 21 (TS 23.287)). The RRC signaling in the SL communication is also referred to as PC5 RRC signaling. For example, reporting capability of the UE and reporting a configuration of an AS layer for performing the V2X communication by using the PC5 communication or the like between the UEs performing the PC5 communication are proposed.

The UE may request a serving base station to configure or change a measurement gap. The request may be, for example, performed in positioning using Multi-RTT. The serving base station may determine the measurement gap of the UE, using the request. The serving base station may instruct the UE to configure the measurement gap. The UE may configure the measurement gap, using the instruction from the serving base station. The UE may transmit and receive a positioning signal to and from the serving base station and neighboring base stations, using the configured measurement gap.

In the above description, the following problem occurs. In other words, the request for configuration or change of the measurement gap is performed after positioning has started, in other words, after a positioning signal transmission and reception request from the LMF to the UE, and thus latency in positioning is increased.

A solution to the problem described above will be disclosed.

The serving base station performs an instruction to configure the measurement gap of the UE without waiting for the request from the UE. The UE may not request the configuration or the change of the measurement gap. The UE may configure the measurement gap, using the instruction.

The serving base station acquires information related to the positioning signal of the neighboring base station. The positioning signal may be, for example, a PRS. The information related to the positioning signal may be, for example, information related to time and/or frequency resources in which the positioning signal is transmitted. The serving base station may determine the measurement gap of the UE, using the information. The serving base station may, for example, configure the measurement gap so that the UE can receive the positioning signals of all of the base stations used for positioning of the UE. The serving base station instructs the UE to configure the determined measurement gap. The UE may configure the measurement gap, using the instruction. This eliminates the need of processing of determining the measurement gap in the UE, for example, and as a result, the amount of processing in the UE can be reduced.

The serving base station may acquire the information from the LMF. The LMF may notify the serving base station of the information related to the positioning signal of the neighboring base station. For the notification from the LMF to the serving base station, for example, NRPPa MEASUREMENT REQUEST disclosed in Non-Patent Document 22 (TS 38.305 V16.0.0) may be used. The LMF may include the information related to the positioning signal of the neighboring base station in the notification to the serving base station. With this, for example, the amount of signaling between the LMF and the serving base station can be reduced.

As another example, new signaling (for example, NPPa NRPPa MEASUREMENT REQUEST for serving gNB) may be provided for the notification. With this, for example, signaling for the neighboring base station and signaling for the serving base station can be distinguished from each other, and as a result, complexity in the communication system can be avoided.

As another example, NRPPa POSITIONING INFORMATION REQUEST disclosed in Non-Patent Document 22 (TS 38.305) may be used for the notification. With this, for example, the serving base station can promptly acquire the information related to the positioning signal of the neighboring base station.

As another example, the notification may be executed during a procedure of NRPPa DL PRS CONFIGURATION INFORMATION EXCHANGE disclosed in Non-Patent Document 22 (TS 38.305). With this, for example, the serving base station can further promptly acquire the information related to the positioning signal of the neighboring base station. The notification may be performed from the neighboring base station to the serving base station directly, or may be performed from the neighboring base station to the serving base station via the LMF. The notification may be performed from the LMF to the serving base station. The serving base station may request the neighboring base station to perform the notification. The request may be performed from the serving base station to the neighboring base station directly, or may be performed from the serving base station to the neighboring base station via the serving base station. The request may be performed from the LMF to the neighboring base station.

As the information related to the positioning signal of the neighboring base station, the following (1) to (5) are disclosed:
  (1) Information related to the neighboring base station;
  (2) Information related to a type of the positioning signal;
  (3) Information related to a configuration of the positioning signal;
  (4) Information related to frame timing of the neighboring base station;
  (5) Combination of (1) to (4) above.

For example, the information related to (1) above may be an identifier of the base station, or may be an identifier of a cell of the base station. For example, the identifier of a cell may be a PCI, or may be a global cell ID. The serving base station may recognize the base station or the cell used for positioning of the UE by using the information. With this, for example, complexity of the processing of determining the measurement gap of the UE in the serving base station can be avoided.

For example, the information related to (2) above may be a PRS, may be an SS block, may be a CSI-RS, or may be a DM-RS. The serving base station may recognize the type of the positioning signal used for positioning of the UE by using the information. With this, for example, complexity of the processing of determining the measurement gap of the UE in the serving base station can be avoided.

For example, the information related to (3) above may be information related to time and/or frequency resources for the positioning signal. The information may include information related to a slot, a subframe, and/or a frame for the base station to transmit the positioning signal. The serving base station may acquire the information related to time and/or frequency resources for the positioning signal of the neighboring base station by using the information. With this, for example, the serving base station can promptly execute determination of the measurement gap of the UE.

For example, the information related to (4) above may be information related to a difference of frame timings between the neighboring base station and the serving base station. The information may be, for example, given using a unit of frames, a unit of subframes, a unit of slots, a unit of symbols, a basic unit of time in NR (for example, Tc described in Non-Patent Document 13 (TS 38.211)), and/or a basic unit of time in LTE (for example, Ts described in Non-Patent Document 13 (TS 38.211)). As another example, the information may be information in which a predetermined frame, subframe, slot, and/or symbol in the neighboring base station and time are associated with each other. The associated information may be, for example, time at the start or the end of a predetermined frame. With the information, information of a frame number in the neighboring base station may be used in combination. With this, for example, the serving base station can recognize timing of transmission and reception of the positioning signal to and from the neighboring base station.

Figure 15:
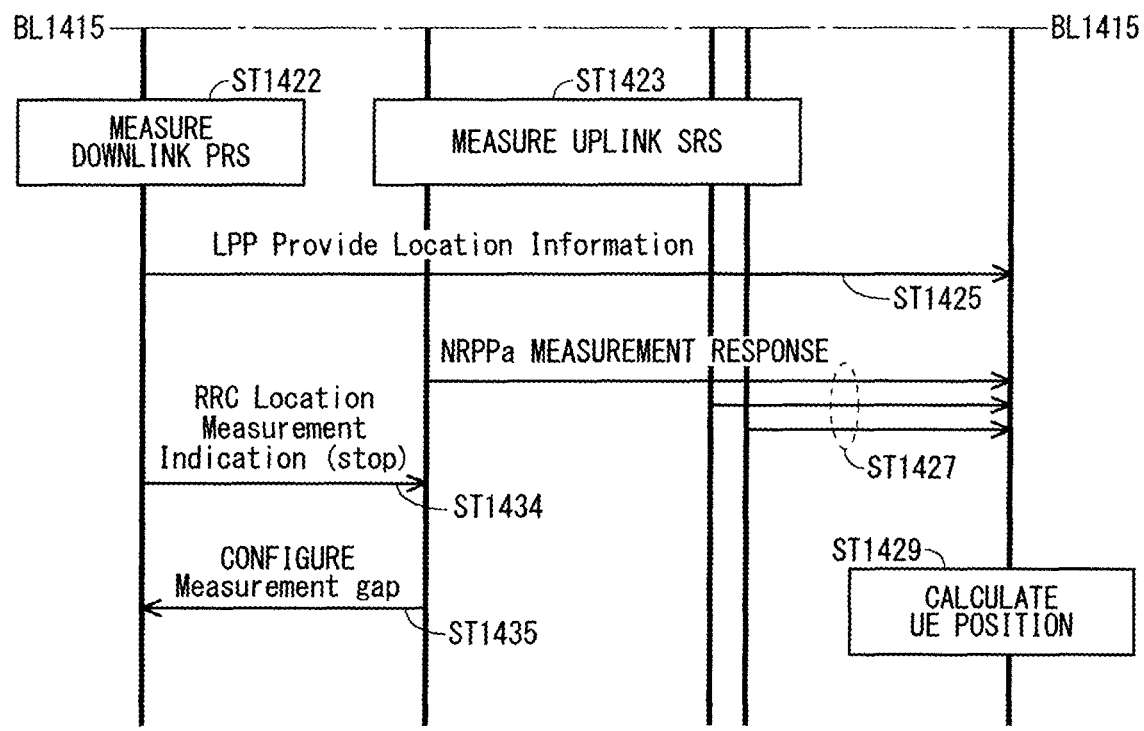
FIG. 15 is a sequence diagram illustrating the first example of the operation of positioning when the serving base station configures the measurement gap for the UE without waiting for the measurement gap change request from the UE according to the first embodiment.

FIG. 14 and FIG. 15 are sequences illustrating a first example of operation of positioning when the serving base station configures the measurement gap for the UE without waiting for a measurement gap change request from the UE. FIG. 14 and FIG. are connected at the position of a boundary line BL1415. FIG. 14 and FIG. 15 illustrate a case of Multi-RTT. FIG. 14 and FIG. 15 illustrate an example in which the LMF notifies the serving base station of information related to the neighboring base station. FIG. 14 and FIG. 15 illustrate an example in which the serving base station is a serving gNB/TRP and the neighboring base station is a neighboring gNB/TRP. FIG. 14 and FIG. 15 illustrate an example in which a PRS is used as a downlink positioning signal, and an SRS is used as an uplink positioning signal.

In Step ST1401 illustrated in FIG. 14, information related to a configuration of a PRS is exchanged between the LMF, the serving base station, and the neighboring base station.

The LMF may request the information related to the configuration of the PRS from the serving base station and/or the neighboring base station. The serving base station and/or the neighboring base station may notify the LMF of the information. For the request and/or the notification, for example, signaling of NRPPa Message described in Non-Patent Document 22 (TS 38.305) may be used. In the notification from the serving base station and/or the neighboring base station to the LMF, for example, information disclosed in table 8.10.2.3-1 of Non-Patent Document 22 (TS 38.305) may be included.

In Step ST1403 illustrated in FIG. 14, information related to capability of positioning is exchanged between the LMF and the UE. The LMF may request the information related to the capability of positioning from the UE. The UE may notify the IMF of the information. For the request and/or the notification, for example, signaling of LPP Request Capabilities and/or LPP Provide Capabilities described in Section 7.1.2.1 of Non-Patent Document 29 (TS 36.305) and Non-Patent Document 24 (TS 37.355) may be used.

In the notification from the LMF to the UE in ST1403 illustrated in FIG. 14, for example, information related to whether or not position calculation in the UE can be performed may be included. With this, for example, latency of positioning can be reduced. The information may be provided for each positioning method (for example, Multi-RTT, Downlink-Time Difference of Arrival (DL-TDOA)). With this, for example, flexibility of the communication system can be enhanced.

In Step ST1405 illustrated in FIG. 14, the LMF requests information related to an uplink SRS from the serving base station. For the request, for example, signaling of NRPPa POSITIONING INFORMATION REQUEST disclosed in Non-Patent Document 22 (TS 38.305) may be used.

In Step ST1407 illustrated in FIG. 14, the serving base station may determine information related to SRS transmission resources of the UE. For example, the SRS transmission resources described above may be frequency resources, may be time resources, may be information related to a code sequence, or may be a combination of the plurality of pieces of information described above. In Step ST1409, the serving base station instructs the UE to configure the SRS transmission resources. For the instruction, for example, signaling of RRCRecongifuration may be used. SRS transmission configured for the UE may be periodic SRS transmission, may be semi-persistent SRS transmission, or may be aperiodic SRS transmission. The UE may perform the configuration of the SRS by using the instruction.

In Step ST1411 illustrated in FIG. 14, the serving base station notifies the LMF of the information related to the uplink SRS. For the notification, for example, signaling of NRPPa POSITIONING INFORMATION RESPONSE disclosed in Non-Patent Document 22 (TS 38.305) may be used.

In Step ST1413 illustrated in FIG. 14, the serving base station instructs the UE to activate the SRS transmission. The instruction may be performed using RRC signaling, may be performed using MAC signaling, or may be performed using L1/L2 signaling. The UE starts the SRS transmission, using the instruction.

In Step ST1414 illustrated in FIG. 14, the LMF performs a positioning signal measurement request to the serving base station. In the request, information related to the neighboring base station may be included. For the request, for example, NRPPa signaling may be used. For the NRPPa signaling, new signaling (for example, NRPPa MEASUREMENT REQUEST for serving gNB) may be used, or NRPPa MEASUREMENT REQUEST disclosed in Non-Patent Document 22 (TS 38.305 V16.0.0) may be used. In the signaling of NRPPa MEASUREMENT REQUEST, the information related to the neighboring base station may be included.

In Step ST1415 illustrated in FIG. 14, the LMF performs a positioning signal measurement request to the neighboring base station. For the request, for example, NRPPa signaling may be used. For the NRPPa signaling, for example, NRPPa MEASUREMENT REQUEST disclosed in Non-Patent Document 22 (TS 38.305 V16.0.0) may be used.

In Step ST1417 illustrated in FIG. 14, the serving base station instructs the UE to configure the measurement gap. The serving base station may, for example, determine the configuration of the measurement gap of the UE by using the information related to the neighboring base station acquired in Step ST1414. The UE configures the measurement gap of the UE itself, using Step ST1417.

In Step ST1419 illustrated in FIG. 14, the LMF notifies the UE of information used in positioning. For example, the information may be information related to a downlink PRS of the serving base station and/or the neighboring base station, may be information related to frame timing, or may be a combination of the above description. For the notification of the information, for example, LPP signaling may be used. The LPP signaling may be, for example, LPP Provide Assistance Data disclosed in Non-Patent Document 22 (TS 38.305 V16.0.0).

In Step ST1421 illustrated in FIG. 14, the LMF requests the UE to perform positioning. For the request, for example, LPP signaling may be used. The LPP signaling may be, for example, LPP Request Location Information disclosed in Non-Patent Document 22 (TS 38.305 V16.0.0). The UE performs measurement processing of the PRS, using the request.

In Step ST1422 illustrated in FIG. 15, the UE performs reception processing of a PRS signal from the serving base station and/or the neighboring base station. In Step ST1423, the serving base station and/or the neighboring base station performs reception processing of an SRS signal from the UE.

In Step ST1425 illustrated in FIG. 15, the UE notifies the LMF of information related to reception results of the positioning signal. For the notification, for example, LPP signaling may be used. The LPP signaling may be, for example, LPP Provide Location Information disclosed in Non-Patent Document 22 (TS 38.305 V16.0.0).

In Step ST1427 illustrated in FIG. 15, the serving base station and/or the neighboring base station notifies the LMF of the information related to the reception results of the positioning signal. For the notification, for example, NRPPa signaling may be used. For the NRPPa signaling, for example, NRPPa MEASUREMENT RESPONSE disclosed in Non-Patent Document 22 (TS 38.305) may be used. In Step ST1429, the LMF calculates the position of the UE.

In Step ST1434 illustrated in FIG. 15, the UE requests the serving base station to change the measurement gap. The request may be a request for bringing the measurement gap to the configuration before the positioning. For the request, RRC signaling, for example, RRC Location Measurement Indication disclosed in Non-Patent Document 22 (TS 38.305), may be used. In the request, information related to stop of the measurement gap for positioning may be included. In Step ST1435, the serving base station may instruct the UE to configure the measurement gap. In Step ST1435, the same signaling as that of Step ST1417 may be used.

FIG. 14 and FIG. 15 illustrate an example in which the LMF notifies the serving base station of the information related to the neighboring base station in Step ST1414; however, the LMF may notify the serving base station of the information in Step ST1405. For example, the LMF may include the information related to the neighboring base station in the signaling of NRPPa POSITIONING INFORMATION REQUEST disclosed in Non-Patent Document 22 (TS 38.305) to notify the serving base station of the information. Instead of the signaling of Step ST1414, the LMF may transmit the same signaling as that of Step ST1415 to the serving base station. With this, for example, complexity related to communication signaling can be avoided.

FIG. 14 and FIG. 15 illustrate an example in which the LMF notifies the serving base station of the information related to the neighboring base station in Step ST1414; however, the notification of the information related to the neighboring base station to the serving base station may be performed in Step ST1401. In this case, instead of the processing of Step ST1414, the processing of Step ST1415 may be performed from the LMF to the serving base station. With this, for example, the serving base station can promptly acquire the information related to the neighboring base station.

FIG. 14 and FIG. 15 illustrate an example in which the serving base station instructs the UE to configure the measurement gap in Step ST1417; however, Step ST1417 may be performed after Step ST1419, or may be performed after Step ST1421. With this, for example, transmission in Step ST1419 and/or Step ST1421 can be performed before the measurement gap change. As a result, complexity in the communication system can be avoided.

FIG. 14 and FIG. 15 illustrate a case in which the serving base station performs calculation of the measurement gap; however, the LMF may perform calculation of the measurement gap. The LMF may notify the serving base station of information related to the determined measurement gap. For the notification from the LMF to the serving base station, for example, signaling of NRPPa MEASUREMENT REQUEST for serving gNB may be used, or new signaling may be provided. With this, for example, the amount of processing in the serving base station can be reduced.

As another example in which the serving base station acquires the information related to the positioning signal of the neighboring base station, the serving base station may acquire the information from the neighboring base station. The neighboring base station may notify the serving base station of the information related to the positioning signal of the neighboring base station. The notification may be performed using an inter-base station interface, for example, an Xn interface. Alternatively, the notification may be performed via an AMF, for example, by using an N2 interface. With this, for example, the amount of processing in the LMF can be reduced.

Figure 16:
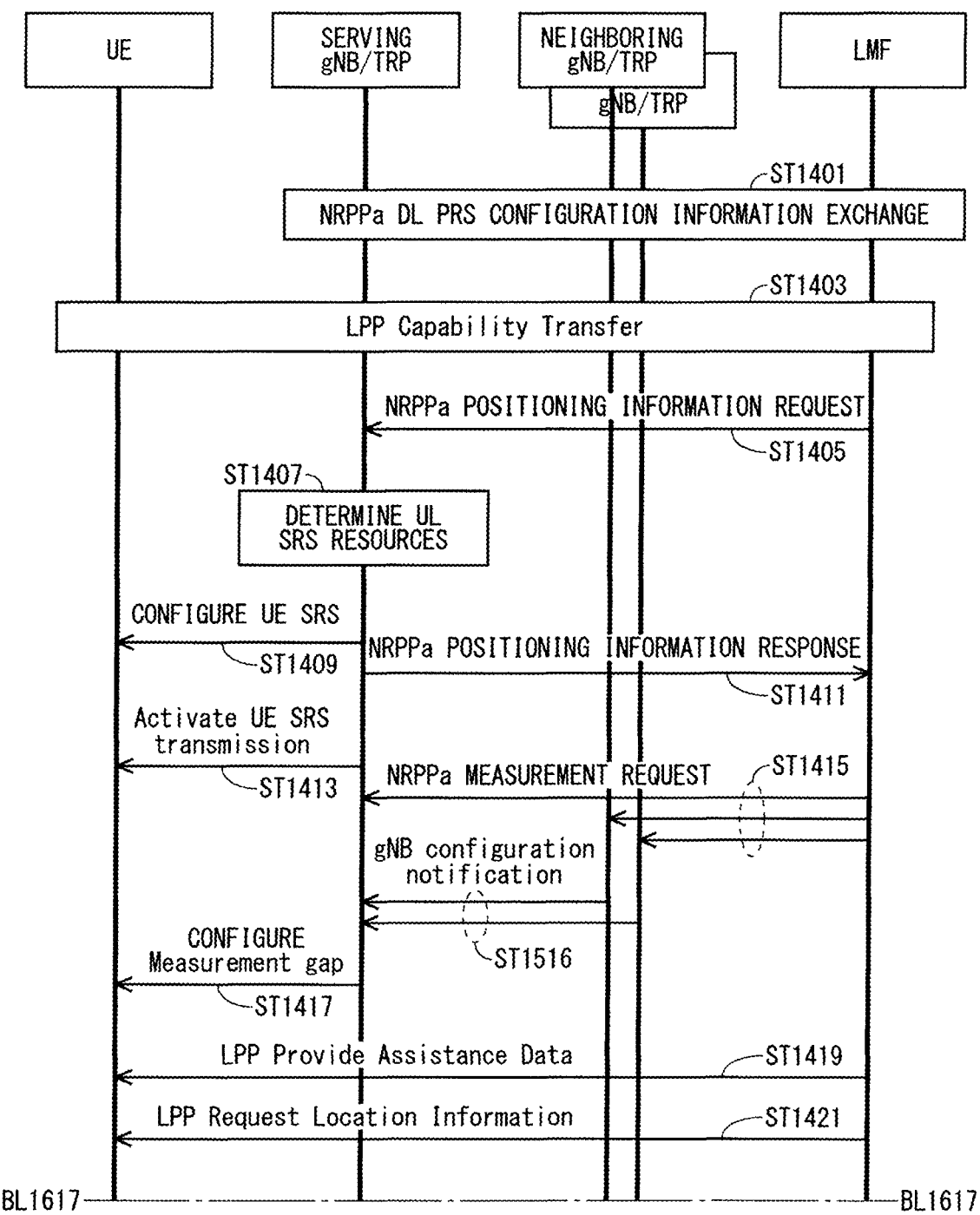
FIG. 16 is a sequence diagram illustrating a second example of operation of positioning when the serving base station configures the measurement gap for the UE without waiting for the measurement gap change request from the UE according to the first embodiment.
Figure 17:
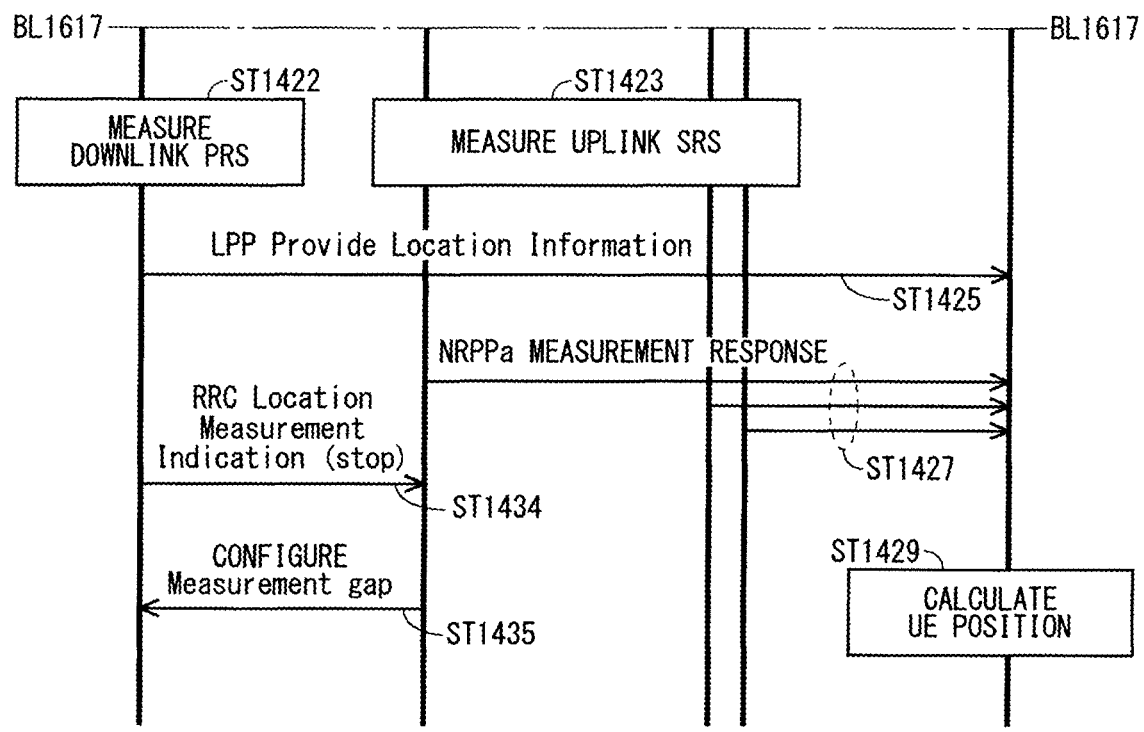
FIG. 17 is a sequence diagram illustrating the second example of the operation of positioning when the serving base station configures the measurement gap for the UE without waiting for the measurement gap change request from the UE according to the first embodiment.

FIG. 16 and FIG. 17 are sequences illustrating a second example of operation of positioning when the serving base station configures the measurement gap for the UE without waiting for a measurement gap change request from the UE. FIG. 16 and FIG. 17 are connected at the position of a boundary line BL1617. FIG. 16 and FIG. 17 illustrate a case in which Multi-RTT is performed. In FIG. 16 and FIG. 17, the same processes as those of FIG. 14 and FIG. 15 are denoted by the same step numbers, and common description will be omitted.

Steps ST1401 to ST1413 illustrated in FIG. 16 are the same as those of FIG. 14.

In Step ST1415 illustrated in FIG. 16, the LMF performs a positioning signal measurement request to the serving base station and the neighboring base station. For the request, the same signaling as that of Step ST1415 in FIG. 14 may be used.

In Step ST1516 illustrated in FIG. 16, the neighboring base station notifies the serving base station of information related to the base station itself. For the notification, for example, Xn signaling may be provided. The Xn signaling may be newly provided (for example, gNB configuration notification). The serving base station may acquire information related to the neighboring base station, using the information.

Steps ST1417 to ST1435 illustrated in FIG. 16 and FIG. 17 are the same as those of FIG. 14 and FIG. 15.

The base station may include the LMF. The base station including the LMF may be, for example, the serving base station. The serving base station may derive the position of the UE by using measurement results from the UE and/or the neighboring base station.

Figure 18:
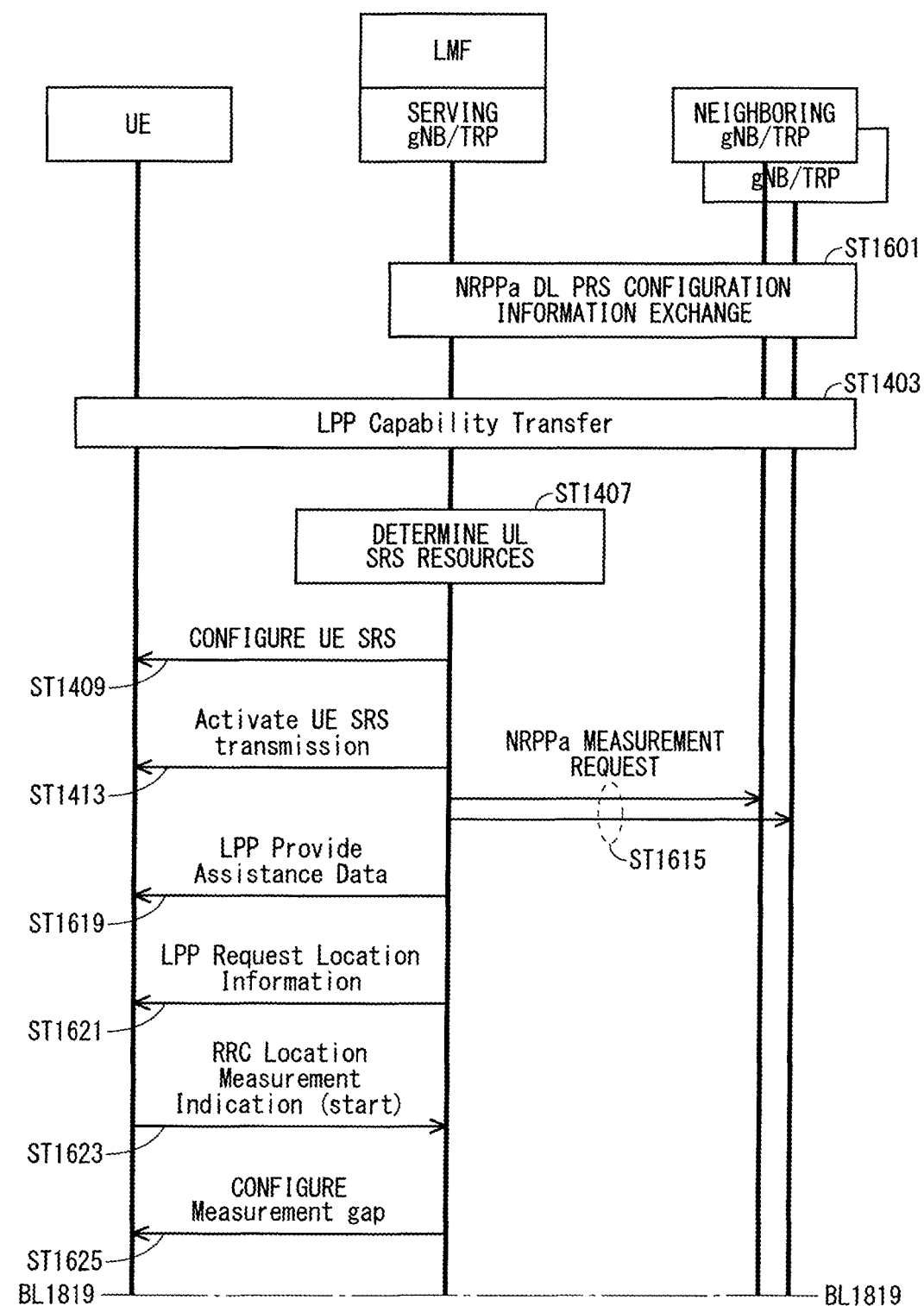
FIG. 18 is a sequence diagram illustrating operation of Multi-RTT when the serving base station includes an LMF according to the first embodiment.
Figure 19:
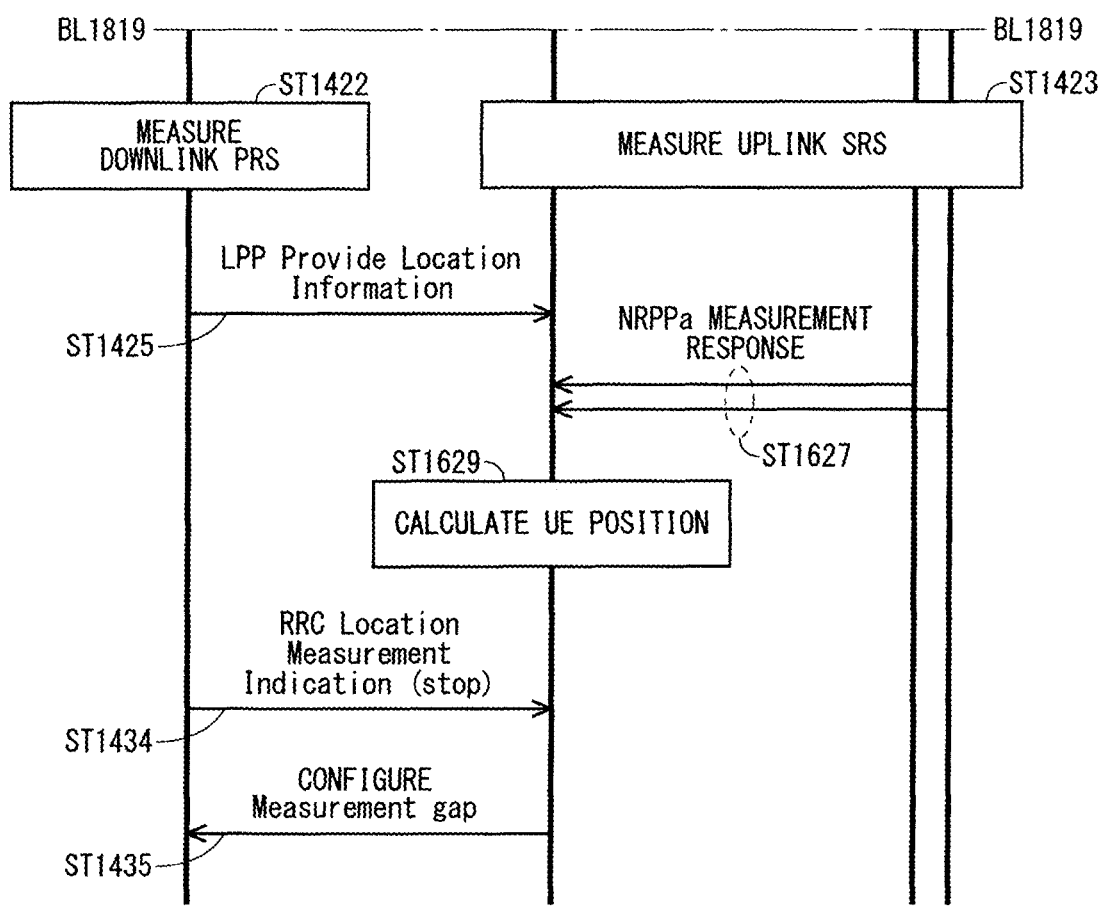
FIG. 19 is a sequence diagram illustrating the operation of Multi-RTT when the serving base station includes the LMF according to the first embodiment.

FIG. 18 and FIG. 19 are sequence diagrams illustrating operation of Multi-RTT when the serving base station includes the LMF. FIG. 18 and FIG. 19 are connected at the position of a boundary line BL1819. FIG. 18 and FIG. 19 illustrate an example in which the UE requests the base station to configure the measurement gap for positioning, and the base station instructs the UE to configure the measurement gap. In FIG. 18 and FIG. 19, the same processes as those of FIG. 14 to FIG. 17 are denoted by the same step numbers, and common description will be omitted.

In Step ST1601 in FIG. 18, information related to a configuration of a PRS is exchanged between the serving base station and the neighboring base station. Information related to the neighboring base station may be exchanged, or the plurality of pieces of information described above may be exchanged. The serving base station may request the information from the neighboring base station. The neighboring base station may notify the serving base station of the information. For the request and/or the notification, for example, signaling of NRPPa Message described in Non-Patent Document 22 (TS 38.305) may be used, or Xn signaling may be used. In the notification from the neighboring base station to the serving base station, for example, information disclosed in table 8.10.2.3-1 of Non-Patent Document 22 (TS 38.305) may be included.

Step ST1403 in FIG. 18 is the same as that of FIG. 14. In Step ST1403 in FIG. 18, information related to capability of positioning may be exchanged between the serving base station and the UE. For the signaling of Step ST1403 in FIG. 18, LPP signaling may be used as in the case of the signaling of Step ST1403 in FIG. 14. The LPP signaling of Step ST1403 in FIG. 18 may be notified on RRC signaling.

In FIG. 18, the processing of Step ST1405 in FIG. 14 may not be performed. Steps ST1407 and ST1409 in FIG. 18 are the same as those of FIG. 14.

In FIG. 18, the processing of Step ST1411 in FIG. 14 may not be performed. Step ST1413 in FIG. 16 is the same as that of FIG. 14.

In Step ST1615 illustrated in FIG. 18, the serving base station performs a positioning signal measurement request to the neighboring base station. For the request, the same NRPPa signaling as that of Step ST1415 illustrated in FIG. 14 may be used. The signaling of Step ST1615 may be, for example, notified using an Xn interface.

In Step ST1619 illustrated in FIG. 18, the serving base station notifies the UE of information used for positioning.

The information may be, for example, the same as that of Step ST1419 in FIG. 14. For the request, the same signaling as that of Step ST1419 in FIG. 14 may be used. The LPP signaling of Step ST1619 may be, for example, notified on RRC signaling.

In Step ST1621 illustrated in FIG. 18, the serving base station requests the UE to perform positioning. For the request, the same signaling as that of Step ST1421 in FIG. 14 may be used. The LPP signaling of Step ST1621 may be, for example, notified using RRC signaling. The UE starts reception operation of a downlink positioning signal from the serving base station and/or the neighboring base station, using Step ST1621.

In Step ST1623 illustrated in FIG. 18, the UE requests the serving base station to change the measurement gap. For the request, RRC signaling, for example, RRC Location Measurement Indication disclosed in Non-Patent Document 22 (TS 38.305), may be used. In the request, information related to start of the measurement gap for positioning may be included. In Step ST1625, the serving base station may instruct the UE to configure the measurement gap. In Step ST1625, the same signaling as that of Step ST1417 illustrated in FIG. 14 may be used.

In Step ST1627 illustrated in FIG. 19, the neighboring base station notifies the serving base station of information related to reception results of the positioning signal. Information included in the notification may be the same as that of Step ST1427 in FIG. 15. For the notification, for example, NRPPa signaling may be used. The signaling may be, for example, notified using an Xn interface.

In ST1629 illustrated in FIG. 19, the serving base station calculates the position of the UE. The serving base station may perform calculation of the UE position, using the information of Step ST1425 and/or Step ST1629.

Steps ST1434 and ST1435 illustrated in FIG. 19 are the same as those of FIG. 15.

The method disclosed in the first embodiment may be applied to a case in which the base station includes the LMF. For example, the serving base station may configure the measurement gap for the UE without a measurement gap configuration request from the UE.

Figure 20:
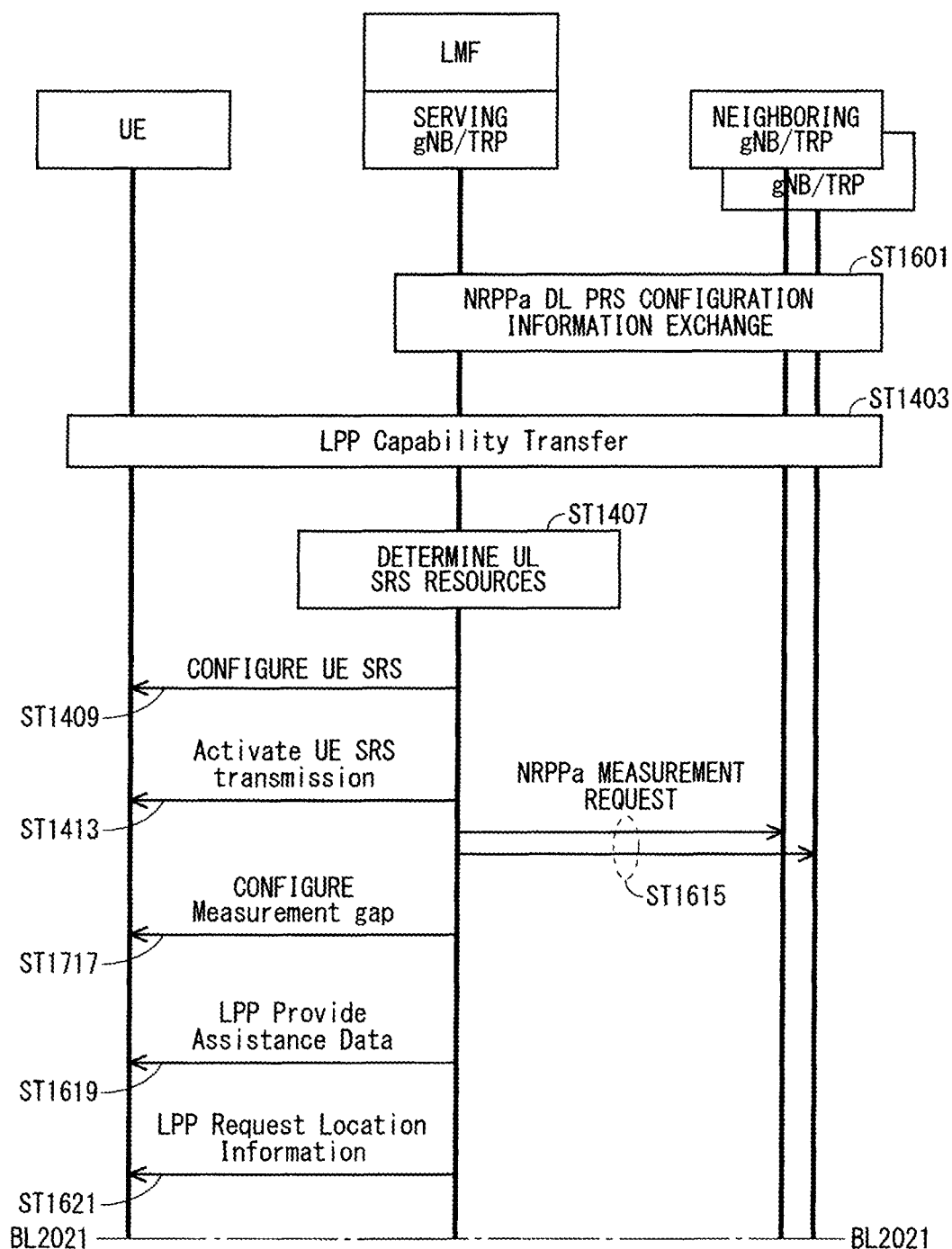
FIG. 20 is a sequence diagram illustrating a positioning method in which the serving base station configures the measurement gap for the UE without waiting for the measurement gap change request from the UE when the serving base station includes the LMF according to the first embodiment.
Figure 21:
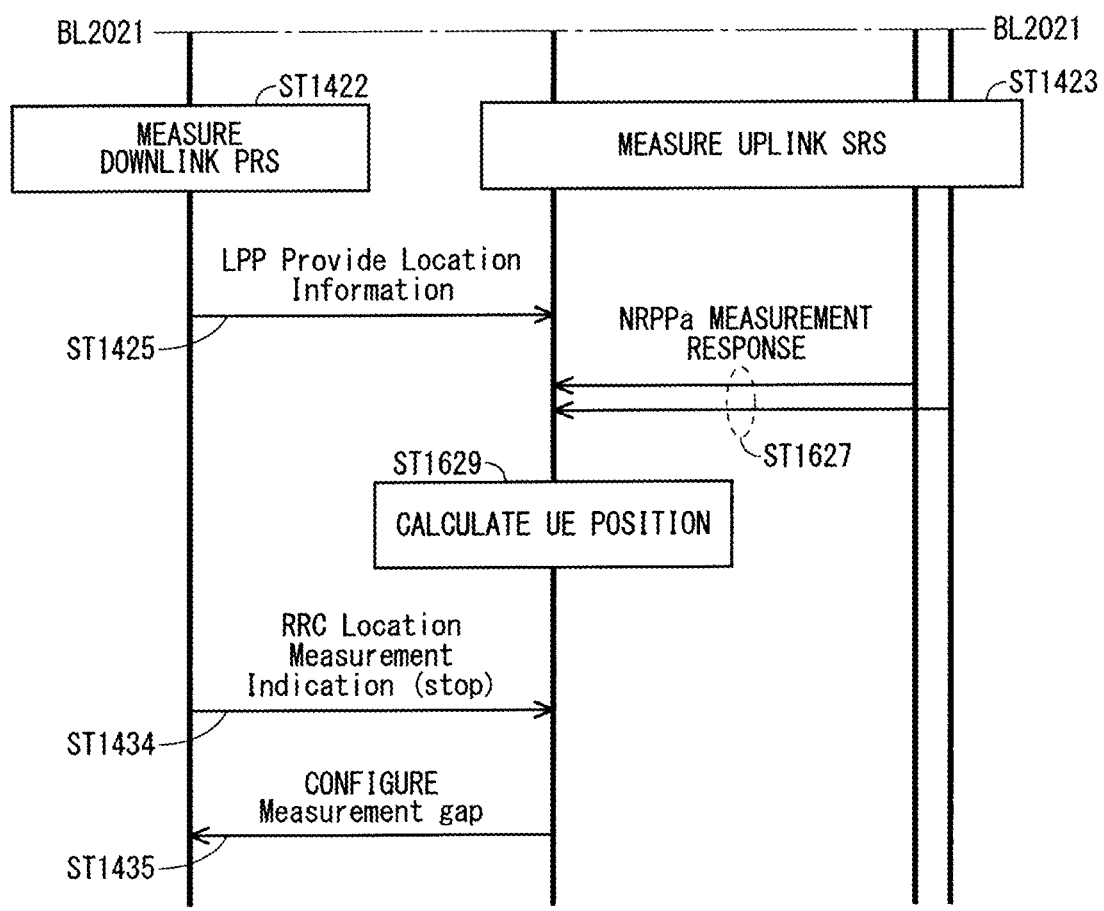
FIG. 21 is a sequence diagram illustrating the positioning method in which the serving base station configures the measurement gap for the UE without waiting for the measurement gap change request from the UE when the serving base station includes the LMF according to the first embodiment.

FIG. 20 and FIG. 21 are sequences illustrating a positioning method in which the serving base station configures the measurement gap for the UE without waiting for a measurement gap change request from the UE when the base station includes the LMF. FIG. 20 and FIG. 21 are connected at the position of a boundary line BL2021. FIG. 20 and FIG. 21 illustrate an example in which Multi-RTT is used. In FIG. 20 and FIG. 21, the same processes as those of FIG. 14 to FIG. 19 are denoted by the same step numbers, and common description will be omitted.

Steps ST1601 to ST1615 illustrated in FIG. 20 are the same as those of FIG. 18.

In Step ST1717 illustrated in FIG. 20, the serving base station instructs the UE to configure the measurement gap. The instruction may be the same as that of Step ST1417 in FIG. 14.

Steps ST1619 to ST1435 illustrated in FIG. 20 and FIG. 21 are the same as those of FIG. 18 and FIG. 19.

The UE may include the LMF. The UE may derive the position of the UE by using measurement results from the UW itself and/or the neighboring base station.

The UE may request the serving base station and/or the neighboring base station to start to transmit and receive the positioning signal. In other words, the positioning signal transmission and reception start request may be initiated by the UE. The UE may perform the request to the neighboring base station via the serving base station. The neighboring base station and/or the serving base station may start transmission and reception of the positioning signal, using the request.

The UE may perform the request at timing freely chosen by the UE, for example, timing at which a processing load of the UE is small. With this, for example, the processing load of the UE in positioning can be reduced.

The UE may also perform the measurement gap configuration request to the serving base station at timing freely chosen by the UE, for example, timing at which a processing load of the UE is small. With this, for example, the same effect as that described above can be obtained.

Figure 22:
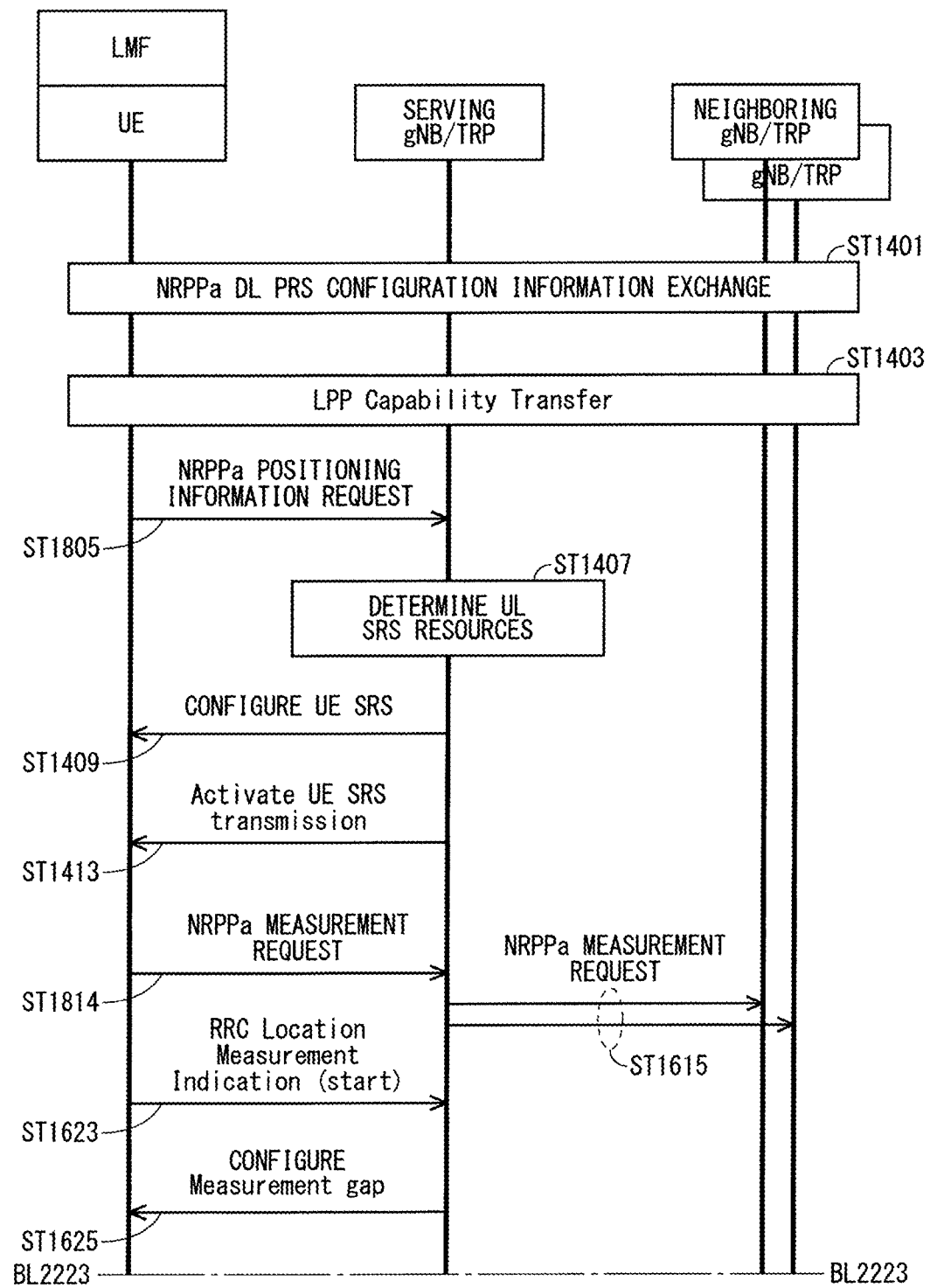
FIG. 22 is a sequence diagram illustrating operation of Multi-RTT when the UE includes the LMF according to the first embodiment.
Figure 23:
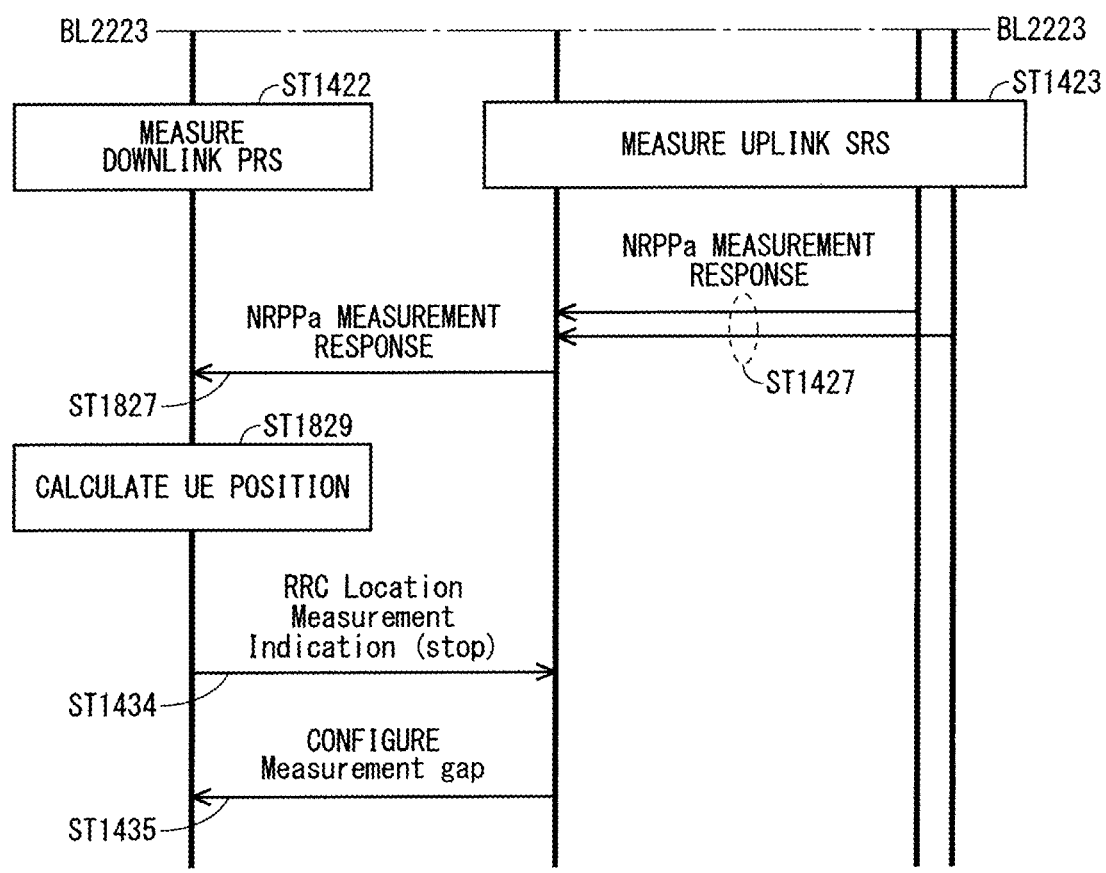
FIG. 23 is a sequence diagram illustrating the operation of Multi-RTT when the UE includes the LMF according to the first embodiment.

FIG. 22 and FIG. 23 are sequence diagrams illustrating operation of Multi-RTT when the UE includes the LMF. FIG. 22 and FIG. 23 are connected at the position of a boundary line BL2223. FIG. 22 and FIG. 23 illustrate an example in which the UE requests the base station to configure the measurement gap for positioning, and the base station instructs the UE to configure the measurement gap. In FIG. 22 and FIG. 23, the same processes as those of FIG. 14 to FIG. 21 are denoted by the same step numbers, and common description will be omitted.

Step ST1401 in FIG. 22 is the same as that of FIG. 14. In Step ST1401 in FIG. 22, information related to a configuration of a PRS is exchanged between the UE, the serving base station, and the neighboring base station. The UE may request the information related to the configuration of the PRS from the serving base station. The serving base station may notify the UE of the information. The serving base station may transfer the request to the neighboring base station. The neighboring base station may notify the serving base station of the information. The serving base station may transfer the information of the neighboring base station to the UE. The serving base station may include the information of the neighboring base station in the information of the base station itself to notify the UE of the information. For the request and/or the notification, for example, signaling of NRPPa Message described in Non-Patent Document 22 (TS 38.305) may be used. The NRPPa signaling may be transmitted using RRC signaling and/or Xn signaling. In the notification from the serving base station and/or the neighboring base station, the same information as that of Step ST1401 in FIG. 14 may be included.

Step ST1403 in FIG. 22 is the same as that of FIG. 14.

FIG. 22 illustrates an example in which the processing of Step ST1403 is performed; however, Step ST1403 may be omitted. The LMF unit included in the UE may acquire, in the UE itself, capability related to positioning of the UE itself. With this, for example, signaling between the base station and the UE can be reduced.

In Step ST1805 in FIG. 22, the UE requests information related to an uplink SRS from the serving base station. For the request, the same signaling as that of Step ST1405 in FIG. 14, for example, NRPPa signaling, may be used. The signaling in Step ST1805 may be transmitted using RRC signaling.

FIG. 22 illustrates an example in which the processing of Step ST1805 is performed; however, Step ST1805 may be omitted. The LMF unit included in the UE may acquire, in the UE itself, SRS configuration of the UE itself. With this, for example, signaling between the base station and the UE can be reduced.

Steps ST1407 to ST1413 illustrated in FIG. 22 are the same as those of FIG. 14.

In Step ST1814 illustrated in FIG. 22, the UE performs a positioning signal measurement request to the serving base station. In the request, information related to the neighboring base station may be included. For the request, for example, NRPPa signaling may be used. The NRPPa signaling may be, for example, the same as that of Step ST1414 in FIG. 14. For example, the signaling of Step ST1814 may be transmitted to the serving base station, using RRC signaling.

Step ST1615 illustrated in FIG. 22 is the same as that of FIG. 18.

Steps ST1623 and ST1625 illustrated in FIG. 22 are the same as those of FIG. 18.

Step ST1422 illustrated in FIG. 23 is the same as that of FIG. 15. Steps ST1423 and ST1427 are the same as those of FIG. 17.

In Step ST1827 illustrated in FIG. 23, the serving base station notifies the UE of information related to reception results of the positioning signal. For the notification, the same signaling (for example, NRPPa signaling) as that of Step ST1427 illustrated in FIG. 15 may be used. The signaling may be, for example, transmitted using RRC signaling. In Step ST1829, the UE calculates the position of the UE itself.

Steps ST1434 and ST1435 illustrated in FIG. 18 are the same as those of FIG. 15.

The method disclosed in the first embodiment may be applied to a case in which the UE includes the LMF. For example, the serving base station may configure the measurement gap for the UE without a measurement gap configuration request from the UE.

Figure 24:
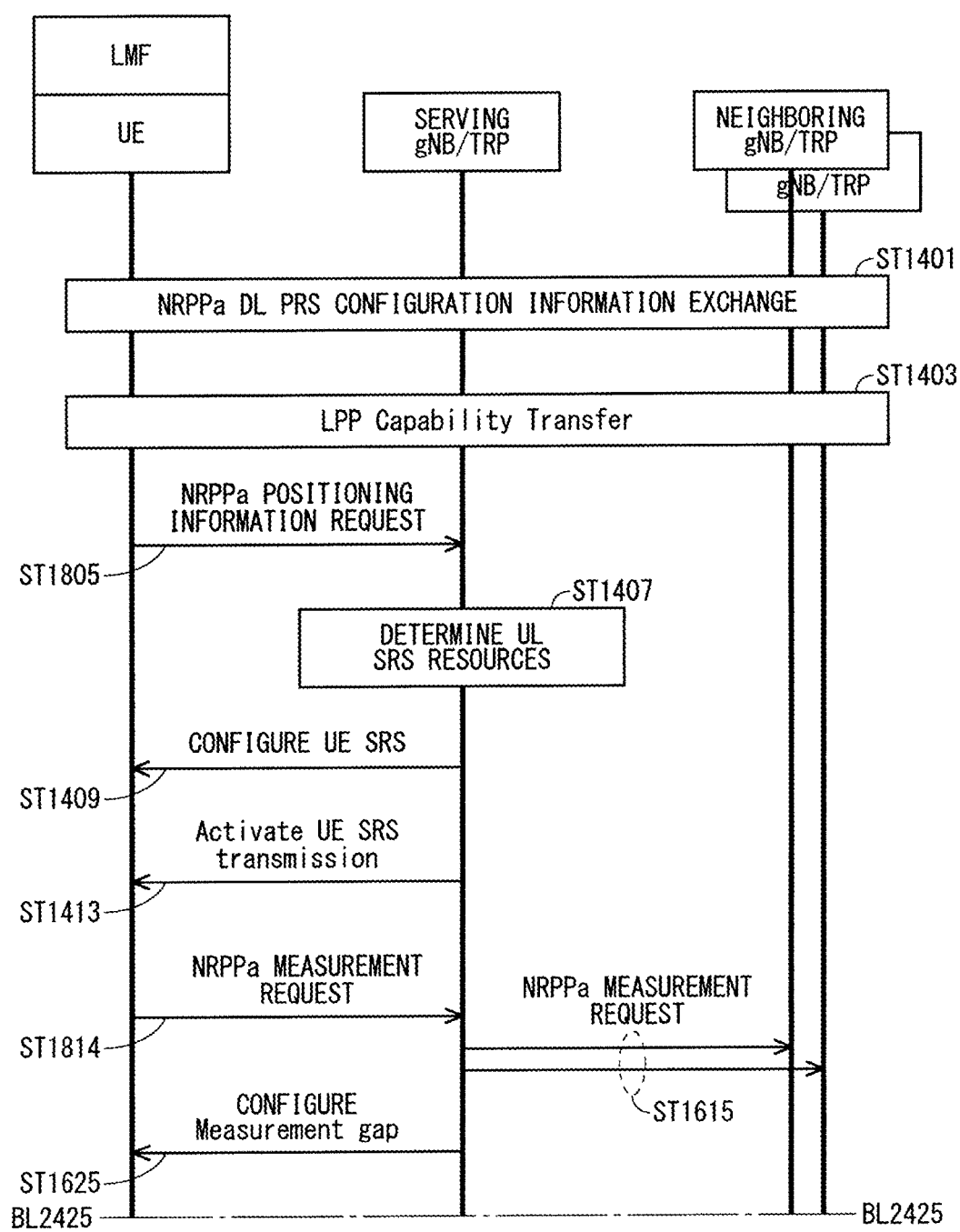
FIG. 24 is a sequence diagram illustrating a positioning method in which the serving base station configures the measurement gap for the UE without waiting for the measurement gap change request from the UE when the UE includes the LMF according to the first embodiment.
Figure 25:
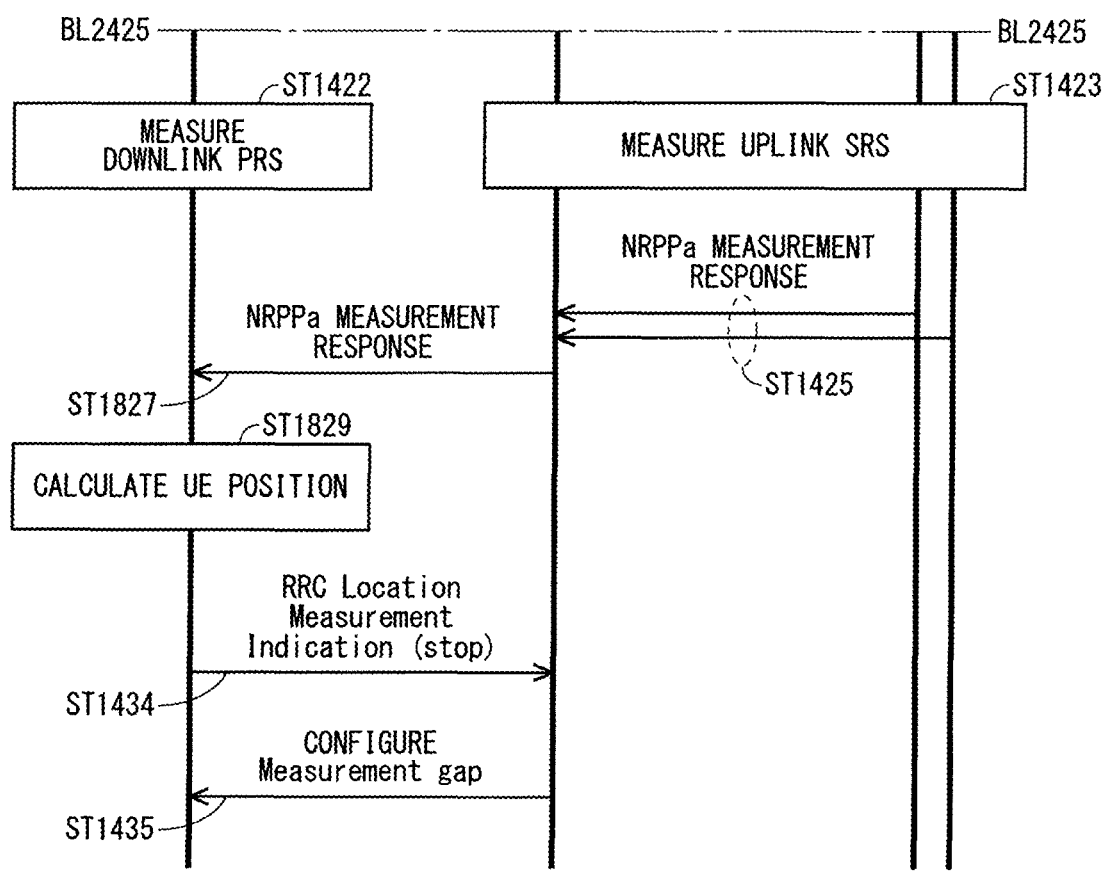
FIG. 25 is a sequence diagram illustrating the positioning method in which the serving base station configures the measurement gap for the UE without waiting for the measurement gap change request from the UE when the UE includes the LMF according to the first embodiment.

FIG. 24 and FIG. 25 are sequences illustrating a positioning method in which the serving base station configures the measurement gap for the UE without waiting for a measurement gap change request from the UE when the UE includes the LMF. FIG. 24 and FIG. 25 are connected at the position of a boundary line BL2425. FIG. 24 and FIG. illustrate an example in which Multi-RTT is performed. In FIG. 24 and FIG. 25, the same processes as those of FIG. 14 to FIG. 23 are denoted by the same step numbers, and common description will be omitted.

Steps ST1401 to ST1805 illustrated in FIG. 24 are the same as those of FIG. 22.

Steps ST1407 to ST1413 illustrated in FIG. 24 are the same as those of FIG. 14. Step ST1814 is the same as that of FIG. 22. Step ST1615 is the same as that of FIG. 18.

Step ST1625 illustrated in FIG. 24 is the same as that of FIG. 22. Step ST1625 illustrated in FIG. 24 may be performed even without Step ST1623 in FIG. 22.

Steps ST1422 to ST1435 illustrated in FIG. 25 are the same as those of FIG. 23.

In the method disclosed in the first embodiment, signaling of the positioning signal transmission and reception start request for the measurement gap request of the UE may be provided. The signal may be, for example, provided differently from the positioning signal transmission and reception start request (for example, Step ST1814) for transmission and reception of the positioning signal between the UE and the serving base station and/or the neighboring base station. Using the request, the serving base station and/or the neighboring base station may perform transmission and reception of the positioning signal with the UE, or may perform only transmission of the positioning signal to the UE. For example, by performing only transmission of the positioning signal to the UE, power consumption in the UE can be reduced.

The UE may determine the measurement gap to request from the serving base station by using positioning signal reception results from the serving base station and/or the neighboring base station. The UE may request the measurement gap from the serving base station. The UE may stop transmission and reception of the positioning signal to and from the serving base station and/or the neighboring base station. Using the request, the serving base station may determine measurement gap configuration for the UE, or may stop transmission and reception of the positioning signal to and from the UE. The serving base station may request the neighboring base station to stop transmission and reception of the positioning signal. The request may be, for example, performed using the measurement gap request from the UE. The neighboring base station may stop transmission and reception of the positioning signal to and from the UE, using the request. The UE may request the serving base station to start transmission and reception of the positioning signal after the measurement gap change. The serving base station may transfer the request to the neighboring base station. The UE, the serving base station, and/or the neighboring base station may resume transmission and reception of the positioning signal, using the request. With this, for example, power consumption in the UE, the serving base station, and/or the neighboring base station can be reduced.

According to the first embodiment, positioning using round-trip time can be promptly executed.

First Modification of First Embodiment

In positioning, the serving base station may notify the LMF of information related to beams to be used for communication with the UE. The LMF may determine frequency and/or time resources of a downlink positioning signal, using the information.

However, in positioning using Multi-RTT, the neighboring base station also transmits and receives the positioning signal by using beams. In this case, because the neighboring base station does not know the position of the UE, the neighboring base station sweeps a plurality of beams to transmit and receive the positioning signal. This requires time for transmission and reception of the positioning signal between the neighboring base station and the UE, thus resulting in causing a problem in that latency of positioning increases.

In the first modification of the first embodiment, a method for solving the problem described above will be disclosed.

The LMF notifies the neighboring base station of information related to beams of the serving base station. The neighboring base station transmits and receives the positioning signal to and from the UE, using the information.

For example, the neighboring base station may perform beam sweeping within a range of beams that the serving base station uses for communication with the UE. The neighboring base station may transmit and receive the positioning signal to and from the UE within the range described above.

The serving base station may perform beam sweeping of beams to be used for positioning, using information of beams used for transmission and reception of user data. With this, for example, the serving base station can promptly execute positioning.

The beam may be, for example, a beam (for example, a serving beam) used by the base station. The beam may be a beam for downlink transmission, or may be a beam for uplink reception. For example, the use of the beam for uplink reception enables high accuracy positioning even when the beam for downlink transmission and the beam for uplink reception do not match each other (no beam correspondence).

FIG. 26 is a diagram illustrating operation in which the neighboring base station performs beam sweeping within a range of beams that the serving base station uses for communication with the UE. FIG. 26 illustrates an example in which a serving base station 2601 and a neighboring base station 2611 perform positioning of a UE 2605.

In the example illustrated in FIG. 26, the serving base station 2601 can use beams 2602 and 2603 as well as a beam 2604, and communicates with the UE 2605 by using the beam 2603.

In the example illustrated in FIG. 26, the base station 2611 can use beams 2612, 2613, 2614, and 2615. Among these, the beams 2613 and 2614 overlap the range in which the serving base station 2601 can communicate with the UE 2605 using the beam 2603. Thus, the base station 2611 performs positioning of the UE 2605, using the beams 2613 and 2614 that include the range in which the serving base station 2601 can perform communication using the beam 2603. In other words, the beams 2612 and 2615 are not used in positioning of the UE 2605 by the base station 2611.

As another example, the serving base station may notify the base station that performs positioning of information related to the serving beam used for communication with a target UE. With this, for example, the amount of processing in the LMF can be reduced.

As the information related to the serving beam, the following (1) to (6) are disclosed:
(1) Information related to the position of the serving base station;
(2) Information related to a direction of the center of the serving beam;
(3) Information related to an arrival distance of the beam;
(4) Information related to the width of the beam;
(5) Information related to a radiation range of the serving beam;
(6) Combination of (1) to (5) described above.

The information related to (1) above may be, for example, the latitude, the longitude, and the altitude of the serving base station, or a combination of the above description. With this, for example, the base station that performs positioning can know the position of the serving base station with high accuracy.

As another example, the information related to (1) above may be information indicating in which area of area division defined in advance the serving base station is located. For example, the area division defined in advance described above may be defined in a specification, or may be area division determined by the LMF. For example, the area division may be performed using the latitude and the longitude, or may be performed using the altitude. For example, the divided areas obtained through the area division may each be in a shape of a triangle, may each be in a shape of a quadrilateral, or may each be in a shape of a hexagon. With this, for example, the serving base station can perform notification of information related to the position of the base station itself in small quantity.

As another example, the information related to (1) above may be information related to a difference of positions between the serving base station and the base station that performs positioning. The information related to the difference may be, for example, information combining a difference in the east-west direction, a difference in the north-south direction, and a difference in the altitude direction. Alternatively, the information related to the difference may be, for example, information combining a distance and an azimuth between both the base stations and a difference of altitudes. Alternatively, the information related to the difference may be, for example, information combining a distance between both the base stations, an azimuth, and an angle of elevation/an angle of depression. With, this, for example, the serving base station can perform notification of the information related to the position of the base station itself in small quantity, and the base station that performs positioning can know the position of the serving base station with high accuracy.

The information related to (2) above may be, for example, information combining an azimuth in which the center of the serving beam faces (for example, information such as degrees measured clockwise from the north) and an angle of elevation/an angle of depression. Alternatively, the information related to (2) above may be, for example, information of a vector described with a component in the horizontal direction (for example, combination of the north-south direction and the east-west direction). The vector may include a component in the vertical direction. With this, for example, the base station that performs positioning can know the direction of the serving beam.

The information related to (3) above may be, for example, an arrival distance of the serving beam. For example, the distance may be represented in a predetermined unit (for example, a unit of meters), or may be given as information in which a predetermined parameter and the distance are associated with each other. With this, for example, the base station that performs positioning can estimate the arrival range of the serving beam of the serving base station. As a result, the base station that performs positioning can narrow down the range for performing beam sweeping. Consequently, the beam sweeping can be promptly executed.

The information related to (4) above may be, for example, a half width of the serving beam. With this, for example, the base station that performs positioning can estimate the arrival range of the serving beam of the serving base station with high accuracy.

The information related to (5) above may be, for example, information indicating to which area of area division defined in advance the range in which communication can be performed using the serving beam belongs. The area division defined in advance described above may be, for example, the same as the area division disclosed in (1) above. With this, for example, the serving base station can perform notification of information related to the range in which communication can be performed using the serving beam in small quantity.

FIG. 27 is a diagram illustrating an example in which the serving base station performs notification of areas that overlap the range of the serving beam among a plurality of areas determined in advance as information related to the serving beam. In the example of FIG. 27, communication areas are divided into areas 2710 each having a predetermined shape (here, a hexagonal shape is illustrated as an example), and numbers of areas that overlap the range of a serving beam 2704 among the plurality of areas 2710 are used as information related to the serving beam 2704.

In the example illustrated in FIG. 27, a serving base station 2701 communicates with a UE 2705, using the serving beam 2704. Among the areas 2710, the numbers of the areas that overlap the range of the serving beam 2704 are 4, 7, 8, 12, 15, 16, and 19. The serving base station 2701 notifies the base station that performs positioning of 4, 7, 8, 12, 15, 16, and 19 as the numbers of the areas 2710. Note that, in the example illustrated in FIG. 27, each of the areas 2710 having the numbers of 4, 7, 8, 12, 15, 16, and 19 overlaps a part (i.e., includes a part) of the range of the serving beam. For example, depending on the size of the serving beam 2704 and the areas 2710 and the shape of the areas 2710, the entire range of the serving beam 2704 may be included in a single area 2710.

The notification of the information related to the serving beam may be performed using an inter-base station interface (for example, an Xn interface), may be performed via the AMF, or may be performed via the LMF. Beam sweeping of beams to be used for positioning may be performed using information of beams used for transmission and reception of user data. With this, for example, the serving base station can promptly execute positioning.

The base station that performs positioning may derive a range of beam sweeping of beams for transmitting a CSI-RS for positioning, using the information. For example, the base station may determine one or a plurality of beams for transmitting the CSI-RS for positioning.

The base station that performs positioning may notify the UE that performs positioning of information related to the positioning signal. For example, the notification may be performed via the serving base station, may be performed via the LMF, or may be performed via the AMF. With this, for example, the target UE can acquire information necessary for reception of the positioning signal, and can, as a result, perform high accuracy positioning in the communication system.

The information related to the positioning signal may be, for example, the same as the information disclosed in the first embodiment. The information described above may be provided for each beam used for transmission and reception of the positioning signal.

Another solution will be disclosed. Transmission of the positioning signal from the base station used for positioning may be performed using unused beams in the base station. The unused beams may be, for example, beams that are not used for communication with a served UE in the base station. The base station for positioning may notify the serving base station of information related to unused beams of the base station itself. The serving base station may notify the UE of the information related to unused beams of the base station for positioning. The UE may receive the positioning signal from the base station for positioning, using the information. With this, for example, beam sweeping time in the base station for positioning can be reduced, and interference from the base station for positioning to the served UE can be reduced.

Instead of the unused beams described above, beams with a little interference may be used. The interference may be interference with the UE served by the beam, or may be interference that the base station receives using the beam. The served UE may measure interference power in the beam. The UE may report measurement results of the interference power to the base station. The base station may determine the beam to be used for positioning, using the report. With this, for example, the same effect as that described above can be obtained.

Another solution will be disclosed. The UE may notify the serving base station of information related to measurement results of the neighboring base station. In the measurement results, for example, information related to beams of the neighboring base station may be included. For example, the information of beams may be an identifier of a beam of a CSI-RS, may be an identifier of a beam of an SS block, may be information related to received quality (for example, RSRQ, RSRP, SINR) of a beam described above, or may be a combination of the above description. The serving base station may notify the neighboring base station of the information related to beams. The neighboring base station may determine the beam to be used for positioning of the UE, using the information. With this, for example, transmission and reception of the positioning signal between the UE and the neighboring base station can be promptly executed.

The solutions described above may be used in combination. The base station that performs positioning may perform beam sweeping within a range of beams that the serving base station uses for communication with the UE and within unused beams. With this, for example, beam sweeping time in the base station for positioning can be further reduced, and interference from the base station for positioning to the served UE can be reduced.

The method disclosed in the first modification of the first embodiment may be used in handover, switching between DUs, and/or switching between TRPs. For example, a source base station on movement may notify a target base station on movement of information related to the serving beam used for connection with the UE. The information may be the same information as that disclosed in the first modification of the first embodiment. The source base station on movement may determine the beam to be used for positioning of the UE, using the information. The same may hold true in switching between DUs and/or switching between TRPs as well. With this, for example, positioning after handover can be promptly executed.

According to the first modification of the first embodiment, the base station that performs positioning can reduce the number of times of beam sweeping. As a result, in the communication system, positioning of the UE can be promptly executed.

Second Modification of First Embodiment

In transmission and reception of the positioning signal between the base station and the UE, the base station and/or the UE may use beams. The base station and/or the UE may sweep beams in a range of a plurality of beams to transmit and receive the positioning signal.

In the above description, the following problem occurs. In other words, because the base station and/or the UE sweeps beams in each of transmission and reception of a downlink positioning signal and transmission and reception of an uplink positioning signal, time is required for the positioning signal to make a round-trip between the UE and the base station. As a result, there is a problem in that latency of positioning increases.

In the second modification of the first embodiment, a method for solving the problem described above will be disclosed.

A configuration of the downlink positioning signal and a configuration of the uplink positioning signal are associated with each other. The downlink positioning signal may be, for example, a PRS. The uplink positioning signal may be, for example, an SRS.

The association of the configurations may be, for example, an association of timings of the uplink positioning signal and the downlink positioning signal. For example, the timing may be configured in a unit of frames, may be configured in a unit of subframes, may be configured in a unit of slots, or may be configured in a unit of symbols. For example, the UE may transmit the uplink positioning signal to the base station at timing that is associated with timing of reception of the downlink positioning signal from the base station. The base station may perform reception operation of the uplink positioning signal from the UE at reception timing of the uplink positioning signal that is associated with transmission timing of the downlink positioning signal. The UE may perform transmission operation of the uplink positioning signal by using the same beam as the beam used for reception of the downlink positioning signal. The base station may perform reception operation of the uplink positioning signal by using the same beam as the beam used for transmission of the downlink positioning signal. With this, for example, the base station can promptly acquire information related to the positioning signal received by the UE.

As another example, the base station may transmit the downlink positioning signal to the UE at timing that is associated with timing of reception of the uplink positioning signal from the UE. The UE may perform reception operation of the downlink positioning signal from the base station at reception timing of the downlink positioning signal that is associated with transmission timing of the uplink positioning signal. The base station may perform transmission operation of the downlink positioning signal by using the same beam as the beam used for reception of the uplink positioning signal. The UE may perform reception operation of the downlink positioning signal by using the same beam as the beam used for transmission of the uplink positioning signal. With this, for example, the UE can promptly acquire information related to the positioning signal received by the base station.

The association of the configurations may be, for example, an association of frequencies of the uplink positioning signal and the downlink positioning signal. For example, the association of the frequencies may be performed in a unit of RBs, or may be performed in a unit of REs. For example, the association of the frequencies may be such an association that the uplink positioning signal and the downlink positioning signal are arranged to have the same frequencies, or such an association that the frequencies are shifted to a certain extent between the uplink positioning signal and the downlink positioning signal. Alternatively, as the association of the frequencies, another association may be used. For example, the UE may transmit the uplink positioning signal to the base station, using frequency resources associated with frequency resources of the downlink positioning signal from the base station. The base station may perform reception operation of the uplink positioning signal in frequency resources associated with the frequency resources of the downlink positioning signal. The UE may perform transmission operation of the uplink positioning signal by using the same beam as the beam used for reception of the downlink positioning signal. With this, for example, the base station can promptly acquire information related to the positioning signal received by the UE.

As another example, the base station may transmit the downlink positioning signal to the UE, using frequency resources associated with frequency resources of the uplink positioning signal from the UE. The UE may perform reception operation of the downlink positioning signal from the base station in frequency resources associated with the frequency resources of the uplink positioning signal. The base station may perform transmission operation of the downlink positioning signal by using the same beam as the beam used for reception of the uplink positioning signal. The UE may perform reception operation of the downlink positioning signal by using the same beam as the beam used for transmission of the uplink positioning signal. With this, for example, the UE can promptly acquire information related to the positioning signal received by the base station.

The association of the configurations may be, for example, a combination of the timings and the frequencies described above. With this, for example, complexity in the communication system can be avoided.

The base station described above may be a serving base station, or may be a neighboring base station. With this, for example, transmission and reception of the positioning signal between the base station, including the neighboring base station, and the UE can be promptly executed.

The base station notifies the UE of information related to the configuration of the downlink positioning signal and/or the uplink positioning signal. For example, in the configuration of the downlink positioning signal, information related to the configuration of a corresponding uplink signal may be included.

The notification may be, for example, performed using LPP Provide Assistance data disclosed in Non-Patent Document 22 (TS 38.305). With this, for example, signaling between the base station and the UE can be reduced.

As another example, in the configuration of the uplink positioning signal, information related to the configuration of a corresponding downlink signal may be included. The notification may be, for example, performed using UE SRS Configuration disclosed in Non-Patent Document 22 (TS 38.305). With this, for example, signaling between the base station and the UE can be reduced.

The notification from the serving base station to the UE may include information related to correspondence between the configurations of the downlink positioning signal and/or the uplink positioning signal in the neighboring base station. The serving base station may request the information related to the correspondence from the neighboring base station. The neighboring base station may notify the serving base station of the information related to the correspondence.

New signaling may be provided so as to be used for the notification from the serving base station to the UE. For example, the signaling may be RRC signaling, may be MAC signaling, or may be L1/L2 signaling. The RRC signaling may, for example, include LPP and/or NRPPa signaling.

New signaling may be provided so as to be used for the request from the serving base station to the neighboring base station. The signaling may be, for example, Xn signaling. The Xn signaling may include, for example, LPP and/or NRPPa signaling. As another example, the signaling used for the request may be included in a procedure of NRPPa DL PRS CONFIGURATION INFORMATION EXCHANGE disclosed in Non-Patent Document 22 (TS 38.305). With this, for example, the serving base station can quickly transmit the request to the neighboring base station.

New signaling may be provided so as to be used for the notification from the neighboring base station to the serving base station. The signaling may be, for example, Xn signaling. The Xn signaling may include, for example, LPP and/or NRPPa signaling. As another example, the signaling used for the notification may be included in gNB configuration notification disclosed in the first embodiment. With this, for example, the amount of signaling between the base stations can be reduced. As another example, the signaling used for the request may be included in a procedure of NRPPa DL PRS CONFIGURATION INFORMATION EXCHANGE disclosed in Non-Patent Document 22 (TS 38.305). With this, for example, the neighboring base station can promptly transmit the notification to the serving base station.

In the second modification of the first embodiment, an SS block may be used for the downlink positioning signal, and a PRACH may be used for the uplink positioning signal. The serving base station and/or the neighboring base station perform notification of or broadcast information related to time at predetermined frame timing. The UE may measure downlink propagation delay time, using reception of the notification, the broadcast, and/or the SS block. The serving base station and/or the neighboring base station may specify transmission timing of the PRACH from the UE. The specification may be notified from the serving base station to the UE, or may be broadcast from the serving base station and/or the neighboring base station to the UE. The neighboring base station may notify the serving base station of information related to the specification. The serving base station and/or the neighboring base station may measure uplink propagation delay time, using the information of the specification and/or reception of the PRACH from the UE. With this, for example, complexity in the communication system can be avoided.

The method disclosed in the second modification of the first embodiment may be applied to a case in which the base station includes the LMF. With this, for example, positioning time can be reduced.

The method disclosed in the second modification of the first embodiment may be applied to a case in which the UE includes the LMF. With this, for example, time from start of positioning to start of use of positioning information by the UE can be reduced.

According to the second modification of the first embodiment, beam sweeping time in positioning can be reduced, and as a result, positioning time can be reduced. Further, the number of symbols required for the positioning signal can be reduced, and as a result, a communication rate can be enhanced.

Second Embodiment

In Multi-RTT, position calculation may be performed by the UE. The serving base station may notify the UE of information related to reception results of the positioning signal.

In the above description, the following problem occurs. In other words, a sequence when the UE performs position calculation is not disclosed. This results in causing a problem in that the UE cannot implement a positioning method for performing position calculation.

In the second embodiment, a method for solving the problem described above will be disclosed.

The LMF notifies the UE of information related to the position of the base station. For example, the information related to the position may be represented by absolute coordinates such as the latitude, the longitude, and the altitude, or may be represented by relative coordinates with respect to a predetermined point. The base station described above may be a serving base station, or may be a neighboring base station.

In the information related to the position of the base station, information related to accuracy may be included. The information related to accuracy may be, for example, information related to accuracy of the position of the base station. The UE may derive accuracy in position calculation of the UE itself by using the information related to accuracy. With this, for example, the UE can more accurately derive accuracy in position calculation of the UE itself.

In the notification from the LMF to the UE, information related to transmission and reception results of the positioning signal may be included. As another example, the notification of the information related to the position of the base station and the notification of the information related to the transmission and reception results of the positioning signal from the LMF to the UE may be performed at different timings.

As the information related to the transmission and reception results of the positioning signal, the following (1) to (7) are disclosed:
 (1) Information related to reception time of the uplink positioning signal;
 (2) Information related to transmission time of the downlink positioning signal;
 (3) Information related to correspondence between the downlink positioning signal and the uplink positioning signal;
 (4) Information related to received quality of the uplink positioning signal;
 (5) Information used for identification of the base station, the cell, the DU, and/or the TRP;
 (6) Information related to accuracy of reception results;
 (7) Combination of (1) to (6) above.

The information related to (1) above may be information related to time at which the base station receives the uplink positioning signal. As another example, the information related to (1) above may be a difference between time at which the UE transmits the uplink positioning signal and time at which the base station receives the uplink positioning signal. The UE may derive propagation delay of the uplink positioning signal, using the information related to (1) above. With this, for example, the UE can perform position calculation of the UE itself, using the uplink positioning signal.

The information related to (2) above may be information related to time at which the base station transmits the downlink positioning signal. The UE may derive propagation delay of the downlink positioning signal, using the information related to (2) above. With this, for example, the UE can perform position calculation of the UE itself, using the uplink positioning signal.

The information related to (3) above may be, for example, information disclosed in the second modification of the first embodiment. The UE may acquire information related to the uplink positioning signal received by the base station, using the information. With this, for example, the UE can avoid complexity in calculation of round-trip propagation delay.

For example, the information related to (4) above may be information related to RSRP of the uplink positioning signal, may be information related to RSRQ, or may be information related to SINR. The UE may determine downlink measurement signal information used for position calculation of the UE itself, using the information. With this, for example, the UE can perform position calculation of the UE itself, using positioning signal measurement results having high quality. As a result, accuracy in position calculation of the UE itself can be enhanced.

The information related to (5) above may be, for example, an identifier of the base station, the cell, the DU, and/or the TRP. With this, for example, the UE can promptly identify the base station related to reception results.

The information related to (6) above may be, for example, accuracy related to time. The UE may perform position calculation of the UE itself, using the information. With this, for example, the UE can derive accuracy of position calculation of the UE itself.

As an example of (7) above, the identifier disclosed in (5) above and the pieces of information related to (1) to (4) and/or (6) above may be used in combination. There may be a single combination, or may be a plurality of combinations. The plurality of combinations may be, for example, a list in which the identifier of the base station, the cell, the DU, and/or the TRP and the transmission and reception results are associated with each other. With this, for example, the UE can promptly process the information related to the transmission and reception results of the positioning signal, and can enhance accuracy of positioning results.

The UE may use a predetermined number of uplink positioning signal reception results for position calculation of the UE itself in descending order from the uplink positioning signal reception results having the best received quality of the uplink positioning signal. With this, for example, the UE can perform position calculation of the UE itself, using the positioning signal measurement results having high quality. As a result, accuracy in position calculation of the UE itself can be enhanced.

The predetermined number may be determined in a specification. Alternatively, the predetermined number may be determined by the base station and then notified to the UE. Alternatively, the predetermined number may be determined by the AMF and then notified to the UE via the serving base station. Alternatively, the predetermined number may be determined by the LMF and then notified to the UE via the serving base station.

As another example, the UE may use only the uplink positioning signal reception results whose received quality of the uplink positioning signal is equal to or higher than a predetermined threshold for position calculation of the UE itself. With this, for example, the same effect as that described above can be obtained.

The predetermined threshold may be determined in a specification. Alternatively, the predetermined threshold may be determined by the base station and then notified to the UE. Alternatively, the predetermined number may be determined by the AMF and then notified to the UE via the serving base station. Alternatively, the predetermined number may be determined by the LMF and then notified to the UE via the serving base station.

As another example, the UE may use a predetermined number of uplink positioning signal reception results out of the measurement results whose received quality of the uplink positioning signal is equal to or higher than the predetermined threshold in descending order from the uplink positioning signal reception results having the best received quality of the uplink positioning signal for position calculation of the UE itself. With this, for example, the UE can perform position calculation of the UE itself, using the positioning signal measurement results having higher quality. As a result, accuracy in position calculation of the UE itself can be further enhanced.

As another example, the UE may use received quality of the downlink positioning signal. The UE may acquire received quality of the downlink positioning signal from the downlink positioning signal reception results in the UE itself. The UE may use the received quality of the uplink positioning signal and the received quality of the downlink positioning signal in combination. With this, for example, the UE can perform position calculation of the UE itself, using the measurement results having high quality both in the uplink and the downlink. As a result, accuracy in position calculation of the UE itself using Multi-RTT can be enhanced.

The combination of the received quality of the uplink positioning signal and the received quality of the downlink positioning signal may be, for example, the sum of the received quality (for example, RSRQ, RSRP, SINR) of the uplink positioning signal and the received quality (for example, RSRQ, RSRP, SINR) of the downlink positioning signal. The value of the sum described above may be a value obtained using a true value, or may be a value obtained using a logarithmic value (for example, a decibel value). For example, the use of the value obtained using a logarithmic value increases influence of the value of the uplink positioning signal and the downlink positioning signal having poorer quality, which thus enables use of the measurement results whose received quality of the positioning signal both in the uplink and the downlink is secured. As a result, accuracy in position calculation of the UE itself using Multi-RTT can be enhanced.

As another example related to the combination of the received quality of the uplink positioning signal and the received quality of the downlink positioning signal, the poorer received quality out of the received quality of the uplink positioning signal and the received quality of the downlink positioning signal may be used. This enables use of the measurement results whose received quality of the positioning signal both in the uplink and the downlink is secured, for example. As a result, accuracy in position calculation of the UE itself using Multi-RTT can be enhanced.

As an example in which the UE uses the combination of the received quality of the uplink positioning signal and the received quality of the downlink positioning signal, results of a predetermined number of combinations may be used for position calculation of the UE itself in descending order from the results of the best combination. With this, for example, the UE can perform position calculation of the UE itself, using the positioning signal measurement results having high quality. As a result, accuracy in position calculation of the UE itself can be enhanced.

The predetermined number may be determined in a specification. Alternatively, the predetermined number may be determined by the base station and then notified to the UE. Alternatively, the predetermined number may be determined by the AMF and then notified to the UE via the serving base station. Alternatively, the predetermined number may be determined by the LMF and then notified to the UE via the serving base station.

As another example, the UE may use only the uplink positioning signal reception results whose received quality of the combination is equal to or higher than a predetermined threshold for position calculation of the UE itself. With this, for example, the same effect as that described above can be obtained.

The predetermined threshold may be determined in a specification. Alternatively, the predetermined threshold may be determined by the base station and then notified to the UE. Alternatively, the predetermined threshold may be determined by the AMF and then notified to the UE via the serving base station. Alternatively, the predetermined threshold may be determined by the LMF and then notified to the UE via the serving base station.

As another example, the UE may use the received quality of the predetermined number of combinations out of the measurement results whose received quality of the combination is equal to or higher than the predetermined threshold for position calculation of the UE itself in descending order from the best received quality of the combination. With this, for example, the UE can perform position calculation of the UE itself, using the positioning signal measurement results having higher quality. As a result, accuracy in position calculation of the UE itself can be further enhanced.

When there are a plurality of measurement results using the same beams of the UE itself, the UE may use the measurement results having good received quality of the uplink and/or downlink positioning signal for position calculation of the UE itself. The operation may be, for example, performed when the number of beams of the UE is larger than, or is equal to or larger than, a predetermined number. Alternatively, the operation may be, for example, performed when the number of the UEs themselves included in a plurality of measurement results of the UEs is larger than, or is equal to or larger than, a predetermined number. With this, for example, the UE can use the measurement results from various directions for position calculation of the UE itself. As a result, accuracy of positioning can be enhanced.

The LMF may perform the notification of the information related to the position of the base station to the UE before transmission and reception of the positioning signal starts. For example, the LMF may include the notification in a notification of information used for positioning (for example, LPP Provide Assistance Data disclosed in Non-Patent Document 22 (TS 38.305 V16.0.0)) to notify the UE of the notification. Alternatively, for example, the LMF may include the notification in a request for positioning (for example, LPP Request Location Information disclosed in Non-Patent Document 22 (TS 38.305 V16.0.0)) to notify the UE of the notification. With this, for example, the UE can promptly acquire the information, and can, as a result, promptly execute processing related to positioning.

As another example, the LMF may perform the notification of the information related to the position of the base station to the UE after transmission and reception of the positioning signal has ended. For example, the LMF may include the notification in a notification of the reception results of the positioning signal by the serving base station and/or the neighboring base station to notify the UE of the notification. When the base station is moving, the LMF may perform the notification of the information related to the position of the base station to the UE after transmission and reception of the positioning signal has ended. With this, for example, time alignment between the position of the base station and the reception results of the positioning signal can be easily secured. As a result, deterioration of positioning accuracy can be prevented.

For the notification, of the information related to the position of the base station from the LMF to the UE, LPP signaling may be used, or NRPPa signaling may be used. With this, for example, complexity in design of the communication system can be avoided.

As another example, for the notification, NAS signaling may be used. The signaling may be, for example, used when the LMF is present in a CN. With this, for example, complexity in design of the communication system can be avoided.

As another example, for the notification, RRC signaling may be used. The signaling may be, for example, used when the LMF is present in the serving base station. With this, for example, complexity in design of the communication system can be avoided.

As another example, for the notification, MAC signaling may be used. The signaling may be, for example, used when the LMF is present in the serving base station. With this, for example, the base station can promptly perform the notification.

As another example, for the notification, L1/L2 signaling may be used. The signaling may be, for example, used when the LMF is present in the serving base station. With this, for example, the base station can further promptly perform the notification.

The procedure up to reception of the positioning signal may be the same as the procedure disclosed in the first embodiment. With this, for example, complexity in the communication system can be avoided.

The UE may notify the LMF of information related to the position of the UE itself. With this, for example, the LMF can smoothly execute position control of served apparatuses.

Figure 28:
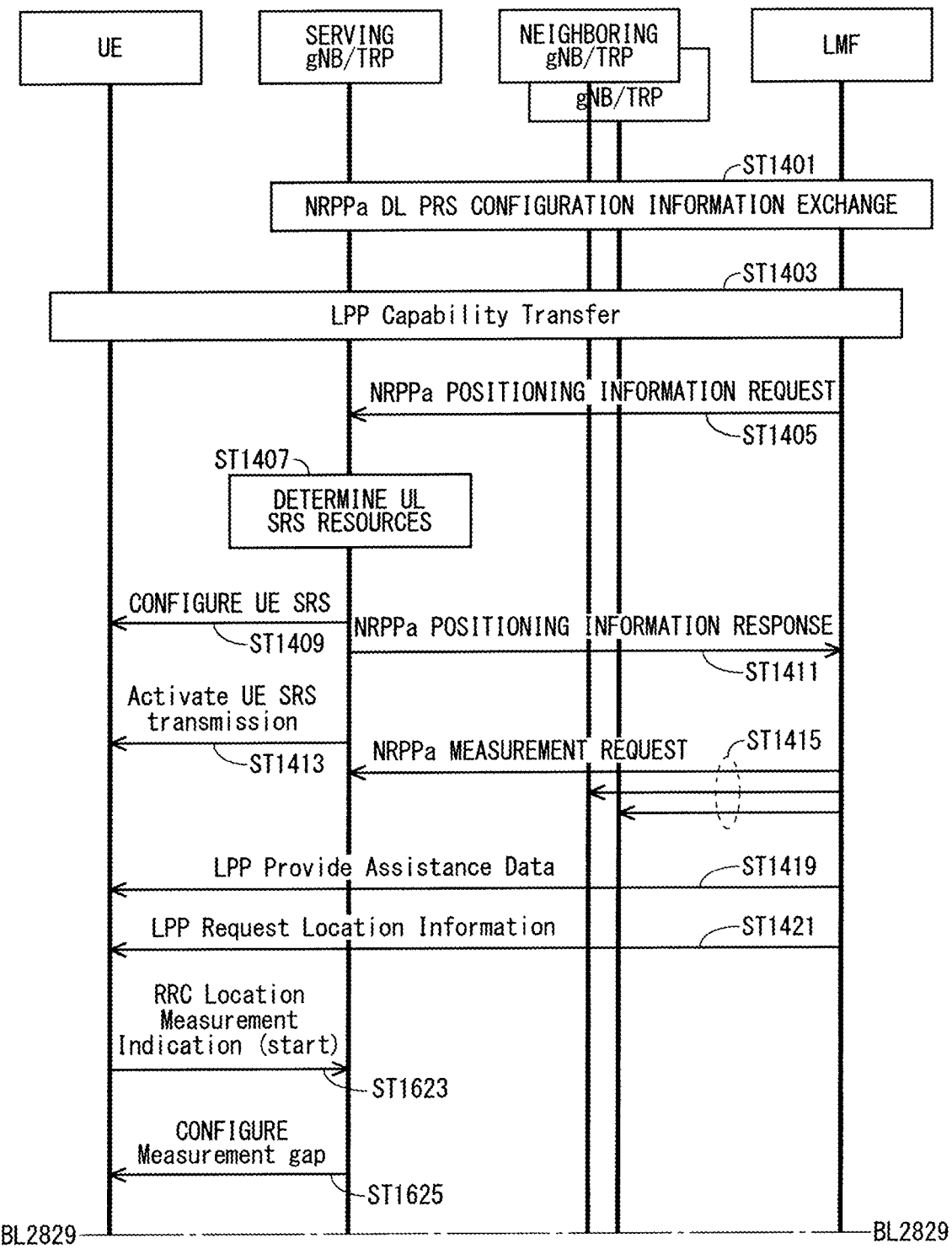
FIG. 28 is a sequence diagram illustrating operation in which the UE performs position calculation of the UE in Multi-RTT according to a second embodiment.
Figure 29:
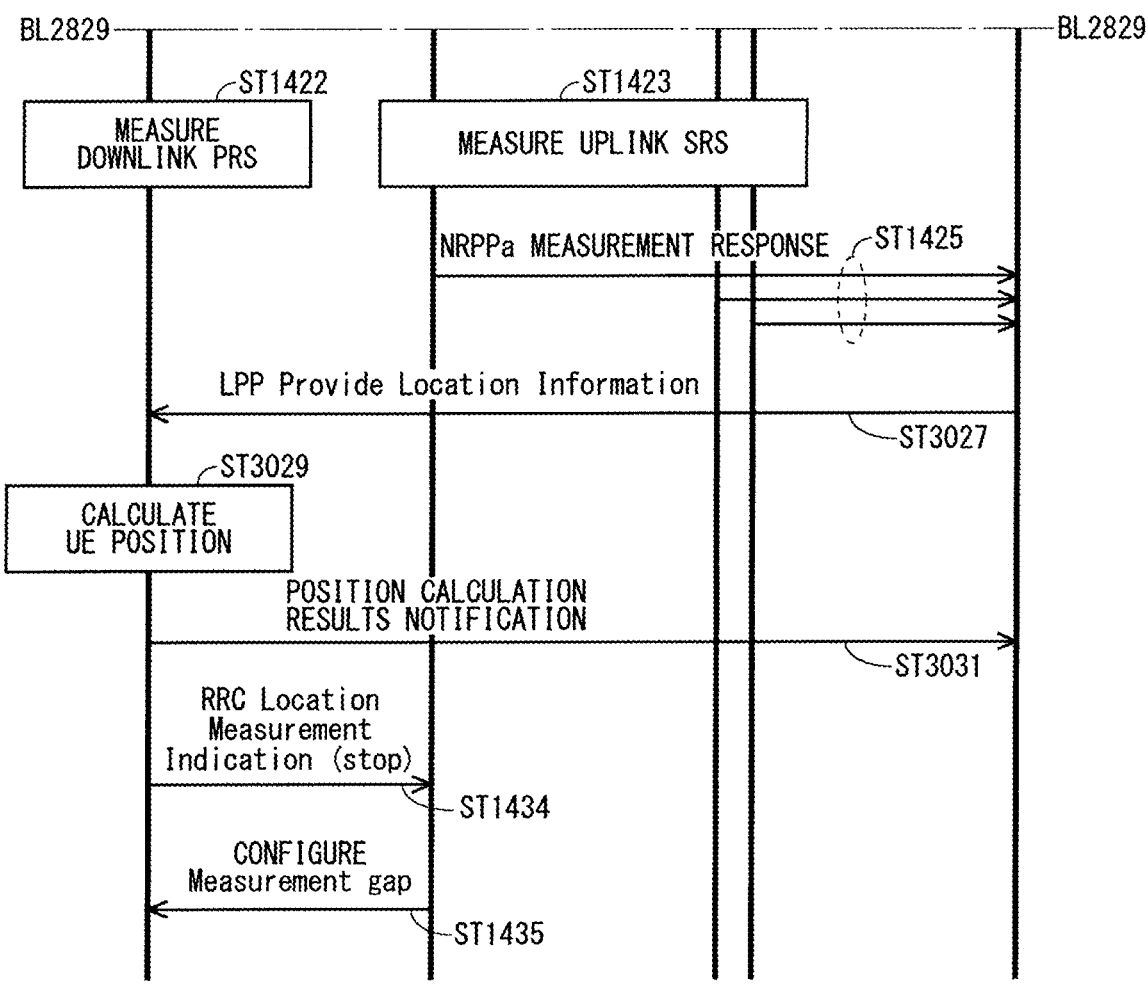
FIG. 29 is a sequence diagram illustrating the operation in which the UE performs position calculation of the UE in Multi-RTT according to the second embodiment.

FIG. 28 and FIG. 29 are sequence diagrams illustrating operation in which the UE performs position calculation of the UE in Multi-RTT. FIG. 28 and FIG. 29 are connected at the position of a boundary line BL2829. In FIG. 28 and FIG. 29, the same processes as those of FIG. 14 to FIG. 19 are denoted by the same step numbers, and common description will be omitted.

Steps ST1401 to ST1413 illustrated in FIG. 28 are the same as those of FIG. 14.

Step ST1415 illustrated in FIG. 28 is the same as that of FIG. 16.

In Step ST1419 illustrated in FIG. 28, the LMF notifies the UE of information used for positioning.

Step ST1421 illustrated in FIG. 28 is the same as that of FIG. 14.

Steps ST1623 and ST1625 illustrated in FIG. 28 are the same as those of FIG. 18.

Steps ST1422 to ST1425 illustrated in FIG. 29 are the same as those of FIG. 15.

In Step ST3027 illustrated in FIG. 29, the LMF notifies the UE of information related to the positioning signal reception results of the serving base station and/or the neighboring base station. For the notification, for example, LPP signaling may be used. The LPP signaling may be, for example, LPP Provide Location Information disclosed in Non-Patent Document 22 (TS 38.305 V16.0.0). Alternatively, new LPP signaling may be provided. In Step ST3029, the UE calculates the position of the UE itself.

In Step ST3031 illustrated in FIG. 29, the UE notifies the LMF of information related to the position of the UE itself. The information may be, for example, calculation results in Step ST3029. With this, for example, the LMF can smoothly execute position control of served apparatuses.

Steps ST1434 and ST1435 illustrated in FIG. 29 are the same as those of FIG. 15.

The notification of the positioning results from the neighboring base station may not be performed via the LMF. For example, the neighboring base station may notify the serving base station of the positioning results. The serving base station may notify the UE of the positioning results. With this, for example, the amount of signaling between the base station and the LMF can be reduced.

As an example in which the notification of the positioning results from the neighboring base station is not performed via the LMF, the information notified in Step ST1425 illustrated in FIG. 29 may be notified from the neighboring base station to the serving base station. The information notified in Step ST3027 illustrated in FIG. 29 may be notified from the serving base station to the UE. In the information notified from the serving base station to the UE in Step ST3027, the information notified from the neighboring base station to the serving base station in Step ST1425 may be included. With this, for example, the amount of signaling between the base station and the LMF can be reduced.

Another solution will be disclosed. The base station may notify the UE of information related to the position of the base station. In the notification, information related to the transmission and reception results of the positioning signal may be included. The information related to the reception results of the positioning signal notified from the base station to the UE may include (1) to (5) above disclosed as the pieces of information related to the transmission and reception results of the positioning signal notified from the LMF to the UE.

The notification of the information described above from the neighboring base station to the UE may be performed via the serving base station. The neighboring base station may notify the serving base station of the information described above. For the notification, an inter-base station interface, for example, an Xn interface, may be used. The serving base station may include the information notified from the neighboring base station in the notification to the UE. The UE may acquire the information from the serving base station and the neighboring base station, using the notification. With this, for example, the information from the serving base station and/or the neighboring base station can be promptly notified to the UE.

The method disclosed in the second embodiment may be applied to a case in which the base station includes the LMF.

Figure 30:
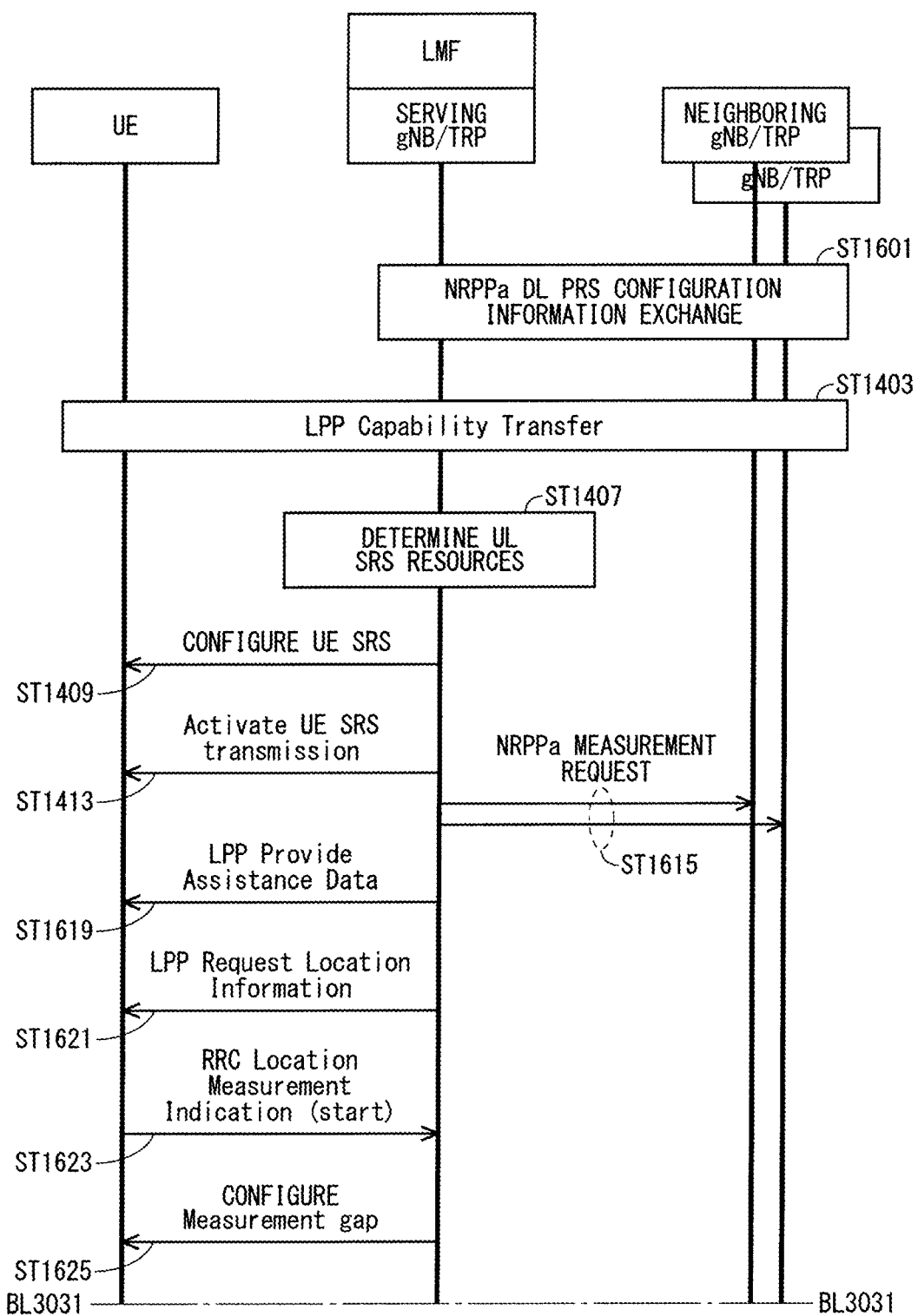
FIG. 30 is a sequence diagram illustrating operation in which the UE performs position calculation of the UE in Multi-RTT when a base station includes the LMF according to the second embodiment.
Figure 31:
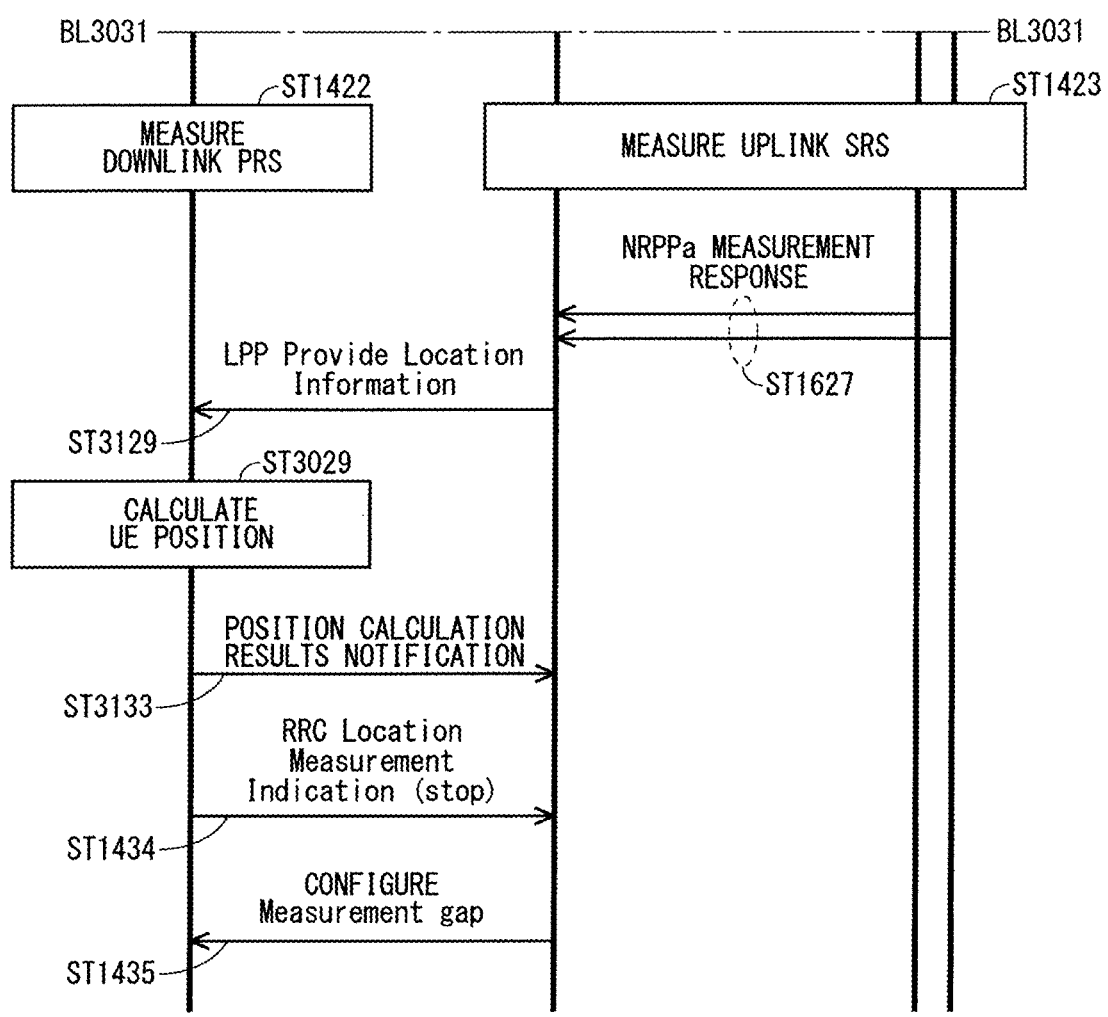
FIG. 31 is a sequence diagram illustrating the operation in which the UE performs position calculation of the UE in Multi-RTT when the base station includes the LMF according to the second embodiment.

FIG. 30 and FIG. 31 are sequence diagrams illustrating operation in which the UE performs position calculation of the UE in Multi-RTT when the base station includes the LMF. FIG. 30 and FIG. 31 are connected at the position of a boundary line BL3031. In FIG. 30 and FIG. 31, the same processes as those of FIG. 28 and FIG. 29 are denoted by the same step numbers, and common description will be omitted.

Steps ST1601 and ST1403 illustrated in FIG. 30 are the same as those of FIG. 18.

Steps ST1407 to ST1413 illustrated in FIG. 30 are the same as those of FIG. 14.

Step ST1615 illustrated in FIG. 30 is the same as that of FIG. 18.

Steps ST1619 to ST1625 illustrated in FIG. 30 are the same as those of FIG. 18.

Steps ST1422 and ST1423 illustrated in FIG. 31 are the same as those of FIG. 17.

Step ST1627 illustrated in FIG. 31 is the same as that of FIG. 19.

In Step ST3129 illustrated in FIG. 31, the serving base station notifies the UE of information related to the positioning signal reception results in the base station itself and/or the neighboring base station. For the notification, for example, LPP signaling may be used. For example, the LPP signaling may be LPP Provide Location Information disclosed in Non-Patent Document 22 (TS 38.305 V16.0.0), or new LPP signaling may be provided. In Step ST3029, the UE calculates the position of the UE itself.

In Step ST3133 illustrated in FIG. 31, the UE notifies the serving base station of information related to the position of the UE itself. The information may be, for example, calculation results in Step ST3029. With this, for example, the LMF included in the serving base station can smoothly execute position control of served apparatuses.

Steps ST1434 and ST1435 illustrated in FIG. 31 are the same as those of FIG. 15.

The method disclosed in the second embodiment may be applied to a case in which the UE includes the LMF. A sequence illustrating operation in which the UE performs position calculation of the UE in Multi-RTT when the UE includes the LMF may be the same as that of FIG. 22 and FIG. 23.

In the communication system, a plurality of apparatuses have the function of the LMF. For example, the apparatus may be the UE, may be the base station, or may be an apparatus in a core NW. The functions may be allotted between the LMFs included in the plurality of apparatuses. For example, the LMF included in the UE may perform position calculation, and the LMF included in the core NW may perform management of position calculation results (for example, coping with inquiries about the positioning results from other apparatuses). With this, for example, delay related to positioning can be reduced in the communication system.

When a plurality of apparatuses have the function of the LMF, for example, the LMF included in the UE may perform a part of the function of the LMF included in the base station. For example, the LMF included in the UE may perform position calculation of the UE itself. With this, for example, the same effect as that described above can be obtained.

When a plurality of apparatuses have the function of the LMF, one LMF (which may be hereinafter referred to as LMF1) may make an inquiry about position information of the UE to another LMF (which may be hereinafter referred to as LMF2). The LMF1 may be, for example, an LMF included in the base station and/or the core NW. The LMF2 may be, for example, an LMF included in the UE. The LMF2 may notify the LMF1 of the position information. For the inquiry and/or the notification of the position information, for example, LPP signaling may be used, or NRPPa signaling may be used. With this, for example, complexity in signaling between a plurality of LMFs can be avoided.

The method disclosed in the first embodiment may be applied to the second embodiment. For example, the base station may instruct the UE to configure the measurement gap without waiting for a measurement gap configuration request from the UE. With this, for example, latency of positioning can be further reduced.

The method disclosed in the first modification of the first embodiment may be applied to the second embodiment. For example, the serving base station may notify the neighboring base station of information related to beams used for communication with the UE. With this, for example, latency of positioning can be further reduced.

The method disclosed in the second modification of the first embodiment may be applied to the second embodiment. For example, correspondence may be configured between the downlink positioning signal and the uplink positioning signal. With this, for example, latency of positioning can be further reduced.

According to the second embodiment, latency can be reduced in positioning in which the UE performs position calculation.

Third Embodiment

No definition has been provided for processing in a case in which a contention occurs between a positioning procedure and other processing. As a result, a malfunction may occur between the UE and the base station.

In the third embodiment, a method for solving the problem described above will be disclosed.

Priority (which may be hereinafter referred to as positioning priority) is provided in the positioning procedure.

The positioning priority may be associated with a value in a ToS field (see Non-Patent Document 26 (IETF RFC 791)) of an IP header. The IP header described above may be an IPv4 header, or may be an IPv6 header. For example, it may be considered that the positioning procedure assigned positioning priority larger than the value in the ToS field has priority higher than transmission and reception of the IP packet.

As another example, the positioning priority may be associated with priority (Priority) (see Non-Patent Document 27 (TS 38.331)) assigned for each logical channel. For example, it may be considered that the positioning procedure assigned the positioning priority smaller than the Priority value has priority higher than transmission and reception of transport data of the logical channel. With this, for example, complexity in scheduling during execution of the positioning procedure can be avoided.

As another example, the positioning priority may be associated with a priority level (Priority Level) (see Section 5.7.3.3 of Non-Patent Document 20 (TS 23.501)) assigned for each QoS flow. For example, it may be considered that the positioning procedure assigned the positioning priority smaller than the Priority Level value has priority higher than transmission and reception of packets of the QoS flow. With this, for example, complexity in transmission and reception of packets during execution of the positioning procedure can be avoided.

As another example, the positioning priority may be determined in a fixed manner with respect to other processing. For example, the priority may be determined in a fixed manner in a specification. With this, for example, complexity in the communication system can be avoided.

The value of the positioning priority may be determined statically in a specification. With this, for example, complexity in the communication system can be avoided.

As another example, the value of the positioning priority may be semi-statically determined, or may be dynamically determined.

For example, the value of the positioning priority may be determined by a PCF. With this, for example, priority control can be uniformly executed in the communication system. As a result, a malfunction in apparatuses in the communication system can be prevented. The PCF may notify the base station of the determined value of the priority. The notification may be performed via the AMF and/or the LMF. The base station may notify the UE of the value of the priority. As another example, the AMF may directly notify the UE of the value of the priority using, for example, NAS signaling. As another example, the LMF may directly notify the UE of the value of the priority using, for example, LPP and/or NRPPa signaling.

As another example, the SMF may determine the value of the positioning priority. The SMF may determine the positioning priority, using information related to priority of other QoS flows. With this, for example, the amount of processing related to determination of the positioning priority can be reduced. The SMF may notify the base station of the determined value of the priority. The notification may be performed via the AMF and/or the LMF. The base station may notify the UE of the value of the priority. As another example, the AMF may directly notify the UE of the value of the priority using, for example, NAS signaling. As another example, the LMF may directly notify the UE of the value of the priority using, for example, LPP and/or NRPPa signaling.

As another example, the AMF may determine the value of the positioning priority. The AMF may, for example, determine the positioning priority, using information related to a load of a network. With this, for example, occurrence of network congestion due to positioning can be prevented. The AMF may notify the base station of the determined value of the priority. The base station may notify the UE of the value of the priority. As another example, the AMF may directly notify the UE of the value of the priority using, for example, NAS signaling. As another example, the AMF may notify the LMF of the value of the priority. The LMF may notify the UE of the value of the priority via the base station, or may directly notify the UE thereof using, for example, LPP and/or NRPPa signaling.

As another example, the LMF may determine the value of the positioning priority. With this, for example, in the communication system, positioning priority can be flexibly determined depending on a requirement imposed on positioning. The LMF may notify the AMF of the value of the priority, or may notify the base station thereof. The base station may notify the UE of the priority. The LMF may notify the UE of the priority. The notification from the LMF to the UE may be performed via the base station, or may be directly performed using, for example, LPP and/or NRPPa signaling.

As another example, the UE may determine the value of the positioning priority. The UE may notify the base station of the determined value, may notify the AMF thereof, or may notify the LMF thereof. With this, for example, flexible priority control depending on a state of the UE as a positioning target.

As another example, the UE may request the base station to perform determination of the value of the positioning priority, may request the AMF to perform the determination, or may request the LMF to perform the determination. In the request, information related to the value of the priority requested by the UE may be included. The base station, the AMF, and/or the LMF may determine the value of the positioning priority, using the request. The base station, the AMF, and/or the LMF may notify the UE of the determined value of the priority. With this, for example, the same effect as that described above can be obtained.

The UE may preferentially perform transmission and reception of data having priority higher than the positioning priority over transmission and reception of the positioning signal. For example, the UE may not receive the downlink positioning signal at timing overlapping transmission and reception of data (which may be hereinafter referred to as high priority data) that has priority higher than the positioning priority. The UE may resume reception of the downlink positioning signal after transmission and reception of the high priority data has completed.

Preemption may be used in transmission and reception of the high priority data in the UE. For example, when the UE receives a preemption notification from the base station, the UE may perform transmission and reception of the high priority data. With this, for example, complexity in the communication system can be avoided.

As another example, the UE may perform reception operation of the downlink positioning signal at timing overlapping transmission and reception of the high priority data. For example, when the UE includes a plurality of beams, the UE may simultaneously perform reception of the high priority data and the reception operation of the downlink positioning signal. As another example, when the UE includes a plurality of transmitters/receivers, the UE may simultaneously perform transmission of the high priority data and the reception operation of the downlink positioning signal.

As another example, the UE may not transmit the uplink positioning signal at timing overlapping transmission and reception of data (which may be hereinafter referred to as high priority data) that has priority higher than the positioning priority. The UE may resume transmission of the uplink positioning signal after transmission and reception of the high priority data has completed. The UE may not retransmit the uplink positioning signal unsuccessfully transmitted at the overlapping timing after transmission and reception of the high priority data has completed. For example, the UE may transmit transmission of the uplink positioning signal at the next transmission timing assigned to the uplink positioning signal. With this, for example, complexity in the communication system can be avoided. As another example, the UE may retransmit the uplink positioning signal unsuccessfully transmitted at the overlapping timing after transmission and reception of the high priority data has completed. With this, for example, the UE can promptly transmit the uplink positioning signal.

As another example, the UE may perform transmission operation of the uplink positioning signal at timing overlapping transmission and reception of the high priority data. For example, when the UE includes a plurality of beams, the UE may simultaneously perform transmission of the high priority data and the transmission operation of the uplink positioning signal. As another example, when the UE includes a plurality of transmitters/receivers, the UE may simultaneously perform reception and/or transmission of the high priority data and the transmission operation of the uplink positioning signal, The UE may perform the transmission operation of the uplink positioning signal at timing overlapping transmission and reception of the high priority data, with transmit power being reduced. With this, for example, interference from the UE can be reduced.

As another example, the UE may perform the transmission operation of the uplink positioning signal at timing overlapping transmission and reception of the high priority data, with transmit power being stopped. With this, for example, complexity of transmission control in the UE can be avoided.

Also when transmission and reception of the high priority data is performed using semi-persistent scheduling, the method described above may be applied. With this, for example, complexity in transmission and reception processing in the UE can be avoided.

A configuration may be provided that timing (for example, a period, and an offset for a period) of semi-persistent scheduling used for transmission and reception of the high priority data does not overlap timing (for example, a period, and an offset for a period) of transmission and reception of the positioning signal. The UE may expect that the timing (for example, a period, and an offset for a period) of semi-persistent scheduling used for transmission and reception of the high priority data does not overlap the timing (for example, a period, and an offset for a period) of transmission and reception of the positioning signal. This can prevent transmission and reception of the positioning signal from being impracticable in the UE due to overlap of the timings of semi-persistent scheduling and the transmission and reception of the positioning signal, for example.

Also when transmission and reception of the high priority data is performed using a configured grant (Configured grant), the method described above may be applied. With this, for example, complexity in transmission and reception processing in the UE can be avoided.

A configuration may be provided that timing (for example, a period, and an offset for a period) of the configured grant used for transmission and reception of the high priority data does not overlap timing (for example, a period, and an offset for a period) of transmission and reception of the positioning signal. The UE may expect that the timing (for example, a period, and an offset for a period) of the configured grant used for transmission and reception of the high priority data does not overlap the timing (for example, a period, and an offset for a period) of transmission and reception of the positioning signal. This can prevent transmission and reception of the positioning signal from being impracticable in the UE due to overlap of the timings of the configured grant and the transmission and reception of the positioning signal, for example.

Also when timings of transmission and reception of data using dynamic scheduling and transmission and reception of the positioning signal overlap, the method described above may be applied. For example, it may be considered that transmission and reception of data using dynamic scheduling has priority higher than transmission and reception of the positioning signal. With this, for example, complexity in processing of the UE can be avoided.

The UE may not perform transmission and reception of data (which may be hereinafter referred to as low priority data) that has priority lower than the positioning priority. The UE may preferentially perform transmission and reception of the positioning signal over transmission and reception of the low priority data. For example, the UE may receive the downlink positioning signal at timing overlapping transmission and reception of the low priority data. The UE may perform transmission and reception of the low priority data after reception of the downlink positioning signal has completed. As another example, the UE may transmit the uplink positioning signal at timing overlapping transmission and reception of the low priority data. The UE may perform transmission and reception of low priority data after reception of the uplink positioning signal has completed.

Retransmission may be used for reception of the low priority data unsuccessfully received in the description above. The retransmission may be, for example, HARQ retransmission. For example, the UE may perform reception of unsuccessfully received low priority downlink data, using HARQ retransmission. The UE may not perform a HARQ response for the unsuccessfully received downlink data. The base station may perform HARQ retransmission to the UE, using the fact that there is no HARQ response from the UE. With this, for example, complexity in reception of the low priority data can be avoided.

Retransmission may be used for transmission of the low priority data unsuccessfully received in the description above. The retransmission may be, for example, HARQ retransmission. For example, the UE may perform transmission of unsuccessfully transmitted low priority uplink data, using HARQ retransmission. The base station may notify the UE of an uplink grant for retransmission of the uplink data unsuccessfully transmitted by the UE. The UE may perform retransmission of the unsuccessfully transmitted uplink data, using the grant. With this, for example, complexity in transmission of the low priority data can be avoided.

As another example, the UE may perform transmission and reception operation of the low priority data at timing overlapping reception of the downlink positioning signal. For example, when the UE includes a plurality of beams, the UE may simultaneously perform reception of the downlink positioning signal and the transmission and reception operation of the low priority data. As another example, when the UE includes a plurality of transmitters/receivers, the UE may simultaneously perform reception of the downlink positioning signal and the transmission and reception operation of the low priority data. With this, for example, efficiency in the communication system can be enhanced.

As another example, the UE may perform transmission and reception operation of the low priority data at timing overlapping transmission of the uplink positioning signal. For example, when the UE includes a plurality of beams, the UE may simultaneously perform transmission of the uplink positioning signal and transmission and reception operation of the low priority data. As another example, when the UE includes a plurality of transmitters/receivers, the UE may perform transmission of the uplink positioning signal and transmission and reception operation of the low priority data. With this, for example, efficiency in the communication system can be enhanced.

The UE may perform the transmission operation of the low priority data at timing overlapping transmission of the uplink positioning signal, with transmit power being reduced. With this, for example, interference from the UE can be reduced in the base station.

As another example, the UE may perform the transmission operation of the low priority data at timing overlapping transmission of the uplink positioning signal, with transmit power being stopped. With this, for example, complexity of transmission control in the UE can be avoided.

Also when transmission and reception of the low priority data is performed using semi-persistent scheduling, the method described above may be applied. With this, for example, complexity in transmission and reception processing in the UE can be avoided.

A configuration may be provided that timing (for example, a period, and an offset for a period) of semi-persistent scheduling used for transmission and reception of the low priority data does not overlap timing (for example, a period, and an offset for a period) of transmission and reception of the positioning signal. The UE may expect that the timing (for example, a period, and an offset for a period) of semi-persistent scheduling used for transmission and reception of the low priority data does not overlap the timing (for example, a period, and an offset for a period) of transmission and reception of the positioning signal. This can prevent transmission and reception of the low priority data from being impracticable in the UE due to overlap of the timings of semi-persistent scheduling and the transmission and reception of the positioning signal, for example.

Also when transmission and reception of the low priority data is performed using a configured grant (Configured grant), the method described above may be applied. With this, for example, complexity in transmission and reception processing in the UE can be avoided.

A configuration may be provided that timing (for example, a period, and an offset for a period) of the configured grant used for transmission and reception of the low priority data does not overlap timing (for example, a period, and an offset for a period) of transmission and reception of the positioning signal. The UE may expect that the timing (for example, a period, and an offset for a period) of the configured grant used for transmission and reception of the low priority data does not overlap the timing (for example, a period, and an offset for a period) of transmission and reception of the positioning signal. This can prevent transmission and reception of the low priority data from being impracticable in the UE due to overlap of the timings of the configured grant and the transmission and reception of the positioning signal, for example.

The serving base station may acquire information related to the semi-persistent scheduling and/or the configured grant in the neighboring base station from the neighboring base station. The semi-persistent scheduling and/or the configured grant in the neighboring base station may be used for transmission and reception to and from another UE. This can prevent transmission and reception of the positioning signal to and from the UE from being suspended due to the semi-persistent scheduling and/or the configured grant with another UE, for example.

The serving base station may request, from the neighboring base station, information related to the semi-persistent scheduling and/or the configured grant in the neighboring base station. The request may be performed via the LMF, or may be directly performed from the serving base station to the neighboring base station. For example, the serving base station may perform the request, using an inter-base station interface.

The neighboring base station may notify the serving base station of the information related to the semi-persistent scheduling and/or the configured grant in the base station itself. The notification may be performed via the LMF, or may be directly performed from the neighboring base station to the serving base station. For example, the serving base station may perform the request, using an inter-base station interface.

As examples of the information related to the semi-persistent scheduling and/or the configured grant in the neighboring base station, the following (1) to (5) are disclosed:

(1) Information related to a direction of transmission;
(2) Information related to a type of the semi-persistent scheduling and/or the configured grant;
(3) Information related to assignment timing;
(4) Information related to priority of communication;
(5) Combination of (1) to (4) above.

The information related to (1) above may be, for example, information representing an uplink or a downlink. The serving base station may perform a configuration for the UE to stop transmission of the uplink positioning signal at timing of downlink transmission in the neighboring base station using, for example, the information related to (1) above. With this, for example, interference in another UE to have communication with the neighboring base station can be prevented.

The information related to (2) above may be information related to a distinction between the semi-persistent scheduling and the configured grant. The base station may determine which communication, out of uplink communication and downlink communication, in the neighboring base station is to be performed, using the information related to the distinction. With this, for example, the same effect as that described above can be obtained.

As another example, the information related to (2) above may include information related to a type of the configured grant. The information may be, for example, a type disclosed in Section 5.3.1 of Non-Patent Document 16 (TS 38.300). The serving base station may determine whether or not there is transmission and reception of the positioning signal of the UE, using the information. For example, when the configured grant is configured using only RRC signaling, the serving base station may be configured not to perform transmission and reception of the positioning signal of the UE. Further, for example, when the configured grant is configured using RRC signaling and DCI, the serving base station may be configured to perform transmission and reception of the positioning signal of the UE. With this, for example, efficiency of transmission and reception in the communication system can be enhanced.

The information related to (3) above may include information related to a period of the semi-persistent scheduling and/or the configured grant of the neighboring base station. The information related to (3) above may include information related to an offset for a period, that is, assignment timing in a certain period. The information related to (3) above may include information related to a length assigned to transmission and reception of the positioning signal, for example, the number of subframes, the number of slots, and/or a symbol length. The information related to (3) above may be a combination of the plurality of items described above. The serving base station may determine the timing of transmission and reception of the positioning signal in the UE, using the information. With this, for example, the timing of transmission and reception of the positioning signal can avoid the timing of the semi-persistent scheduling and/or the configured grant of the neighboring base station.

The information related to (4) above may be, for example, information having the highest priority in communication that can be transmitted and received in the semi-persistent scheduling and/or the configured grant of the neighboring base station. The serving base station may configure the UE so as not to perform transmission and reception of the positioning signal in positioning of the positioning priority lower than the priority at the timing of the semi-persistent scheduling and/or the configured grant of the neighboring base station, using the information related to (4) above. With this, for example, suspension of high priority communication in the neighboring base station can be prevented.

The method disclosed in the third embodiment may be applied to positioning in which the UE performs position calculation, that is, UE-based positioning. With this, for example, latency of high priority communication can be secured, and latency in the UE-based positioning can be reduced.

The method disclosed in the third embodiment may be applied to positioning in which the LMF performs position calculation, that is, UE-assisted positioning. With this, for example, latency of high priority communication can be secured, and latency in the UE-assisted positioning can be reduced.

Different positioning priorities may be given between the UE-based positioning and the UE-assisted positioning. For example, in the UE-based positioning, priority higher than that of the UE-assisted positioning may be given. With this, for example, in the communication system, the UE-based positioning can be promptly executed, and as a result, latency in the UE-based positioning can be reduced.

According to the third embodiment, inconsistency in operations related to the positioning procedure can be prevented between the base station and the UE. As a result, robustness of the communication system can be enhanced.

Fourth Embodiment

The UE employing discontinuous reception (DRX) may not perform transmission and reception of the positioning signal. As another example, the UE employing DRX may perform transmission and reception of the positioning signal. The UE may perform transmission and reception of the positioning signal within active time of DRX.

However, a method for satisfying, when DRX is employed, the same requirement for that when DRX is not employed, is not disclosed. Thus, there is a problem in that a requirement for positioning cannot be satisfied when DRX is employed.

In the fourth embodiment, a method for solving the problem described above will be disclosed.

Time and/or frequency resources for positioning are specified in advance. In the resources, an interval out of the active time of DRX may be included. The UE may also perform the operation of transmission and reception of the positioning signal at the interval out of the active time of DRX.

The resources may be present in a frequency range narrower than that for regular communication. With this, for example, power consumption in the UE can be reduced.

For example, the time and/or frequency resources for positioning (which may be hereinafter referred to as resources for positioning) may be configured in advance. The configuration may be, for example, performed using the same method as that for the configured grant.

The resources for positioning may be configured by the LMF. The LMF may request information related to DRX configuration from the serving base station. The serving base station may notify the LMF of the information. The LMF may determine the resources for positioning by using the information. For example, the LMF may configure the resources for positioning so as to be included in DRX active time (or On duration time) configured by the serving base station. With this, for example, increase of power consumption in the UE can be prevented.

The LMF may notify the serving base station of the determined configuration of the resources for positioning, may notify the neighboring base station thereof, or may notify the UE thereof. The notification of the configuration from the LMF to the UE may be performed via the serving base station. The notification from the LMF to the neighboring base station may be directly performed, or may be performed via the serving base station. The notification of the configuration from the serving base station to the UE may be performed using RRC signaling, may be performed using MAC signaling, or may be performed using L1/L2 signaling. Alternatively, the notification of the configuration from the serving base station to the UE may be performed in a manner that NAS signaling is directly transferred to the UE, or may be performed in a manner that LPP and/or NRPPa signaling is directly transferred to the UE.

The UE, the serving base station, and/or the neighboring base station performs transmission and reception of the positioning signal, using the resources.

The semi-persistent scheduling and/or the configured grant for transmission and reception of positioning results may be provided. The semi-persistent scheduling and/or the configured grant may be transmittable out of the DRX active time. With this, for example, power consumption can be reduced, and prompt positioning can be performed.

Whether or not transmission and reception of the UE can be performed out of the DRX active time may be configurable. With this, for example, the communication system can be flexibly operated.

The base station may perform the configuration. The base station may notify the UE of the configuration. For the notification of the configuration, for example, RRC signaling may be used. With this, for example, the base station can transmit much information to the UE. As another example, for the notification of the configuration, MAC signaling may be used. With this, for example, the base station can promptly transmit the information to the UE. As another example, for the notification of the configuration, L1/L2 signaling may be used. With this, for example, the base station can further promptly transmit the information to the UE.

The base station may notify the LMF of the configuration. For the notification from the base station to the LMF, for example, an inter-base station interface may be used, or an interface between the LMF and the base station may be used. For the notification, for example, LPP and/or NRPPa signaling may be used. The LMF may estimate positioning latency of the UE, using the information. With this, for example, efficient positioning operation in the communication system can be performed.

As another example, the UE may perform the configuration. The UE may, for example, perform the configuration, using a remaining battery life of the UE itself. For example, when the remaining battery life is less than a predetermined threshold, the UE may be unable to perform transmission and reception of the positioning signal out of the DRX active time. When the remaining battery life is equal to or more than the predetermined threshold, the UE may be able to perform transmission and reception of the positioning signal out of the DRX active time. With this, for example, flexible positioning control depending on a state (for example, the remaining battery life) of the UE can be performed.

The UE may notify the base station of the configuration. For the configuration from the UE to the base station, for example, RRC signaling may be used. With this, for example, the UE can transmit much information to the base station. As another example, for the notification of the configuration, MAC signaling may be used. With this, for example, the UE can promptly transmit the information to the base station. As another example, for the notification of the configuration, L1/L2 signaling may be used. With this, for example, the UE can further promptly transmit the information to the base station. The base station may notify the LMF of the configuration. The notification of the configuration from the base station to the LMF may be performed using the same method as that described above.

As another example, the LMF may perform the configuration. The LMF may, for example, determine the configuration, using the priority of positioning in each UE (see the third embodiment). For example, regarding the UE having high positioning priority, the UE may be configured to be able to perform transmission and reception out of the DRX active time. Regarding the UE having low positioning priority, the UE may be configured to be unable to perform transmission and reception out of the DRX active time. The LMF may notify the UE of the configuration. For the notification, for example, NAS signaling may be used, or LPP and/or NRPPa signaling may be used. The notification from the LMF to the UE may be performed via the base station.

As another example, the AMF may perform the configuration. The AMF may, for example, perform the configuration, using information related to a load state of a communication NW. For example, regarding the UE connected to the NW having a large load of the communication NW, the AMF may configure the UE to be unable to perform transmission and reception out of the DRX active time. Regarding the UE connected to the NW having a small load of the communication NW, the AMF may configure the UE to be able to perform transmission and reception out of the DRX active time. The AMF may notify the UE of the configuration. For the notification, for example, NAS signaling may be used. In the NAS signaling, LPP and/or NRPPa signaling may be included. As another example, the notification from the AMF to the UE may be performed via the base station.

According to the fourth embodiment, low latency positioning can also be performed in the UE during DRX.

Fifth Embodiment

Handover of the base station may be performed during the positioning procedure. For example, the source base station on movement may notify the AMF of measurement results of the positioning signal. The AMF may transfer the information to a location retrieval function (LRF) (see Non-Patent Document 20 (TS 23.501)). The UE may notify the target base station on movement of information related to the positioning results. The target base station on movement may transfer the information to the LRF. The operation described above may be, for example, performed when the LRF does not change before and after the handover of the UE.

As another example, the AMF may transfer, to the LMF, the information notified from the source base station on movement. The target base station on movement may transfer, to the LMF, the information notified from the UE. The operation described above may be, for example, performed when the LMF does not change before and after the handover of the UE.

However, processing of the handover during the positioning procedure when the base station includes the LMF is not disclosed. Thus, when the base station includes the LMF, there is a problem in that the positioning procedure cannot be executed and/or in that the handover cannot be completed normally.

In the fifth embodiment, a method for solving the problem described above will be disclosed.

Positioning is continued between the UE and the source base station on movement. The UE may perform transmission and reception of the positioning signal to and from the source base station on movement. The UE may notify the source base station on movement of information related to reception results of the positioning signal. The source base station on movement may perform position calculation of the UE, using the information. The source base station on movement may perform the handover of the UE after the source base station on movement has received the notification of the positioning signal reception results from the UE.

For example, signaling of a handover request, a handover request positive response, and/or a handover reject between the source base station on movement and the target base station on movement may be performed after the source base station on movement has received the notification of the positioning signal reception results from the UE. The source base station on movement may instruct the UE to perform handover after the source base station on movement has received the handover request positive response from the target base station on movement. The UE may perform the handover from the source base station on movement to the target base station on movement, using the instruction. With this, for example, handover processing after the positioning signal reception results can be promptly executed.

The target base station on movement may perform position calculation of the UE. The source base station on movement may transfer information related to the positioning signal reception results to the target base station on movement. The information may include positioning signal reception results in the UE, the source base station on movement, and/or the neighboring base station, may include information for identifying the UE, the source base station on movement, and/or the neighboring base station, or may include information of a combination of the above description. The target base station on movement may perform position calculation of the UE, using the information. The source base station on movement may include the information in the handover request to notify the target base station on movement of the information. With this, for example, the amount of signaling between the base stations can be reduced.

As another example, signaling of a handover request, a handover request positive response, and/or a handover reject between the source base station on movement and the target base station on movement may be performed before reception of the notification of the positioning signal reception results from the UE. The handover instruction from the source base station on movement to the UE may be performed after the notification of the positioning signal reception results from the UE to the source base station on movement. With this, for example, handover processing after UE position calculation can be promptly executed. The UE may expect that the handover instruction from the source base station on movement is transmitted after the notification of the positioning signal reception results to the source base station on movement. With this, for example, complexity related to positioning can be avoided in the communication system.

The source base station on movement may notify the target base station on movement of information related to positioning of the UE. The target base station on movement may or may not perform positioning with the UE, using the information. For example, the target base station on movement may perform positioning of the UE at the next positioning timing, using the information. With this, for example, complexity related to positioning can be avoided in the communication system. The source base station on movement may include the information in the handover request to notify the target base station on movement of the information. With this, for example, the amount of signaling between the base stations can be omitted.

As examples of the information related to positioning of the UE transmitted from the source base station on movement to the target base station on movement, the following (1) to (11) are disclosed:
 (1) Information related to the position of the UE;
 (2) Information for identifying the UE;
 (3) Information related to positioning time;
 (4) Information related to a period of positioning;
 (5) Information related to priority of positioning;
 (6) Information related to a positioning method;
 (7) Information related to the neighboring base station;
 (8) Information related to the base station itself;
 (9) Information related to frame timing of the base station;
 (10) Information related to the measurement gap configuration of the UE;
 (11) Combination of (1) to (10) above.

The information related to (1) above may be, for example, position calculation results of the UE derived by the source base station on movement. The target base station on movement may perform control of the UE after handover by using the information related to (1) above. This can eliminate the need of re-calculation of the UE position performed by the target base station on movement, for example. As a result, increase of latency in positioning at the time of handover can be prevented.

The information related to (2) above may be, for example, an identifier of the UE. The identifier may be a UE-ID, or may be a Subscription Permanent Identifier (SUPI), a Subscription Concealed Identifier (SUCI), a Permanent Equipment Identifier (PEI), and/or a 5G Globally Unique Temporary Identifier (5G-GUTI) disclosed in Non-Patent Document 20 (TS 23.501). The target base station on movement may recognize the UE as the positioning target, using the information. With this, for example, the target base station on movement can promptly know the UE as the positioning target.

The information related to (3) above may be, for example, information related to time at which the source base station on movement derives the position of the UE. The target base station on movement may derive time at which the next positioning of the UE is to be performed, using the information. With this, for example, occurrence of vacancy of the positioning timing of the UE due to handover can be prevented.

As another example, the information related to (3) above may be information related to time at which the UE and/or the source base station on movement acquires the positioning signal reception results. The target base station on movement may perform association between the position of the UE and the time, using the information. With this, for example, the position of the UE at predetermined time can be estimated with high accuracy in the communication system.

The information related to (4) above may be, for example, notified in a system in which the UE requires periodic positioning. The target base station on movement may derive time at which the next positioning of the UE is to be performed, using the information related to (4) above. With this, for example, occurrence of vacancy of the positioning timing of the UE due to handover can be prevented.

The information related to (5) above may be, for example, the priority disclosed in the third embodiment. The target base station on movement may perform priority control related to transmission and reception of the positioning signal, using the information. With this, for example, the target base station on movement can smoothly execute priority control related to positioning of the UE.

For example, the information related to (6) above may be information indicating Multi-RTT, or may be Observed Time Difference of Arrival (OTDOA). For example, the information related to Multi-RTT may be base station-initiated Multi-RTT (that is, UE-assisted Multi-RTT), or may be UE-initiated Multi-RTT (that is, UE-based Multi-RTT). The base station on movement may acquire information related to the positioning method of the UE, using the information. With this, for example, the same positioning method can be applied to the UE before and after the handover. As a result, positioning can be promptly completed before and after the handover.

For example, the information related to (7) above may be information related to an identifier of the neighboring base station (for example, a gNB-ID), may be an identifier of the cell (for example, a PCI, a global cell ID), may be an identifier of the DU (for example, a DU-ID), may be an identifier of the TRP (for example, a TRP-ID), or may be a plurality of pieces of information of the above description. The information related to (7) above may include information related to the position of the neighboring base station, the cell, the DU, and/or the TRP. The target base station on movement may determine the base station to be used for positioning of the UE, using the information. For example, the target base station on movement may directly use the neighboring base station in positioning by the source base station on movement. With this, for example, latency of positioning at the time of handover can be reduced.

For example, as with the information related to (7) above, the information related to (8) above may be information related to the identifier of the base station itself, the cell itself, the DU itself, and/or the TRP itself, may be information related to the position of the base station itself, the cell itself, the DU itself, and/or the TRP itself, or may be a plurality of items described above. For example, the target base station on movement may determine to use the source base station on movement for positioning of the UE as the neighboring base station, using the information. With this, for example, flexibility in positioning by the target base station on movement can be enhanced.

The information related to (9) above may be, for example, information in which a predetermined frame, subframe, slot, and/or symbol in the source base station on movement and time are associated with each other. The associated information may be, for example, time at the start or the end of the predetermined frame. The information may be used in combination with information of a frame number in the source base station on movement. The target base station on movement may derive a difference of frame timing from the source base station on movement, using the information. With this, for example, the target base station on movement can know timing of transmission and reception of the positioning signal in the source base station on movement.

The information related to (10) above may be, for example, the measurement gap for transmission and reception of the positioning signal in the UE disclosed in the first embodiment. The target base station on movement may directly configure the measurement gap with the UE, or may change the measurement gap with the UE, using the information. This enables prompt measurement gap configuration for the UE, for example.

Another solution will be disclosed. A part of the positioning procedure may be performed between the UE and the target base station on movement. For example, the notification of the positioning signal reception results between the UE and the source base station on movement may be performed between the UE and the target base station on movement. This can prevent communication loss between the UE and the NW due to deterioration of communication quality with the source base station on movement during execution of the positioning procedure, for example.

For example, signaling of a handover request, a handover request positive response, and/or a handover reject between the source base station on movement and the target base station on movement may be performed before completion of transmission and reception of the positioning signal between the UE and the base station. The handover instruction from the source base station on movement to the UE may be performed after completion of transmission and reception of the positioning signal between the UE and the base station. The completion of transmission and reception of the positioning signal described above may be, for example, completion of transmission and reception of the positioning signal in the serving base station and/or the neighboring base station. The serving base station described above may be a source base station on movement. The neighboring base station may notify the serving base station of completion of transmission and/or reception of the positioning signal. With this, for example, the serving base station can know completion of transmission and reception of the positioning signal in the neighboring base station. The UE may expect that the handover instruction from the source base station on movement is transmitted after transmission of the uplink positioning signal from the UE itself, or may expect that the handover instruction from the source base station on movement is transmitted before notification of the downlink positioning signal reception results from the UE itself. With this, for example, the handover can be executed before the communication quality between the UE and the source base station on movement deteriorates, and as a result, stability in the communication system can be enhanced.

The UE notifies the target base station on movement of information related to reception results of the positioning signal. The target base station on movement may transfer the information to the source base station on movement. The neighboring base station may notify the source base station on movement of information related to the positioning signal reception results in the base station itself. The source base station on movement may perform position calculation of the UE, using the information. This eliminates the need of notification of information related to positioning from the source base station on movement to the target base station on movement, for example. As a result, the amount of signaling in the inter-base station interface can be reduced. Position calculation in the source base station on movement may be, for example, performed when the target base station on movement does not have a positioning function. With this, for example, when the target base station on movement does not have the positioning function, positioning of the UE can be continued.

The source base station on movement may make an inquiry about presence or absence of the positioning function to the target base station on movement, or may notify the target base station on movement of information indicating that the positioning procedure is being executed. The inquiry and/or the notification of the information may be, for example, included in the signaling of the handover request (Handover request). The target base station on movement may notify the source base station on movement of presence or absence of the positioning function. For example, the inquiry may be included in the signaling of the handover request positive response (Handover request acknowledgement), or may be included in the signaling of the handover reject (Handover reject). This eliminates the need of addition of new inter-base station signaling, for example, and as a result, complexity in the communication system can be avoided.

The source base station on movement may request the target base station on movement to transfer the reception results of the positioning signal. The request may be, for example, included in the signaling of the handover request (Handover request). With this, for example, the amount of signaling between the base stations can be reduced. As another example, signaling different from the handover request may be used for the request. For example, new signaling may be used. With this, for example, complexity in the signaling of the handover request can be avoided.

As another example, the target base station on movement may perform position calculation of the UE, or the source base station on movement may notify the target base station on movement of information related to the positioning signal reception results. The source base station on movement may include the information related to the positioning signal reception results in the neighboring base station in the information to notify the target base station on movement of the information. The neighboring base station may notify the source base station on movement of the information related to the positioning signal reception results in the base station itself. The source base station on movement may notify the target base station on movement of information related to positioning of the UE. The information may include the pieces of information (1) to (11) related to positioning of the UE described above. The target base station on movement may perform position calculation of the UE, using the information. With this, for example, the amount of processing in the source base station on movement can be reduced.

As another example of the case in which the target base station on movement performs position calculation of the UE, the neighboring base station may notify the target base station on movement of information related to the positioning signal reception results of the base station itself. The target base station on movement may establish an inter-base station interface with the neighboring base station. The source base station on movement may notify the target base station on movement of information related to the positioning signal reception results. The information related to the positioning signal reception results may be, for example, only the positioning signal reception results received in the base station itself. The source base station on movement may notify the target base station on movement of the information related to positioning of the UE. The information may include the pieces of information (1) to (11) related to positioning of the UE described above. The target base station on movement may perform position calculation of the UE, or may establish an interface with the neighboring base station, using the information. With this, for example, the amount of processing in the source base station on movement can be reduced.

Another solution will be disclosed. Transmission and reception of the positioning signal may be performed between the UE and the target base station on movement. The positioning procedure may be performed between the UE and the target base station on movement after the handover. For example, the handover instruction from the source base station on movement to the UE may be performed before the positioning signal transmission and reception start request from the LMF to the UE. The UE may not perform transmission and reception of the positioning signal to and from the source base station on movement. The source base station on movement may stop the positioning procedure with the UE.

The source base station on movement may notify the target base station on movement of information related to the positioning procedure. For example, the information may be information indicating that the positioning procedure is being executed, or may include the pieces of information (1) to (11) related to positioning of the UE described above. The information may be, for example, included in the handover request.

The target base station on movement may execute the positioning procedure with the UE, using the information. For example, the target base station on movement may execute positioning of the UE by directly using a configuration used in positioning by the source base station on movement, or may perform positioning with the UE by changing a part of the configuration. As another example, the target base station on movement may perform positioning with the UE by directly using the neighboring base stations before the handover, or may perform positioning with the UE by changing, adding, or omitting a part of the neighboring base stations. With this, for example, latency of positioning at the time of handover can be reduced.

The target base station on movement may notify the source base station on movement of the configuration of positioning in the target base station on movement. The configuration may be, for example, included in the handover request positive response to be notified. The source base station on movement may notify the UE of the configuration. The configuration may be, for example, included in the handover instruction to the UE. The UE may perform transmission and reception of the positioning signal to and from the target base station on movement, using the configuration. With this, for example, positioning in the target base station on movement can be promptly executed.

When the target base station on movement does not have the positioning function, the handover may not be performed. For example, the handover to the target base station on movement may be cancelled. The source base station on movement may notify the target base station on movement of information indicating that the positioning procedure is being executed. The information may be, for example, included in the handover request (Handover request). The target base station on movement may notify the source base station on movement of rejection of the handover request of the UE. For the notification, for example, signaling of a handover request reject (Handover request reject) may be used. The notification of the rejection may include information related to a cause. As the cause, information indicating that the target base station on movement does not have the positioning function may be included. The source base station on movement may not perform the handover to the target base station on movement, using the information. With this, for example, suspension of the positioning function due to the handover can be prevented.

The source base station on movement may perform the handover processing to another base station, or may not perform the handover.

As another example of the case in which the target base station on movement does not have the positioning function, the positioning procedure may be stopped. The source base station on movement may perform the handover to the target base station on movement.

Regarding whether or not the handover can be performed and/or whether or not the positioning procedure is executed, an adjustment may be made between the source base station on movement and the target base station on movement. For example, the handover request may be performed from the source base station on movement to the target base station on movement a plurality of times. The source base station on movement may notify the target base station on movement of information indicating that the positioning procedure is being executed. The information may be, for example, included in the handover request (Handover request). The target base station on movement may notify the source base station on movement of rejection of the handover request of the UE. For the notification, for example, signaling of a handover request reject (Handover request reject) may be used. The notification of the rejection may include information related to a cause. As the cause, information indicating that the target base station on movement does not have the positioning function may be included. The source base station on movement may determine to stop positioning of the UE, using the information. The source base station on movement may transmit the handover request to the target base station on movement. For example, the request may include information related to stop of the positioning procedure, or may include information indicating that positioning of the UE is not to be performed. The target base station on movement may accept the handover of the UE, using the notification. The target base station on movement may notify the source base station on movement of the handover request positive response (Handover request acknowledgement). The source base station on movement may instruct the UE to perform the handover to the target base station on movement. The source base station on movement may include information related to stop of positioning in the instruction. The UE may perform the handover to the target base station on movement, using the instruction. The UE may stop transmission and reception of the positioning signal, using the information. With this, for example, complexity in the communication system can be avoided.

As another example of the adjustment, the target base station on movement may notify the source base station on movement of information indicating that positioning is not to be performed. The source base station on movement may notify the target base station on movement of information indicating that the positioning procedure is being executed. The information may be, for example, included in the handover request (Handover request). The target base station on movement may accept the handover from the source base station on movement. The handover request positive response (Handover request acknowledgement) may be notified. In the notification, information indicating that positioning is not to be performed may be included. The source base station on movement may determine to stop the positioning processing of the UE, using the information. The source base station on movement may instruct the UE to perform the handover to the target base station on movement. The source base station on movement may include information related to stop of positioning in the instruction. The UE may perform the handover to the target base station on movement, using the instruction. The UE may stop transmission and reception of the positioning signal, using the information. With this, for example, the amount of signaling between the base stations can be reduced.

As another example of the adjustment, the source base station on movement may notify the target base station on movement of information related to a policy as to whether or not the handover can be performed. The information related to the policy may be, for example, information indicating which is to be prioritized among the handover and positioning. The source base station on movement may include the information in the signaling of the handover request (Handover request) to perform notification of the information. The target base station on movement may determine whether or not the handover can be performed, using the information. For example, when the information indicates that the handover is to be prioritized, the target base station on movement may accept the handover. As another example, when the information indicates that positioning is to be prioritized, the target base station on movement may reject the handover. With this, for example, signaling in the inter-base station interface can be reduced.

The solutions disclosed in the fifth embodiment may be used in combination. For example, transmission and reception of the positioning signal between the UE and the serving base station and/or the neighboring base station may be performed over both of before the handover and after the handover. For example, the source base station on movement may instruct the UE to perform the handover after a predetermined period of time has elapsed since transmission and reception of the positioning signal started between the UE and the source base station on movement and/or the neighboring base station, after a predetermined period of time has elapsed since the source base station on movement received a measurement report for the handover from the UE, and/or after a predetermined period of time has elapsed since the handover request positive response from the target base station on movement was received. The UE may perform the handover to the target base station on movement, using the instruction. The UE may perform transmission and reception of the positioning signal to and from the target base station on movement and/or the neighboring base station. The UE may notify the target base station on movement of the positioning signal reception results. The notification may include, for example, the transmission and reception results of the positioning signal between the UE and the source base station on movement and/or the neighboring base station. This can prevent disconnection of a communication line due to deterioration of communication quality between the UE and the source base station on movement, which is caused due to delay in the handover, even when the UE that has received the handover instruction has not completed reception of the downlink signal from the serving base station and/or the neighboring base station, for example.

In the method disclosed in the fifth embodiment, the target base station on movement may perform a UE context release request to the source base station on movement after completion of positioning. For example, after notification of the position calculation results of the UE from the source base station on movement to the target base station on movement, the target base station on movement may request the source base station on movement to release the UE context. This can prevent the source base station on movement to release the UE context while performing position calculation using the UE context, for example.

As another example, the source base station on movement may release the UE context after completion of positioning. The UE context release request from the target base station on movement to the source base station on movement may be performed before completion of positioning. The source base station on movement may defer the UE context release until completion of positioning. With this, for example, signaling between the base stations after completion of positioning can be omitted.

According to the fifth embodiment, latency of positioning in a case of occurrence of handover during positioning can be reduced.

In the present disclosure, the UE in which service data has occurred is regarded as a UE-TX. For example, provided that a UE-TX is referred to as a UE1 and a UE-RX is referred to as a UE2, when service data occurs in the UE2 and the data is to be transmitted to the UE1, the method according to the present disclosure may be applied with the UE2 being regarded as the UE-TX and the UE1 being regarded as the UE-RX. The same effects can be obtained.

Each embodiment and its modifications described above are merely examples, and each embodiment and its modifications can be freely combined together. Further, any constituent element in each embodiment and its modifications can be changed or omitted as appropriate.

For example, in each embodiment and its modifications described above, the subframe is an example of a time unit of communication in a base station communication system of the fifth generation. A scheduling unit may be used. In each embodiment and its modifications described above, the processing described as being performed in a unit of subframes may be performed in a unit of TTIs, a unit of slots, a unit of sub-slots, and a unit of mini-slots.

For example, the methods disclosed in each embodiment and its modifications described above may be applied not only to a vehicle-to-everything (V2X) service but also to services using the SL communication. For example, the methods disclosed in each embodiment and its modifications described above may be applied to the SL communication used in various services, such as a proximity service (proximity-based service), public safety, communication between wearable terminals, and communication between devices in a factory.

For example, in each embodiment and its modifications described above, the base station may be a cell, may be a DU, or may be a transmission reception point (TRP).

While the present disclosure has been shown and described in detail, the foregoing description is in all aspects illustrative and not restrictive. It is understood that numerous unillustrated modifications can be devised.

Note that, in the present disclosure, each embodiment can be freely combined and each embodiment can be modified or omitted as appropriate within the scope of the present disclosure.

The invention claimed is:

1. A communication system comprising:
a communication terminal; and
a serving base station of the communication terminal, wherein
the serving base station notifies the communication terminal of an instruction to configure a measurement gap for the communication terminal to measure a positioning signal transmitted from at least one neighboring base station in order to measure a position of the communication terminal, without a request from the communication terminal, and
the communication terminal transmits, to the serving base station, request information to request stop of the measurement gap configured by the instruction.

2. The communication system according to claim 1, wherein
the serving base station acquires information related to the positioning signal transmitted from the at least one neighboring base station from a management apparatus holding the information or the at least one neighboring base station, and determines the measurement gap, based on the acquired information.

3. The communication system according to claim 1, further comprising
a management apparatus configured to hold information related to the positioning signal transmitted from the at least one neighboring base station, and determine the measurement gap, based on the information.

4. The communication system according to claim 1, wherein
the serving base station calculates the position of the communication terminal, based on measurement results of the positioning signal obtained by the communication terminal.

5. The communication system according to claim 1, wherein
the communication terminal calculates the position of the communication terminal, based on measurement results of the positioning signal obtained by the communication terminal.

6. The communication system according to claim 1, wherein the communication terminal is configured to receive, from the serving base station, instruction information, which is transmitted in response to the request information, for stopping the measurement gap.

7. A base station configured to operate as a serving base station of a communication terminal, wherein
the base station notifies the communication terminal of an instruction to configure a measurement gap for the communication terminal to measure a positioning signal transmitted from at least one neighboring base station in order to measure a position of the communication terminal, without a request from the communication terminal, and
the base station receives, from the communication terminal, request information to request stop of the measurement gap configured by the instruction.

8. The base station according to claim 7, wherein the base station is configured to transmit, to the communication terminal, instruction information, which is transmitted in response to the request information, for stopping the measurement gap.

9. A communication terminal apparatus in a communication system, the communication system comprising the communication terminal apparatus, and a base station apparatus configured to perform radio communication with the communication terminal apparatus,
wherein the communication terminal apparatus is configured to receive, from the base station apparatus, configuration information on a measurement gap for the communication terminal apparatus to measure a positioning signal, without transmitting a configuration request for the measurement gap to the base station apparatus, and
wherein the communication terminal apparatus is configured to transmit, to the base station apparatus, request information to request stop of the measurement gap configured by the configuration information.

10. The communication terminal apparatus according to claim 9, wherein the communication terminal apparatus is configured to receive, from the base station apparatus, instruction information, which is transmitted in response to the request information, for stopping the measurement gap.

* * * * *